United States Patent
Laney et al.

(10) Patent No.: US 8,648,894 B2
(45) Date of Patent: Feb. 11, 2014

(54) VIRTUAL INMATE VISITATION

(75) Inventors: Alan Laney, West Chester, OH (US);
William Watson, Liberty Township, OH (US); Jared Laney, West Chester, OH (US); Leslie Laney, West Chester, OH (US); Julie Collinsworth, Cincinnati, OH (US)

(73) Assignee: Eyconix, LLC, West Chester, OH (US)

( * ) Notice: Subject to any disclaimer, the term of this patent is extended or adjusted under 35 U.S.C. 154(b) by 243 days.

(21) Appl. No.: 13/100,557

(22) Filed: May 4, 2011

(65) Prior Publication Data

US 2012/0281058 A1 Nov. 8, 2012

(51) Int. Cl.
*H04M 7/14* (2006.01)

(52) U.S. Cl.
USPC ............. 348/14.03; 348/14.08; 348/14.1; 348/211.12; 379/202.01; 379/203.01; 379/204.01

(58) Field of Classification Search
USPC ............. 348/14.03, 14.08, 14.1, 211.12; 379/202.01, 203.01, 204.01
See application file for complete search history.

(56) References Cited

U.S. PATENT DOCUMENTS

| | | |
|---|---|---|
| 4,965,819 A | 10/1990 | Kannes |
| 7,046,779 B2 | 5/2006 | Hesse |
| 7,529,357 B1 | 5/2009 | Rae et al. |
| 2004/0252184 A1 | 12/2004 | Hesse et al. |
| 2005/0084086 A1 | 4/2005 | Hesse |
| 2005/0114192 A1 | 5/2005 | Tor et al. |
| 2006/0087554 A1 | 4/2006 | Boyd et al. |
| 2006/0087555 A1* | 4/2006 | Boyd et al. ............. 348/14.09 |
| 2007/0285504 A1 | 12/2007 | Hesse |
| 2008/0000966 A1 | 1/2008 | Keiser |
| 2008/0201158 A1 | 8/2008 | Johnson et al. |
| 2011/0096139 A1* | 4/2011 | Rudolf ............. 348/14.11 |

* cited by examiner

*Primary Examiner* — Joseph J Nguyen
(74) *Attorney, Agent, or Firm* — Dinsmore & Shohl

(57) ABSTRACT

Included are systems and methods for a virtual inmate visitation. Some embodiments include providing a scheduling user interface for a visitor to schedule a video visitation, receiving a visitor scheduling request for the video visitation with an inmate, and determining a visitor type for the visitor. Some embodiments include providing, based on the visitor type, a scheduling option, providing a visitor payment mechanism that depends on the visitor type, and providing a video visitation user interface to the visitor for conducting the video visitation between the visitor and the inmate. Still some embodiment include in response to receiving a visitor input, conduct the video visitation between the visitor and the inmate, determining whether the video visitation includes an unacceptable activity and performing a preventative measure.

20 Claims, 56 Drawing Sheets

First Name:*

Last Name:*

☐ I have not been convicted of a felony.

☐ I have read and understand the Terms and Conditions.

Relationship:

Enter your relationship to the inmate (i.e. father, mother) friend)

Identification

Drivers License:

Enter your drivers license or state id number

Drivers License State:

Ohio

Select the state that issued your Drivers License or State Id

- 600
- 608 Identification
- 610 Firm Information
- 612 Create New Account

Fields shown:
- First Name:*
- Last Name:*
- Bar Id Number:*
- Enter your state Bar Identification Number
- Id State:* Ohio
- Select the state that issued your Bar Identification Number.
- Firm Name:*
- Address:*
- City:*
- State:* Ohio

| First Name | Middle | Last Name ▲ | Birthday | Confined | |
|---|---|---|---|---|---|
| HAROLD | DOUGLAS | ADKINS | 05-01-1957 | 01-05-2011 | Visit |
| WALTER | SHERMAN | ANDREWS | 11-16-1964 | 01-28-2011 | Visit |
| KENNETH | SCOTT | ARMSTRONG | 07-07-1978 | 12-23-2010 | Visit |
| ANNA | JEAN | ASH | 03-13-1991 | 01-26-2011 | Visit |
| ELLEN | DANIELLE | BAILEY | 01-02-1989 | 10-22-2010 | Visit |
| TONY | LYNN | BAKER | 01-30-1987 | 01-11-2011 | Visit |
| STACEY | NICOLE | BARNES | 02-05-1984 | 12-27-2010 | Visit |
| TONI | ANNETTE | BARNEY | 06-03-1967 | 12-14-2010 | Visit |
| GEORGE | EDWARD | BARRETT | 01-04-1976 | 12-10-2010 | Visit |
| KAYLA | CHASTEEN | BARROW | 03-28-1988 | 01-16-2011 | Visit |
| CLIFF | AUSTIN | BATCHELOR | 01-09-1967 | 01-10-2011 | Visit |

• Terms of Use • Privacy Guidlines • Contact Us • Advertise with Us • About Us • FAQ

FIG. 13B

Schedule Visit Wizard

Start >> Select Inmate >> Select Date >> Select Time >> Review Choices

You Selected:
HAROLD DOUGLAS ADKINS
This facility houses individuals with very similar names, Please check the information below.

Inmate ID  145380
Birthday   05-01-1957
Booked     01-05-2011
Location   County Court Street Jail Visit Length: *
- ● 15 Minute Video Visit - $10.95
- ○ 30 Minute Video Visit - $19.95

Select Visit Date: *
2011-02-02
Format: 2011-02-01

[Back] [Next >>]  [Cancel]

---

Participating Facilities

This site provides video visitation for inmates housed at the following facilities:

- County Court Street Jail
  123 Court Street, Smalltown, Ohio
  9:00AM-11:00AM, 1:00PM-5:00PM, 7:00PM-9:00PM Note: Video Visitation is NOT currently available for inmates housed at the Main County Jail at 789 Alcatraz St.

| Sunday | Monday | Tuesday | Wednesday | Thursday | Friday | Saturday |
|---|---|---|---|---|---|---|
| | | 1 | 2 | 3 | 4 | 5 |
| | | BEAU SHELEAS BLANTON with vBob VLaney Floor/Pod: Court Street – Women ( Floor 3 / CC ) Station: CourtStWomen1 Tue, 02/01/2011 – 2:45pm VALERIE KAY DIEFENBACHER with VBob VLaney Floor/Pod: Court Street – Women ( Floor 3 / CC ) Station: CourtStWomen1 Tue, 02/01/2011 – 7:00pm SUMMER YVONNE | ANNA JEAN ASH with vjulie Floor/Pod: Court Street Floor 3 / CC) Station: CourtStWomen1 Wed, 02/02/2011 – 9:00am MARIA NICOLE DURHAM with vjulie Floor/Pod: Court Street – Women ( Floor 3 / CC) Station: CourtStWomen1 Wed, 02/02/2011 – 9:15am SUNSHINE FAY FIELDS with vjulie Floor/Pod: Court | ANNA JEAN ASH with vjulie Floor/Pod: Court Street Floor 3 / CC) Station: CourtStWomen1 Thu, 02/03/2011 – 10:00am ELLEN DANIELLE BAILEY with vtodd Floor/Pod: Court Street – Women ( Floor 3 / CC) Station: CourtStWomen1 Thu, 02/03/2011 – 11:15am BEVERLY SUE SMITH with vBill vWatson Floor/Pod: Court | | |

VIRTUAL INMATE VISITATION

BACKGROUND

Presently, those wishing to visit an incarcerated individual are required to travel to the facility where the individual is housed. The facility may be a county jail, municipal jail, state prison, federal facility, mental hospital, rehabilitation facility, etc. and may have varying regulations related to visitations. In many instances, the facility will have predetermined visitation times for visitors. Accordingly, a visitor may be required to arrive at the facility at a predetermined time and may be subject to one or more security checks. In many instances, these restrictions reduce the opportunity for visitors, such as family, friends, attorneys, clergy, social workers, law enforcement personnel, etc. to see the incarnated individual. Consequently, many of these individuals who would otherwise visit the inmate may not have the opportunity to do so.

Additionally, while many such facilities encourage visits to the inmates, these visits may pose a security risk to the facility, to the inmate, and/or to the visitor. More specifically, many visitors attempt to smuggle contraband to an inmate. Other visitors may themselves be at risk during (or after) their visit to the facility. Consequently, many facilities invest great expense and effort to protect the safety and security of the facility, inmates, employees, and visitors.

SUMMARY

Included are systems and methods for a virtual inmate visitation. Some embodiments of a system include a memory component that stores video visitation logic that, when executed by the system, causes the system to provide a scheduling user interface for a visitor to schedule a video visitation, receive a visitor scheduling request for the video visitation with an inmate, and determine a visitor type for the visitor. In some embodiments, the virtual visitation logic causes the system to provide, based on the visitor type, a scheduling option, provide a visitor payment mechanism that depends on the visitor type, and provide a video visitation user interface to the visitor for conducting the video visitation between the visitor and the inmate. In some embodiments, the virtual visitation logic further causes the system to, in response to receiving a visitor input, conduct the video visitation between the visitor and the inmate, determine whether the video visitation includes an unacceptable activity, and perform a preventative measure.

Embodiments of a method for virtual inmate visitation include providing a scheduling user interface for a visitor to schedule a video visitation, receiving a visitor scheduling request for the video visitation with an inmate, and determining a visitor type for the visitor. Some embodiments include providing, based on the visitor type, a scheduling option, where the scheduling option changes based on the visitor type, providing a visitor payment mechanism that depends on the visitor type, where the visitor payment mechanism changes based on the visitor type, and providing a video visitation user interface to the visitor for conducting the video visitation between the visitor and the inmate. Further, some embodiments include, in response to receiving a visitor input, conducting the video visitation between the visitor and the inmate, determining whether the video visitation includes an unacceptable activity and in response to determining that the video visitation includes the unacceptable activity, performing a preventative measure.

Embodiments of a non-transitory computer-readable medium for virtual inmate visitation include logic that causes a computing device to provide a registration user interface for registering a visitor, determine a visitor type from a visitor selection on the registration user interface, and provide a scheduling user interface for the visitor to schedule a video visitation. In some embodiments, the logic causes the computing device to receive a visitor scheduling request for the video visitation with an inmate, provide, based on the visitor type, a scheduling option, where the scheduling option changes based on the visitor type, and provide a visitor payment mechanism that depends on the visitor type, where the visitor payment mechanism changes based on the visitor type. In still some embodiments, the logic causes the computing device to provide a video visitation user interface to the visitor for conducting the video visitation between the visitor and the inmate, in response to receiving a visitor input, conduct the video visitation between the visitor and the inmate, determine whether the video visitation includes an unacceptable activity and in response to determining that the video visitation includes the unacceptable activity, perform a preventative measure.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIGS. 5A-5D depict a user interface for accessing virtual visitation services as a family or friend, according to embodiments shown and described herein;

FIGS. 6A-6C depict a user interface for accessing virtual visitation services as an attorney, according to embodiments shown and described herein;

FIGS. 7A-7D depict a user interface for accessing virtual visitation services as clergy, according to embodiments shown and described herein;

FIGS. 8A-8D depict a user interface for accessing virtual visitation services as a government or law enforcement entity, according to embodiments shown and described herein;

FIGS. 9A-9D depict a user interface for accessing virtual visitation services as a social services entity, according to embodiments shown and described herein;

FIGS. 13A-13B depict a user interface for providing inmate searching capabilities, according to embodiments shown and described herein;

FIG. 15 depicts a user interface for selecting a virtual visit date and length, according to embodiments shown and described herein;

FIGS. 18A-18C depict a user interface for purchasing an amount of time for a virtual visit, according to embodiments shown and described herein;

FIG. 19 depicts a user interface for finalizing scheduling of a virtual visit, according to embodiments shown and described herein;

FIG. 24 depicts a user interface that that may be provided to illustrate scheduling of a plurality of virtual visits, according to embodiments shown and described herein;

FIG. 28 depicts a user interface to provide an administrator with a list of inmate computing devices that may conduct virtual visits, according to embodiments shown and described herein;

DETAILED DESCRIPTION

Figure 1:
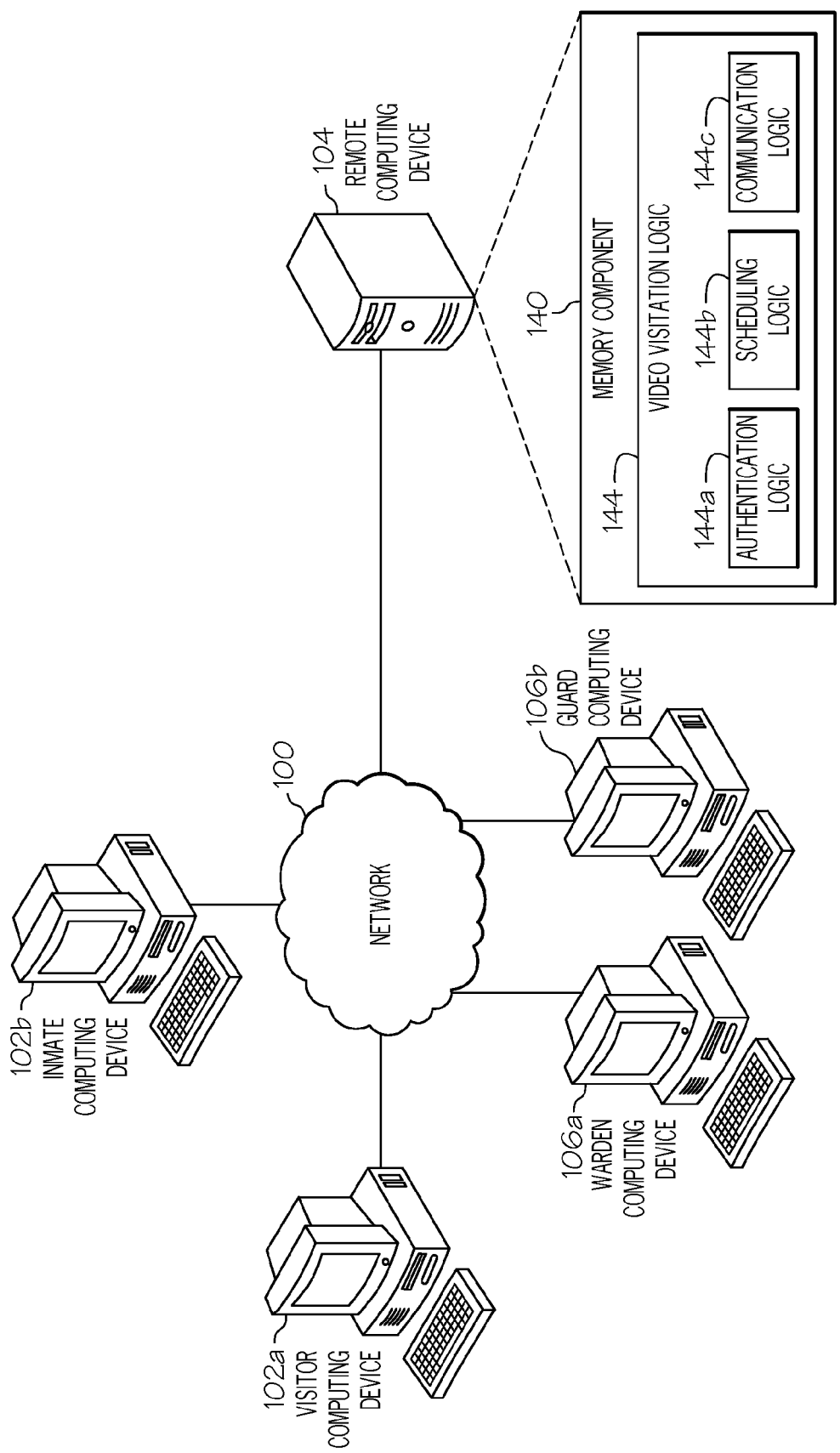
FIG. 1 depicts a computing environment for providing a virtual inmate visitation according to embodiments shown and described herein.

Embodiments disclosed herein include systems and methods for virtual inmate visitation. As background, inmates in local, state, and federal corrections facilities, as well as mental hospitals, rehabilitation centers, etc. often have visitors to the facility in which they are incarcerated. Many inmates have family, friends, attorneys, pastors, and/or others who routinely visit the inmate. Certain visitors, such as family and friends may be restricted to predetermined visiting hours, which may be difficult to meet. Additionally, if the inmate is incarcerated in a different city than his/her family and friends, visitation may be difficult. With regard to legal and religious visitors, it is often inefficient for the visitor to travel to the corrections facility. Further, from a corrections facility perspective, visitors pose a security risk, both in terms of smuggling contraband and safety of the visitors, inmates, and facility personnel. As such, alternatives and supplements to in-person visitations are desired.

Embodiments disclosed herein include secured local area and/or wide area video visitation capabilities that enable visitors to conduct "virtual visitations" with an inmate. As an example, embodiments of the system may be configured to coordinate visitation times and dates with the facility, provide a video conference experience between the inmate and the visitor, provide dynamic security based on the type of visitor, as well as provide security measures based on the content of a communication between the inmate and his/her visitor.

In addition, some embodiments of the system may be configured to provide a user interface for gaining security clearance, scheduling virtual visits, scheduling in-person visits, providing the virtual visitation, as well as providing monitoring of the virtual visitation. As an example, once the visitor is logged onto the system, the inmate may be brought to a monitor and the visitation takes place with law enforcement monitoring via a peripheral monitoring system. In some embodiments, the monitoring may include electronic voice and/or video recognition capabilities to identify when conversations turn to potentially harmful or illegal activities. Other security measures may also be in place, such as providing custom clearance levels based on the type of visitor. As an example, friends and family may only be permitted to visit the inmate during predetermined visiting hours, while clergy and legal counsel may be permitted to visit the prisoner at other times.

Other security measures may also be implemented. As an example, the system may be configured to automatically record audio and/or video related to the virtual visitation, as well as provide the recorded data to the visitor and/or an administrator. Some embodiments may be configured to begin recording in response to predetermined triggering actions that may indicate harmful or illegal activity. As an example, triggering actions may include voice recognized words or commands, video recognized signals, facial expressions, etc. In some embodiments, the system may be configured to shut down the virtual visitation in response to determining the triggering action, as well as reassess the security clearance for the visitor that is associated with the triggering action.

Still some embodiments may be configured to facilitate a payment mechanism for providing the service. As an example, the system may provide an interface and other infrastructure for requiring payments for a visitor to utilize the system. In some embodiments, the payment structure may be dependent on the type of visitor (e.g., friend, family, clergy, legal counsel, etc.). While in some embodiments, the payment structure may depend on the amount of use, the security risk of that visitor, and/or other factors. These and other features and embodiments are described in more detail below.

Referring now to the drawings, FIG. 1 depicts a computing environment for providing a virtual inmate visitation. As illustrated, a network 100 may be coupled to a visitor computing device 102a, an inmate computing device 102b, a remote computing device 104, a warden computing device 106a, and a guard computing device 106b. The network 100 may include a wide area network and/or a local area network and thus may be wired and/or wireless. The visitor computing device 102a may be a computer at a person's home, at a law firm, at a court, and/or elsewhere. The visitor computing device 102a may include any portable and/or non-portable computing devices, such as personal computers, laptop computers, personal digital assistants (PDAs), mobile phones, etc that is configured for video communications. The inmate computing device 102b may also be a device configured for video communications. However, all features of the inmate computing device 102b may not be available to the inmate. More specifically, inmate computing device 102b may be configured as a kiosk such that the inmate may only have an option to begin a video visitation and to end a video visitation. Other options may be only accessible to a warden, guard, and/or other administrator.

Similarly, the remote computing device 104 may include a server and/or other computing device for providing information to the visitor computing device 102a and inmate computing device 102b. In some embodiments, the remote computing device 104 may be configured to provide one or more user interfaces for scheduling a video visitation, as well as provide a link between the visitor computing device 102a and the inmate computing device 102b to provide the video visitation. In some embodiments the remote computing device 104 may include authentication logic 144a, scheduling logic 144b, and communication logic 144c for providing services related to video visitations. Similarly, in some embodiments, the remote computing device 104 may represent a web server that provides access to other sources, such as those for providing data regarding potential clients.

As discussed in more detail below, the remote computing device 104 may include a memory component 140 that stores video visitation logic 144. The video visitation logic 144 may include the authentication logic 144a, scheduling logic 144b, and communication logic 144c to provide the described functionality. The authentication logic 144a may include software, hardware, and/or firmware for authenticating users to the video visitation system. As discussed in more detail below, visitors must be registered as a predetermined visitor type, which may be authenticated via the authentication logic 144a. The scheduling logic 144b may include software, hardware, and/or firmware for scheduling a video visitation. The communication logic 144c may include software, hardware, and/or firmware for providing user interfaces as well as video conferencing capabilities.

Also included are the warden computing device 106a and the guard computing device 106b. The warden computing device 106a may have administrative privileges to monitor and/or control video visitations across an entire facility. The warden computing device 106a may have access to user interfaces that provide the desired information. Similarly, the guard computing device 106b may be similarly configured, but have access to a subset of the video visitations that are conducted in a facility. As a guard may have responsibility only over a floor or other area of the facility, the guard computing device 106b may only have access to monitor and/or control video visitations that occur with inmate computing devices 102b that are within that area.

It should be understood that while the visitor computing device 102a and the remote computing device 104 are represented in FIG. 1, each as a single component, this is merely an example. In some embodiments, there may be numerous different components that provide the described functionality. More specifically, in some embodiments, the various pieces of logic 144a-144c may be distributed among a plurality of different computing devices, such as in a local area network. However, for illustration purposes, single components are shown in FIG. 1 and described herein.

Figure 2:
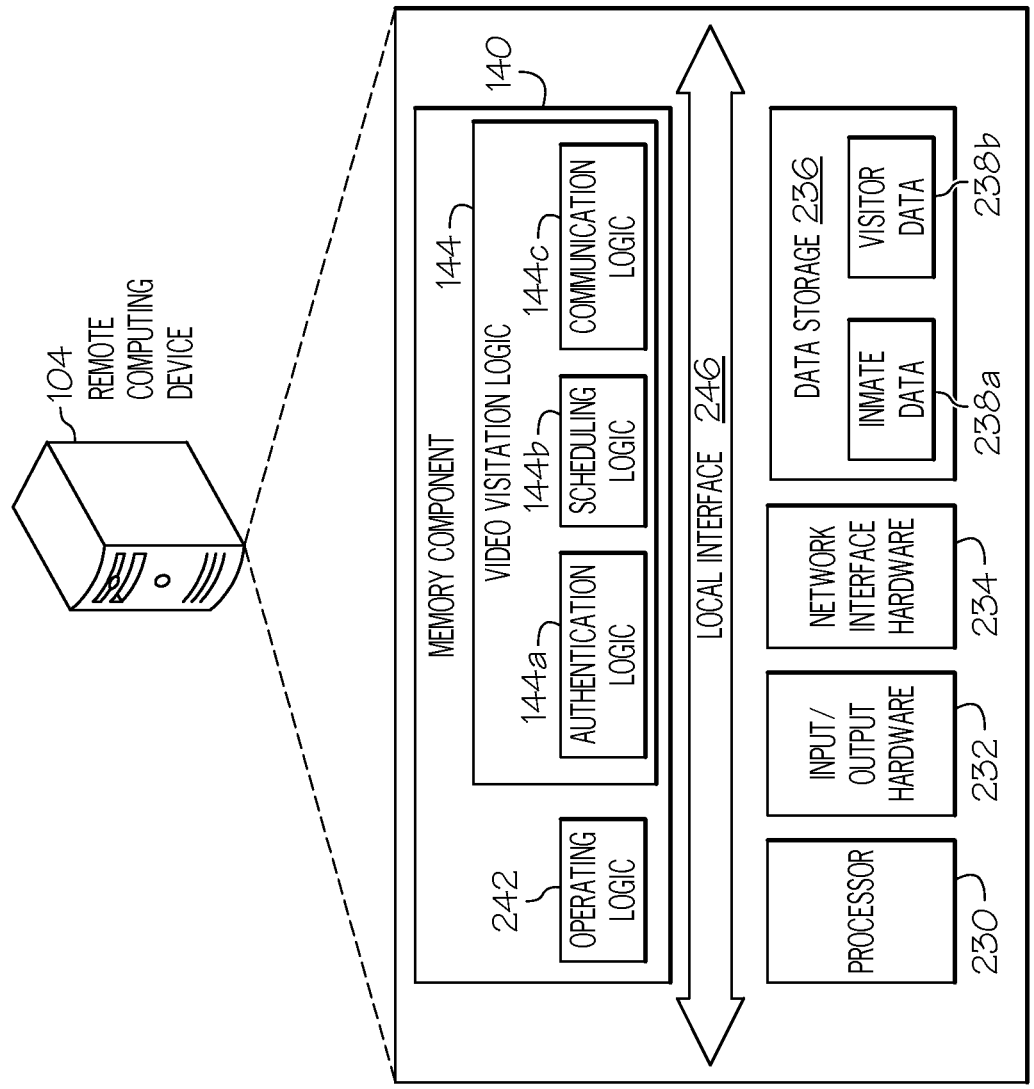
FIG. 2 depicts the remote computing device for providing virtual visitation services, according to one or more embodiments shown and described herein.

FIG. 2 depicts the remote computing device 104 for providing virtual visitation services, according to one or more embodiments shown and described herein. In the illustrated embodiment, the visitor computing device 102a includes a processor 230, input/output hardware 232, network interface hardware 234, a data storage component 236 (which stores legal inmate data 238a, visitor data 238b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the visitor computing device 102a and/or external to the visitor computing device 102a.

Additionally, the memory component 140 may store operating logic 242, and the video visitation logic 144, which includes the authentication logic 144a, the scheduling logic 144b, and the communication logic 144c. Each of these components may include a plurality of different pieces of logic, each of which may be embodied as a computer program, firmware, and/or hardware, as an example. A local interface 246 is also included in FIG. 2 and may be implemented as a bus or other interface to facilitate communication among the components of the remote computing device 104.

The processor 230 may include any processing component operable to receive and execute instructions (such as from the data storage component 236 and/or the memory component 140). The input/output hardware 232 may include and/or be configured to interface with a monitor, positioning system, keyboard, mouse, printer, image capture device (such as still camera and/or video camera for video conferencing), microphone, speaker, gyroscope, compass, and/or other device for receiving, sending, and/or presenting data. The network interface hardware 234 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the visitor computing device 102a and other computing devices.

The operating logic 242 may include an operating system and/or other software for managing components of the visitor computing device 102a. Similarly, as discussed above, the video visitation logic 144 may reside in the memory component 140 and may be configured to cause the processor 230 to facilitate authentication, scheduling, conducting, and monitoring of video visitations.

It should be understood that the components illustrated in FIG. 2 are merely exemplary and are not intended to limit the scope of this disclosure. While the components in FIG. 2 are illustrated as residing within the remote computing device 104, this is merely an example. In some embodiments, one or more of the components may reside external to the remote computing device 104. It should also be understood that, while the remote computing device 104 in FIG. 2 is illustrated as a single device, this is also merely an example. In some embodiments, the various logical components 144a-144c of the video visitation logic 144 may reside on one or more different devices.

Figure 3:
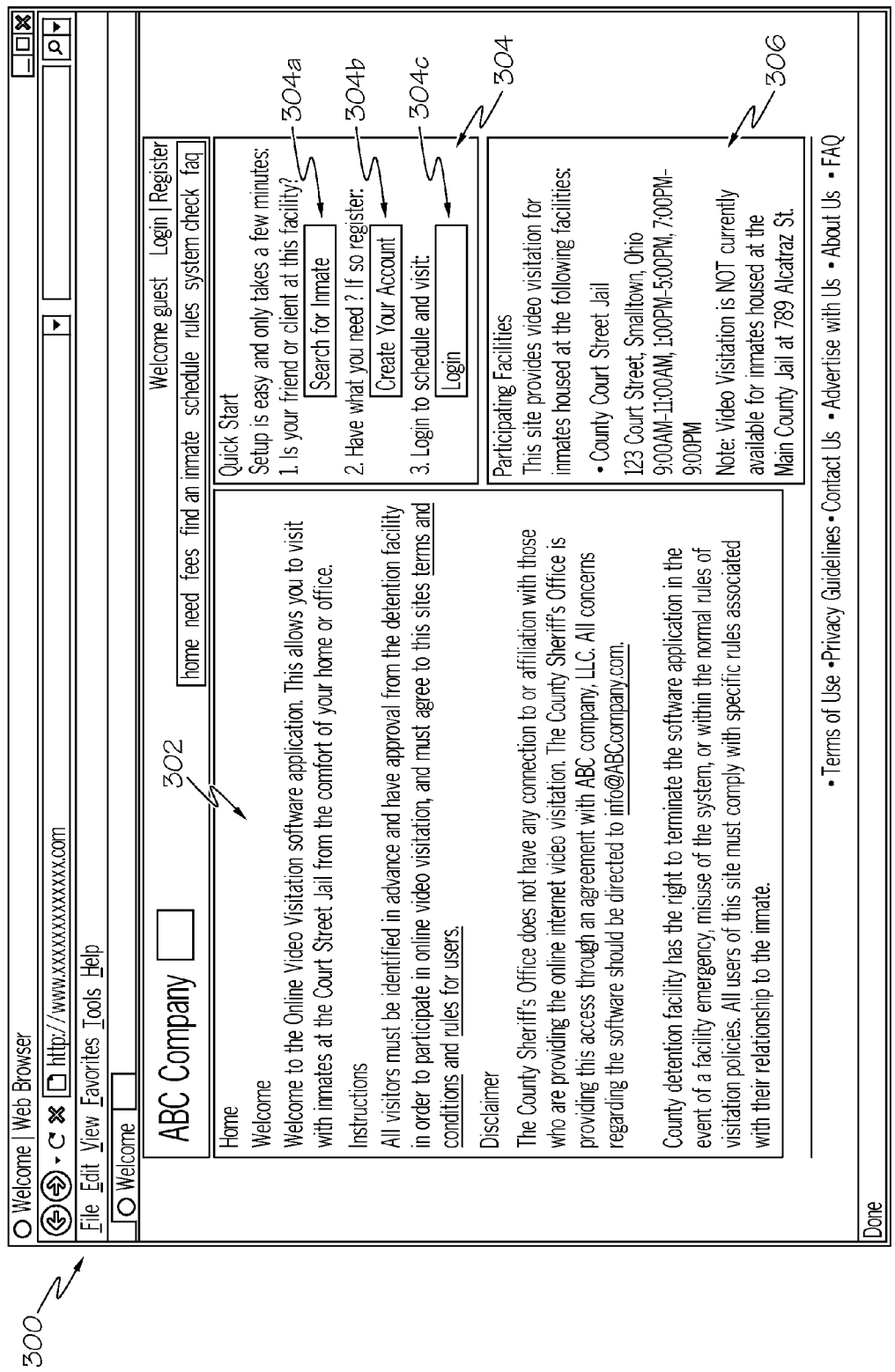
FIG. 3 depicts a user interface for providing login information for a virtual visitation, according to embodiments shown and described herein.

FIG. 3 depicts an introductory user interface 300 for providing login information for a virtual visitation, according to embodiments shown and described herein. As illustrated, the introductory user interface 300 may be provided to a visitor and includes an introduction portion 302, a quick start portion 304, and a participating facilities portion 306. The introduction portion 302 may include language that describes actions and instructions for scheduling and/or conducting a video visitation. The introduction portion 302 may additionally have links to such features as a terms and conditions section, a rules for users sections, an administrator, and/or other options. Also included is the quick start portion 304. The quick start portion 304 may include a search option 304a, a register option 304b, and a login option 304c. The participating facilities portion 306 may provide other facilities that are currently supporting video visitations through the introductory user interface 300.

Figure 4:
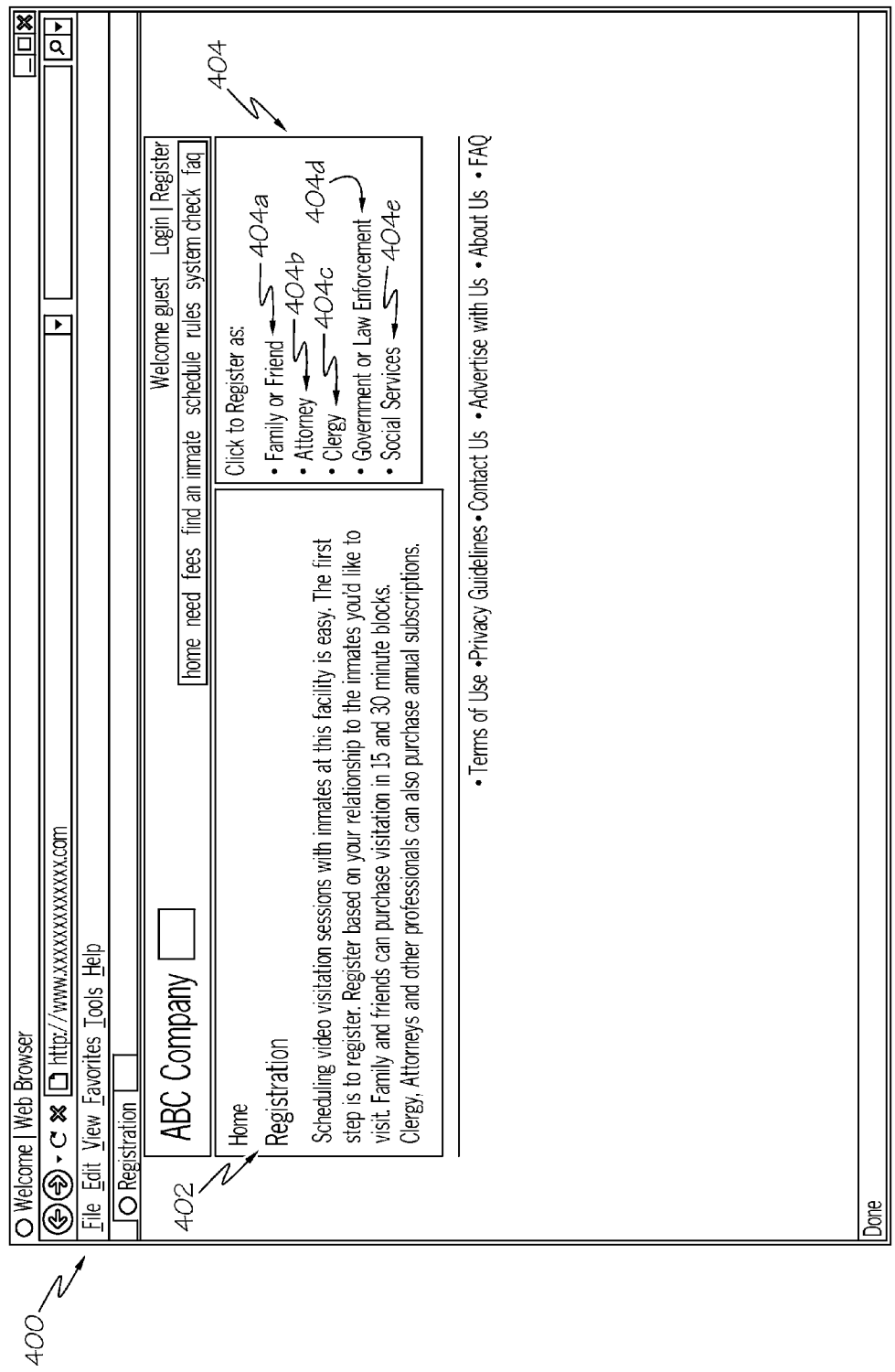
FIG. 4 depicts a user interface for registering with the virtual visitation system, according to embodiments shown and described herein.

FIG. 4 depicts an introductory user interface 400 for registering with the virtual visitation system, according to embodiments shown and described herein. As illustrated, the introductory user interface 400 may be accessed in response to selection of the register option 304b, from FIG. 3. Additionally, the introductory user interface 400 may provide a registration information portion 402 and a registration criteria portion 404. The registration information portion 402 may provide additional information regarding registration of the visitor. The registration criteria portion 404 may include a family or friend option 404a for registering the visitor as a family or friend. Also included is an attorney option 404b, a clergy option 404c, a government or law enforcement option 404d, and a social services option 404e for registering the visitor as an attorney, clergy, government official and/or social services official, respectively.

Figure 5A:
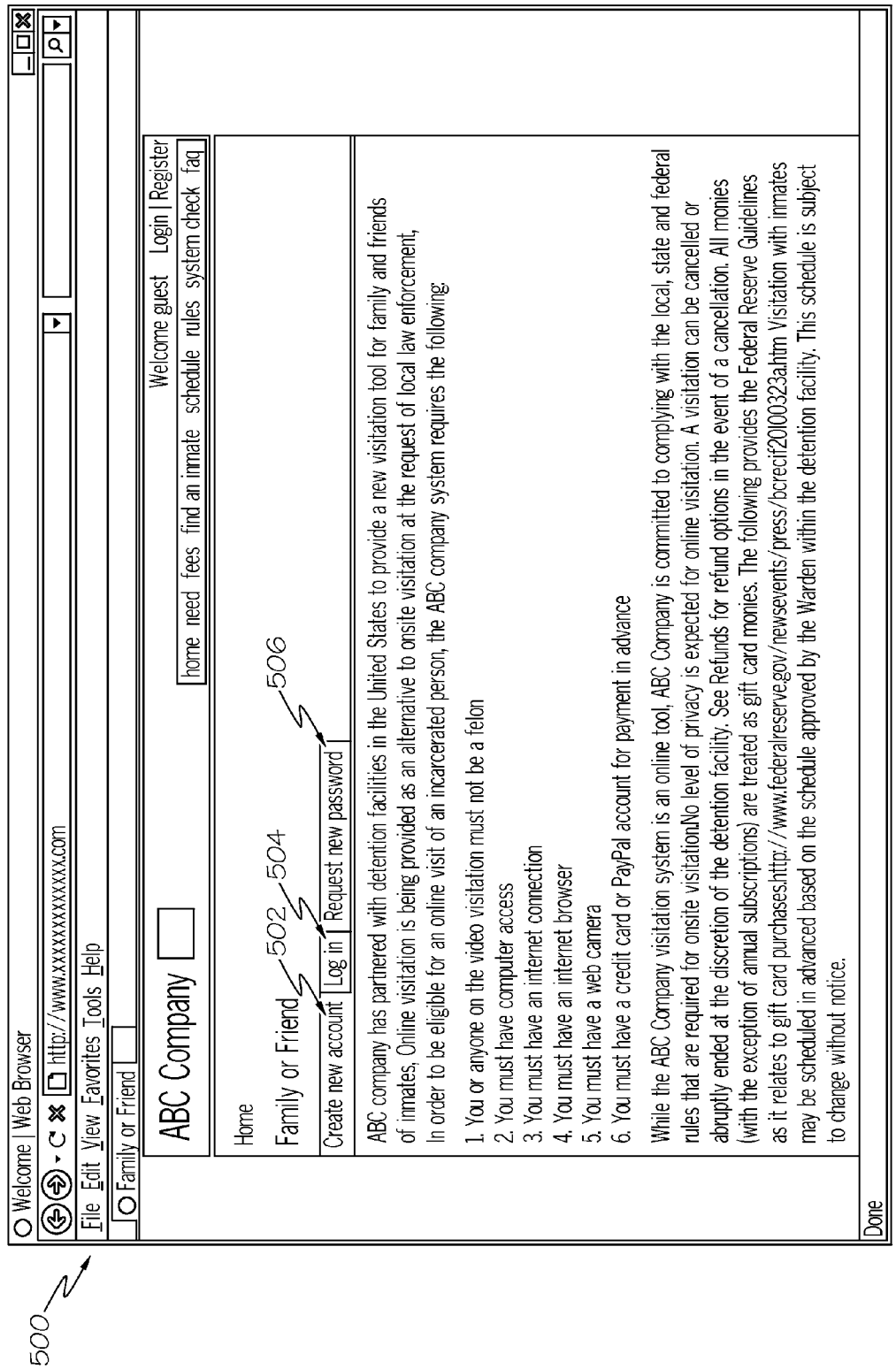

FIGS. 5A-5D depict a registration user interface 500 for accessing virtual visitation services as a family or friend, according to embodiments shown and described herein. As illustrated, in response to selection of the family or friend option 404a from FIG. 4, the registration user interface 500 may be provided. As illustrated in FIG. 5A, the registration user interface 500 may include a create new account option 502, a login option 504, and a request new password option 506. The create new account option 502 may provide instructions and options for a visitor to create a new account as a family or friend, as described in more detail below. The login option 504 provides the visitor with an option to log into an existing account. The request new password option 506 provides the visitor with an option to retrieve a new password, in the case of the visitor forgetting and/or losing a current password.

Figure 5B:
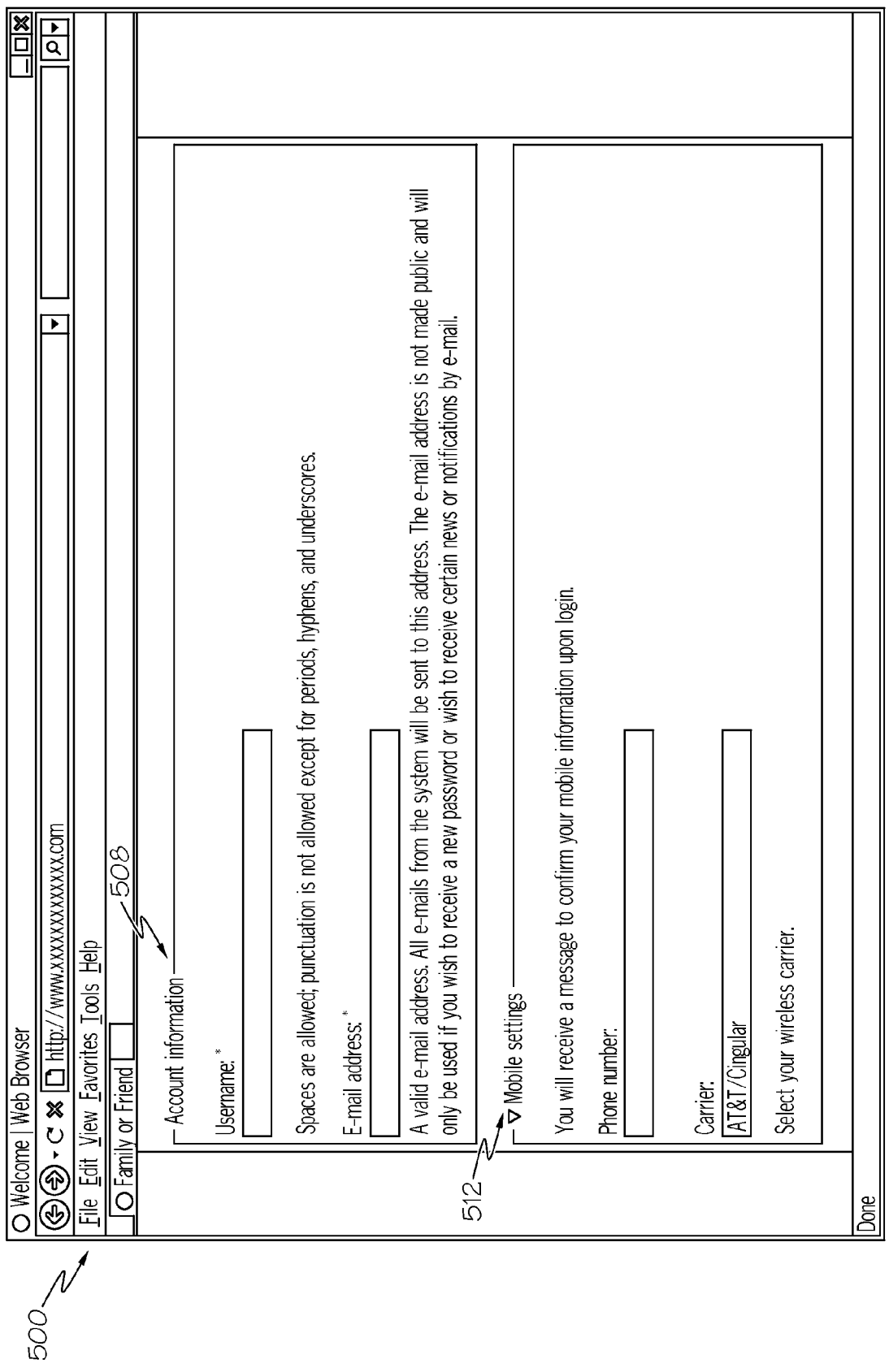
Figure 5D:
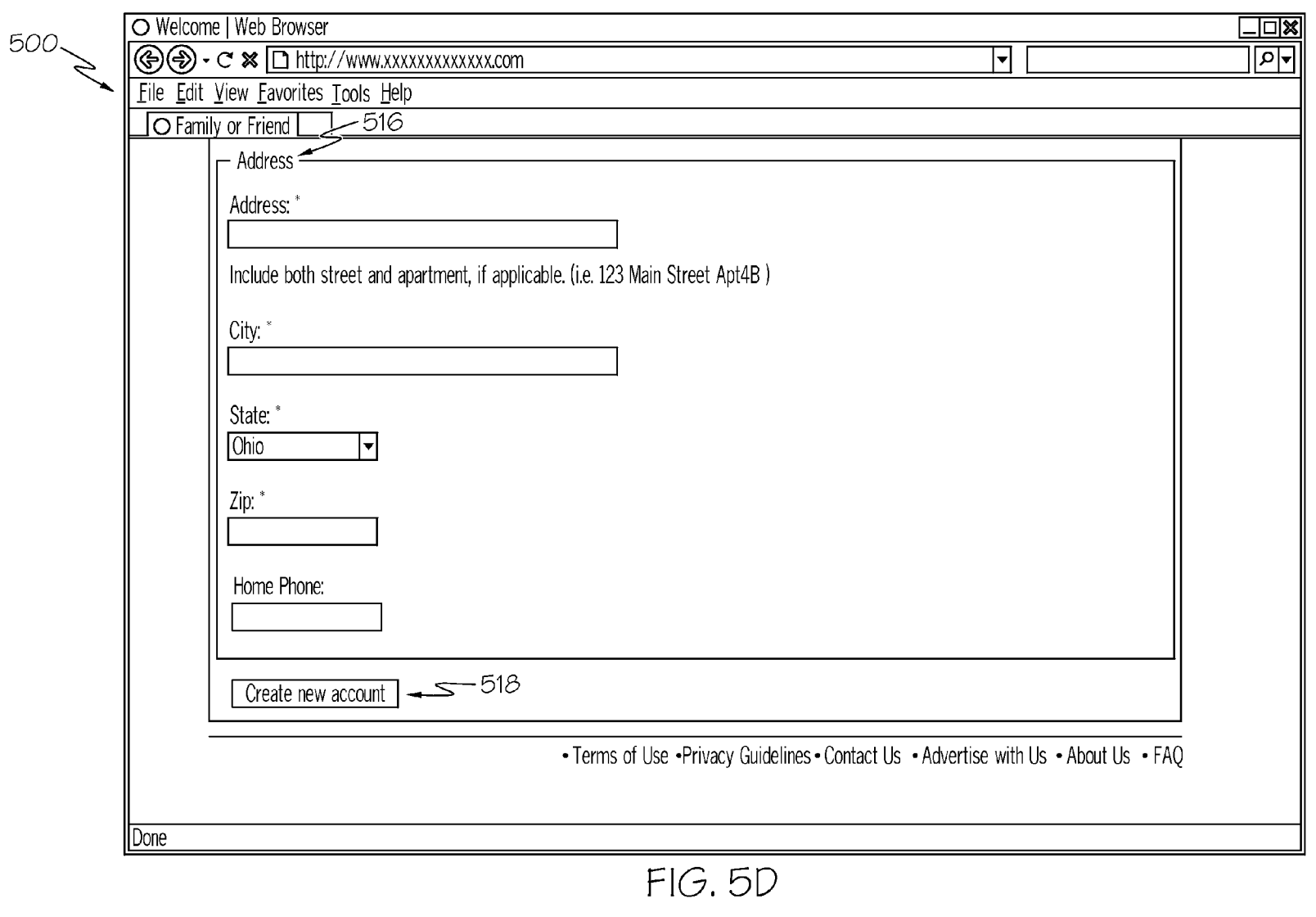

FIG. 5B further illustrates options provided under the create new account option 502. As illustrated, an account portion of the registration user interface 500 may include a text prompt for a desired username and password. In a mobile settings portion 512, the visitor may enter a phone number and wireless carrier. Similarly, FIG. 5C further includes a first name field, a last name field, an option to indicate whether the visitor has been convicted of a felony, an option to indicate whether the visitor has read and understood the terms and conditions section, and a relationship option. Also included in the registration user interface 500 is an identification portion 514 that includes a drivers license number text prompt and a drivers license state text prompt. These sections request this identifying information from the visitor to further confirm that the visitor is truthful in their registration and that the visitor qualifies for the virtual visitation service. FIG. 5D further illustrates the registration user interface 500 and includes an address portion 516 for the visitor to provide a home address, including city, state, zip code, home and phone number. Also included as a create new account option 518 for submitting the registration information.

Figure 6A:
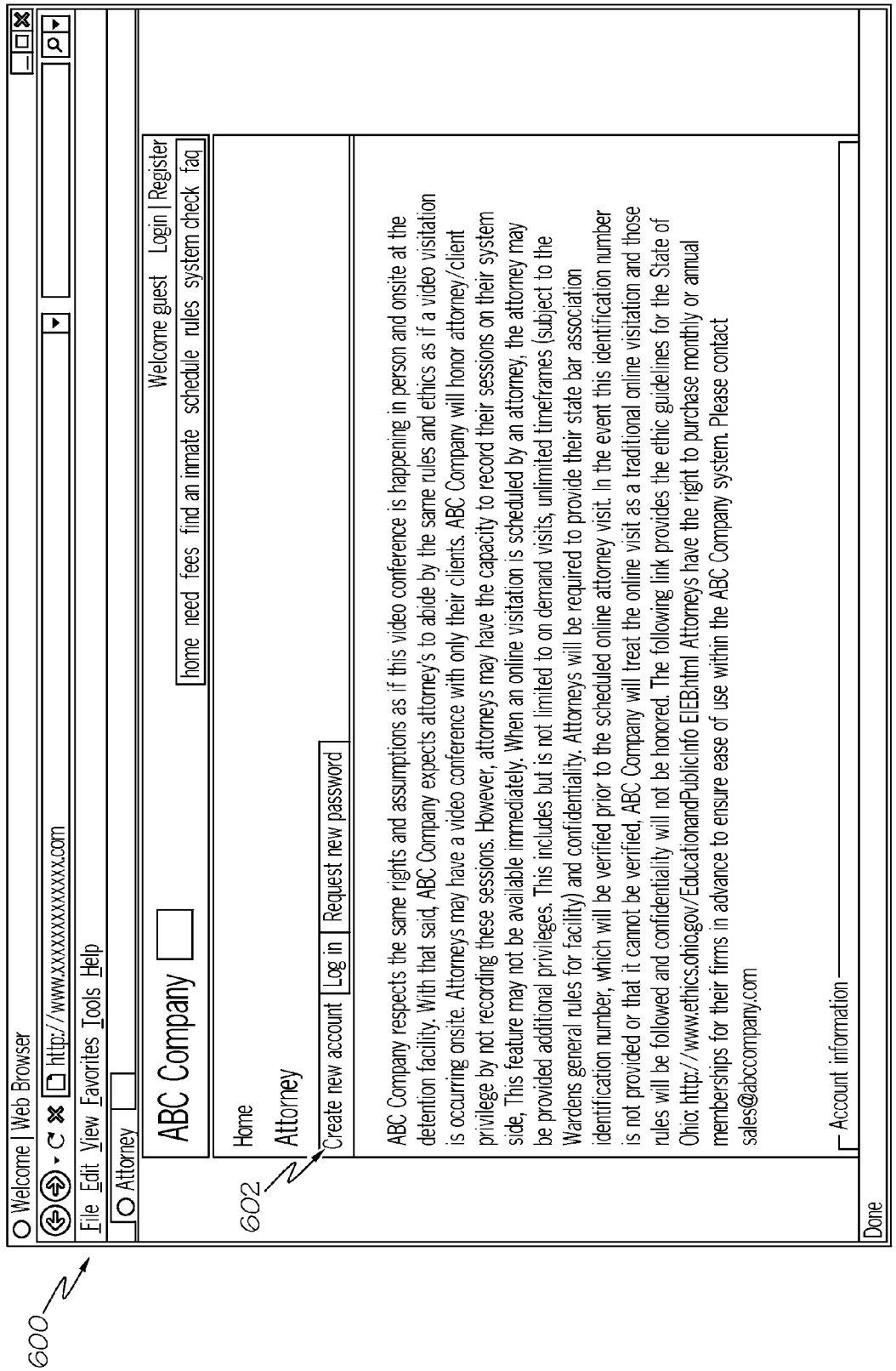
Figure 6B:
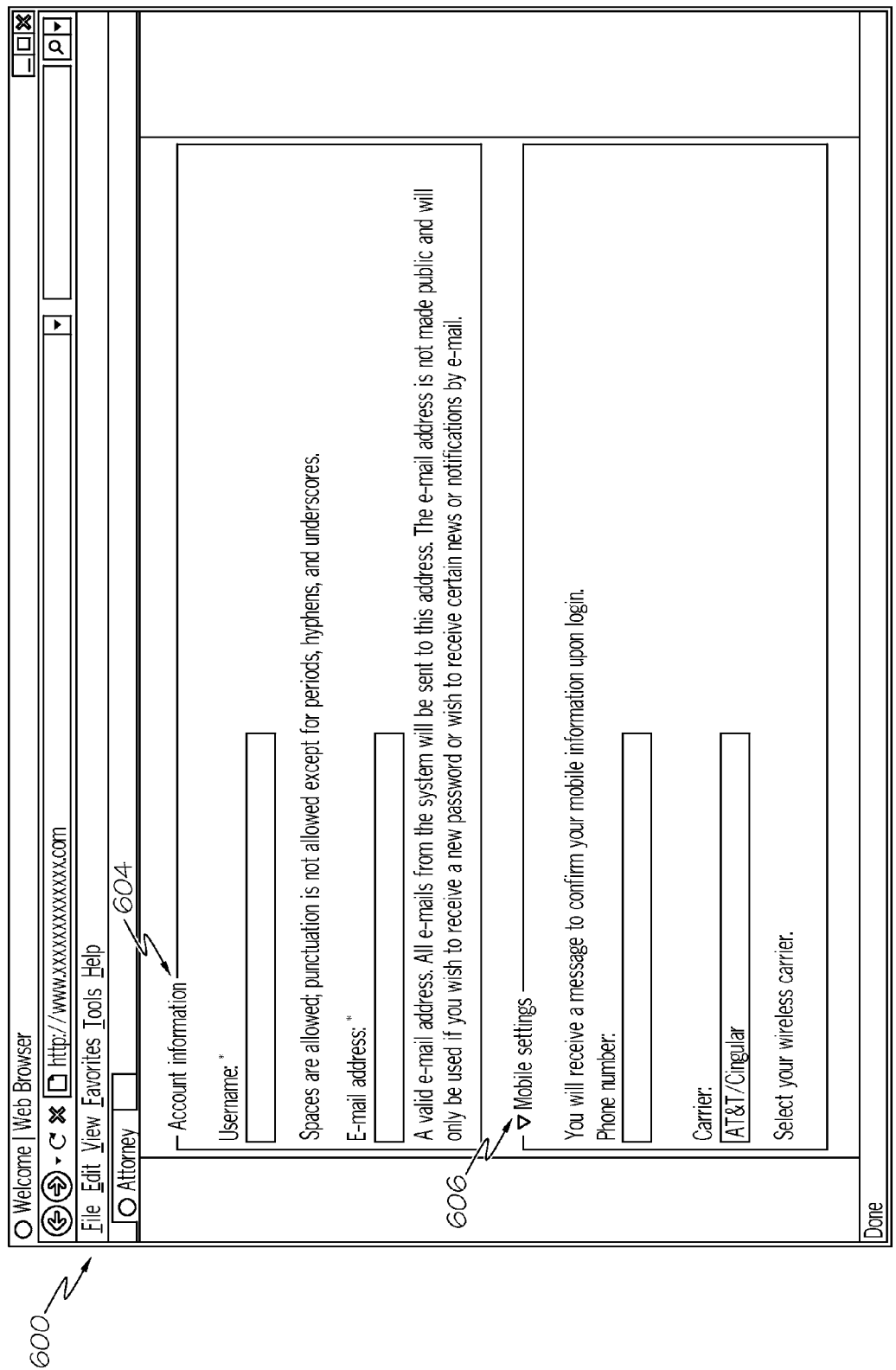

FIGS. 6A-6C depict a registration user interface 600 for accessing virtual visitation services as an attorney, according to embodiments shown and described herein. As illustrated in FIG. 6A, the registration user interface 600 may be provided in response to selection of the attorney option 404b, from FIG. 4. Additionally, the registration user interface 600 includes a create new account option 602, as well as the login and request new passwords options, similar to those depicted in FIG. 5. The create new account option 602 may provide information related to creating new account as an attorney, as well as rights and/or responsibilities of such as account. Additionally, as illustrated in FIG. 6B, the interface 60 includes an account information portion 604, which includes text prompts for a desired username and password from the visitor. Also included is a mobile settings portion 606, which includes a phone number text prompt and a carrier text prompt. As illustrated in FIG. 6C, the registration user interface 700 also includes first name and last name text prompts. FIG. 6 also depicts an identification portion 608. The identification portion 608 includes a text prompt for an attorney bar number, as well as an option to provide the associated state of license. A firm information portion 610 includes text prompts for a firm name that the visitor works, as well as an address, city, and state associated with that law firm. A create new account option 612 is also provided for completing the application process.

Figure 7A:
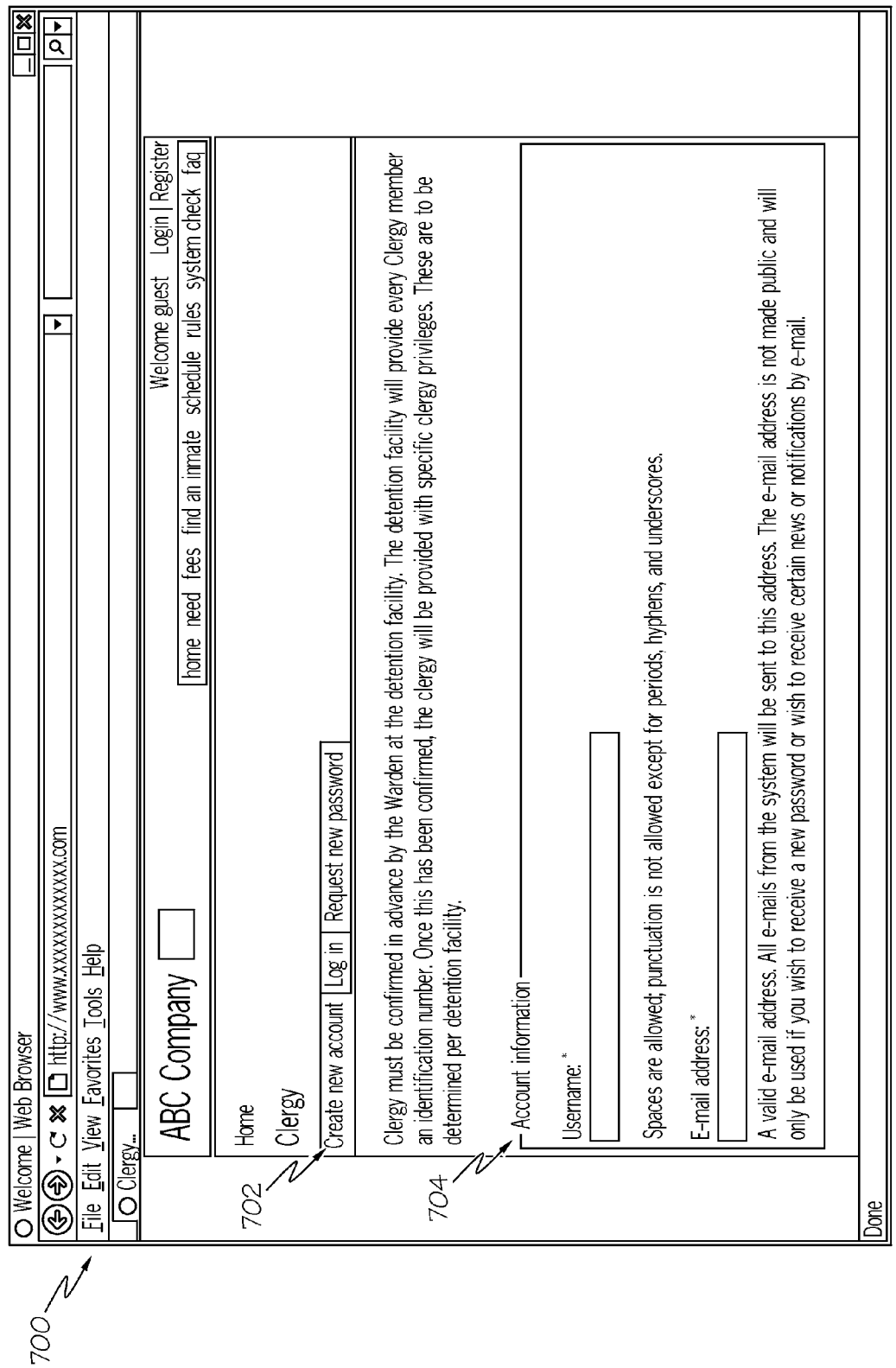
Figure 7B:
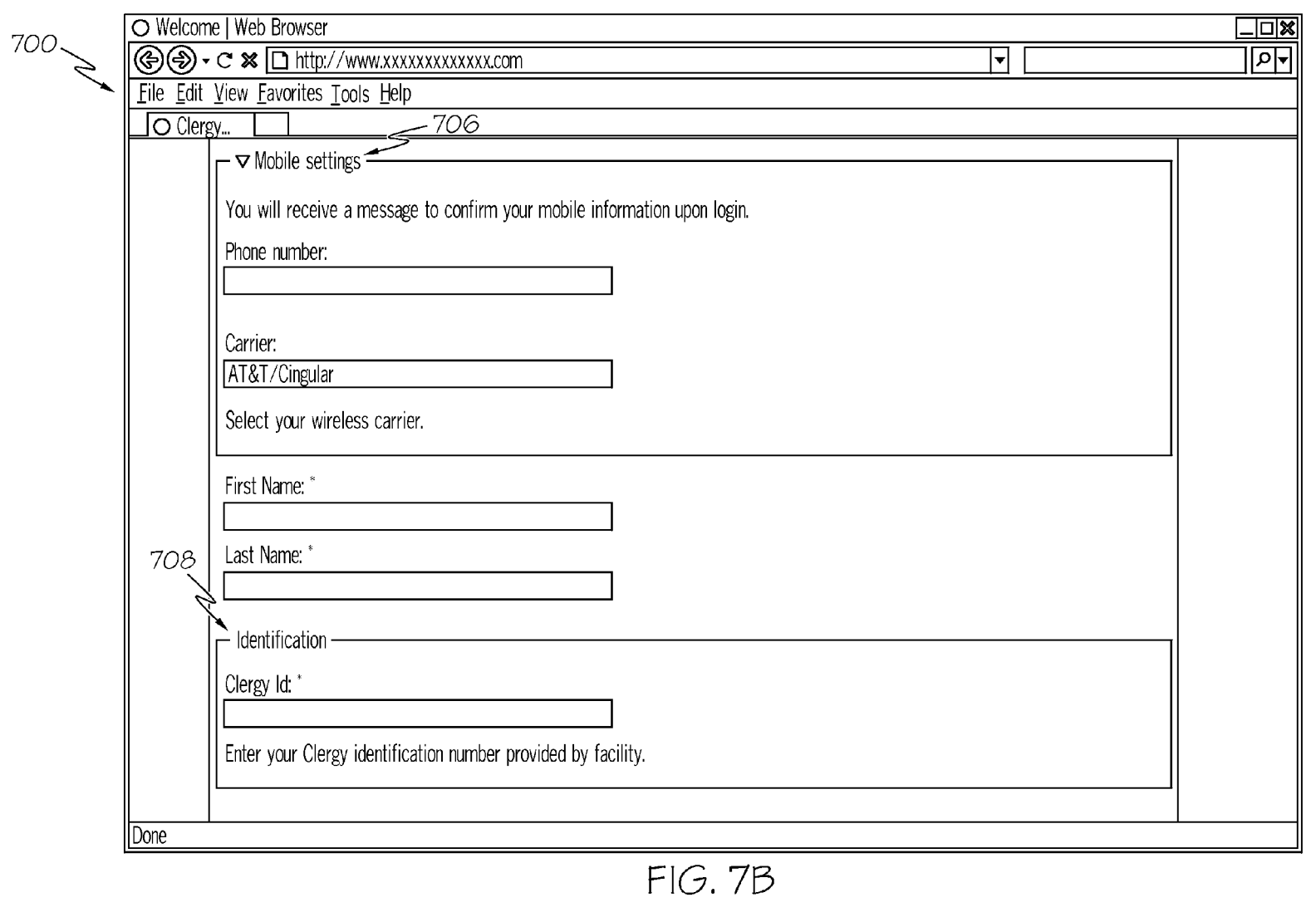
Figure 7C:
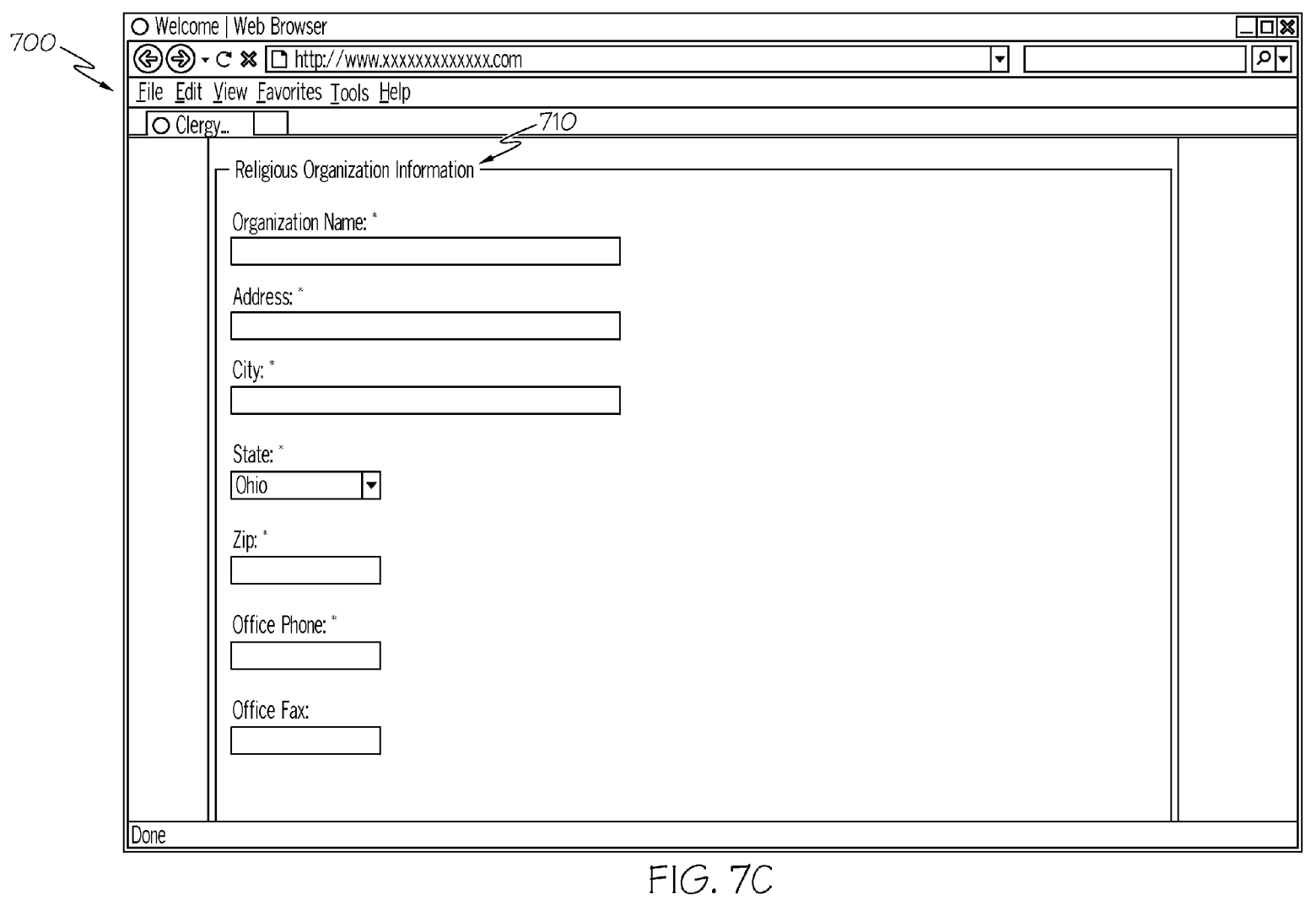
Figure 7D:
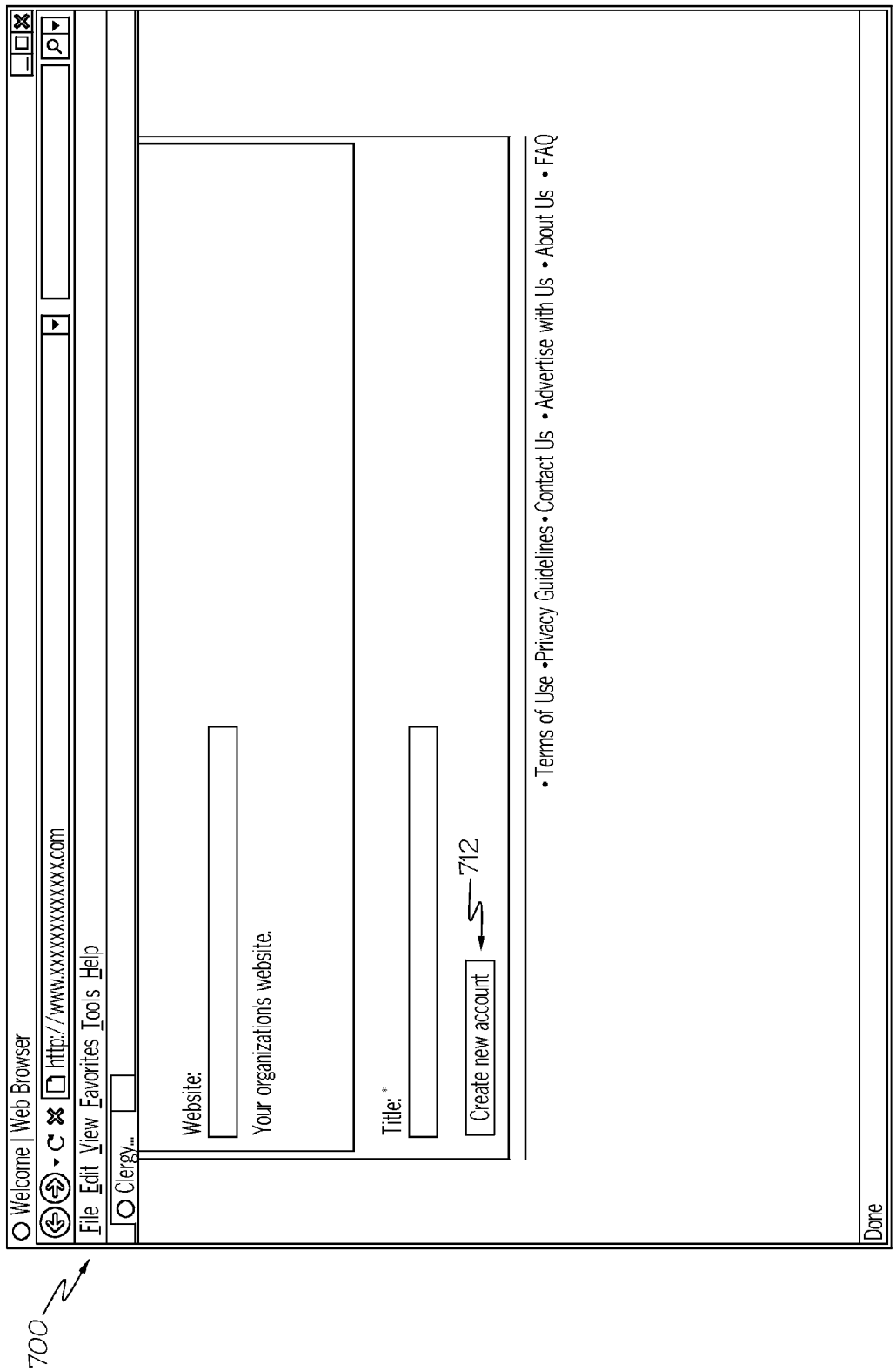

FIGS. 7A-7D depict a registration user interface 700 for accessing virtual visitation services as clergy, according to embodiments shown and described herein. As illustrated, the registration user interface 700 in FIG. 7A may be provided in response to selection of the clergy option 404c from FIG. 4 and includes a create new account option 702, as well as a login option and a request new password option. Under the create new account option 702 is information related to registering as a clergy visitor for video visitation services, as well as an account information portion 704. Under the account information portion 704 are a username text prompt and an email address text prompt. Additionally, in FIG. 7B, the registration user interface 700 includes a mobile settings portion 706, which includes a phone number text prompt and a carrier text prompt. Also included in the registration user interface 700 are a first name text prompt and a last name text prompt, as well as an identification portion 708. The identification portion 708 may include a clergy ID text prompt for the visitor to provide a clergy identification number. Illustrated in FIG. 7C, the registration user interface 700 includes a religious organization information portion 710, which includes text prompts for an organization name, address, city, state, zip code, office phone number, and office fax number. FIG. 7D further illustrates that the religious organization information portion 710 additionally includes a website text prompt. Also included in the registration user interface 700 is a title text prompt and a create new account option 712.

Figure 8A:
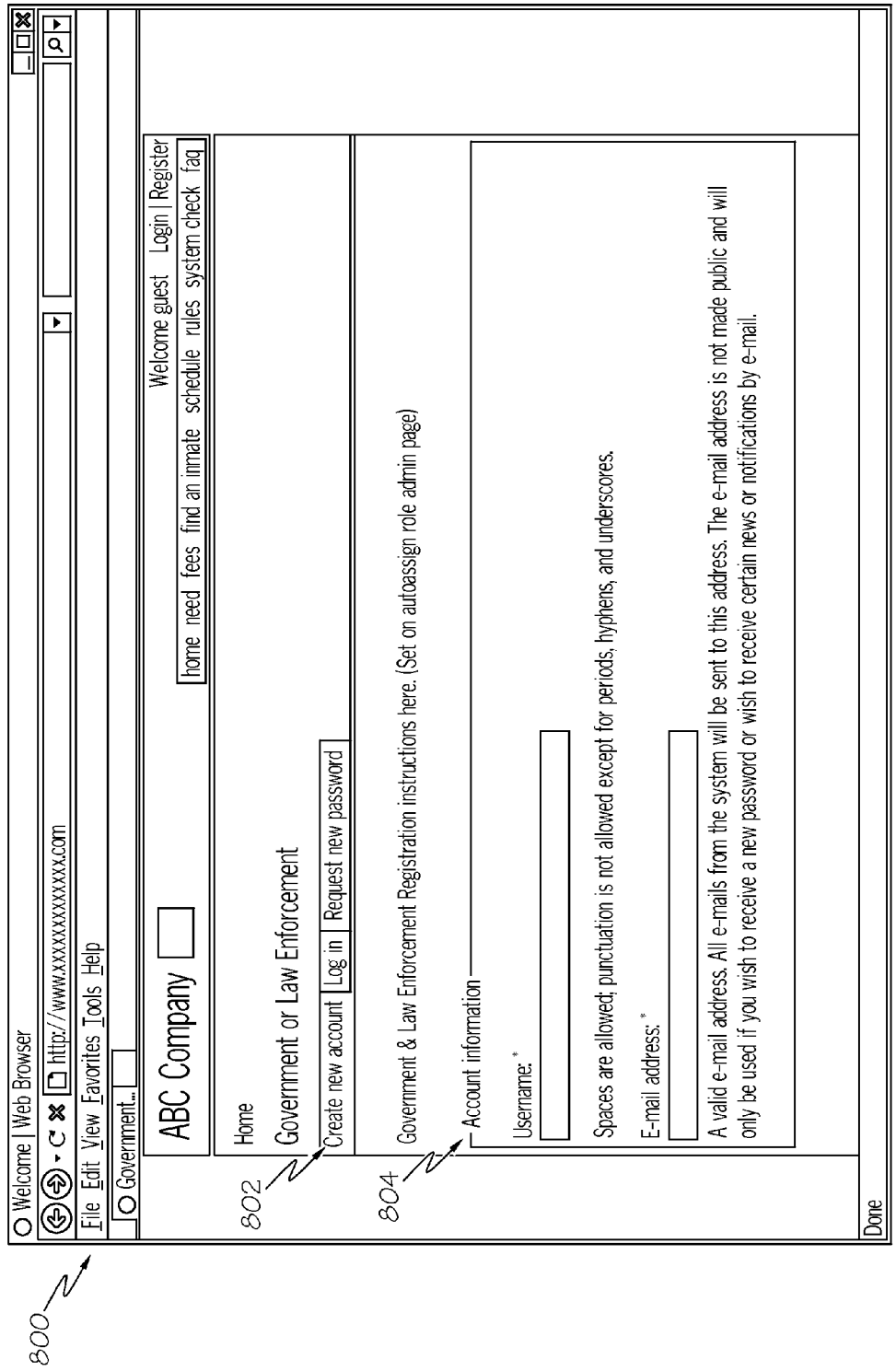
Figure 8B:
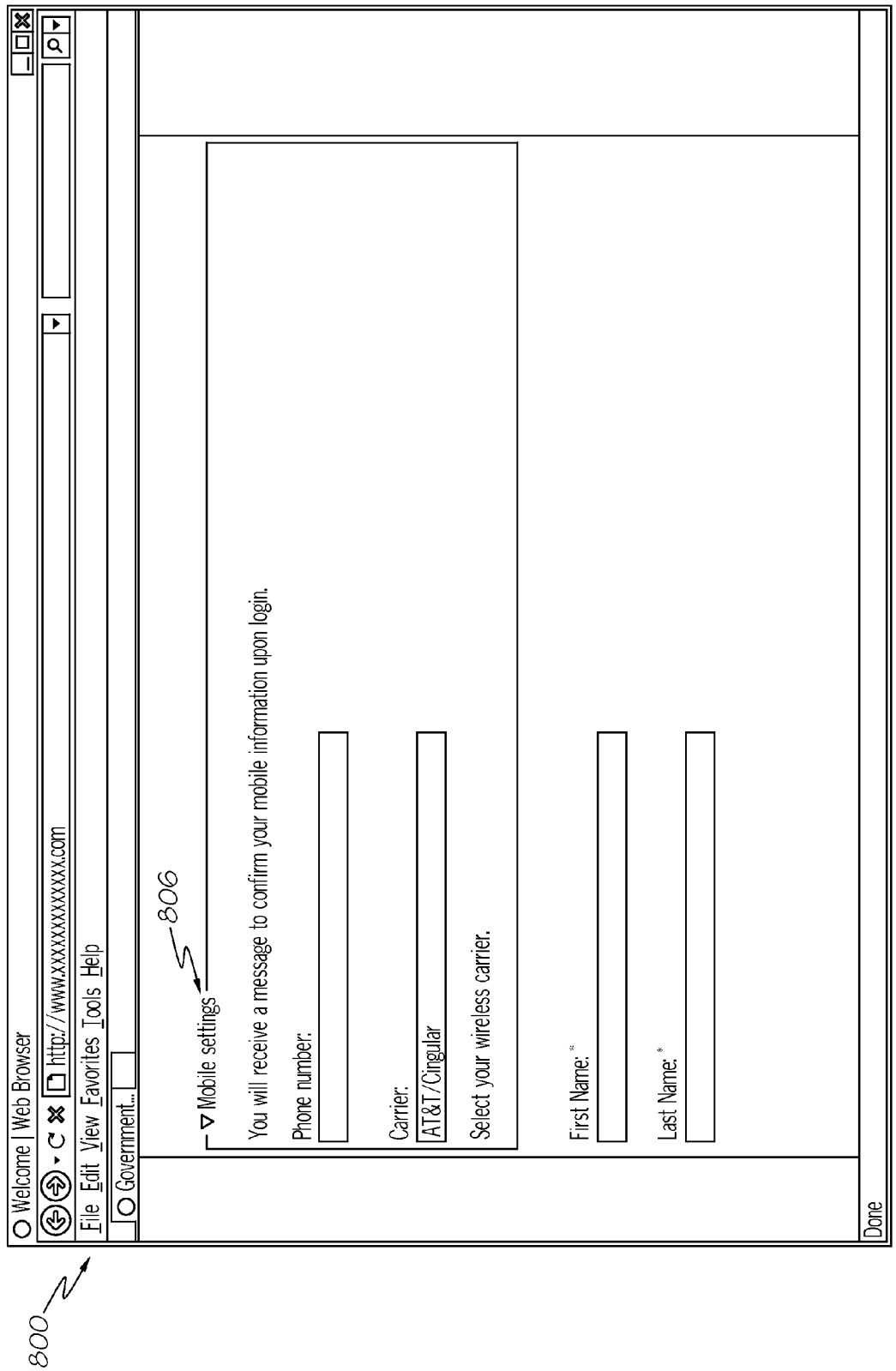
Figure 8C:
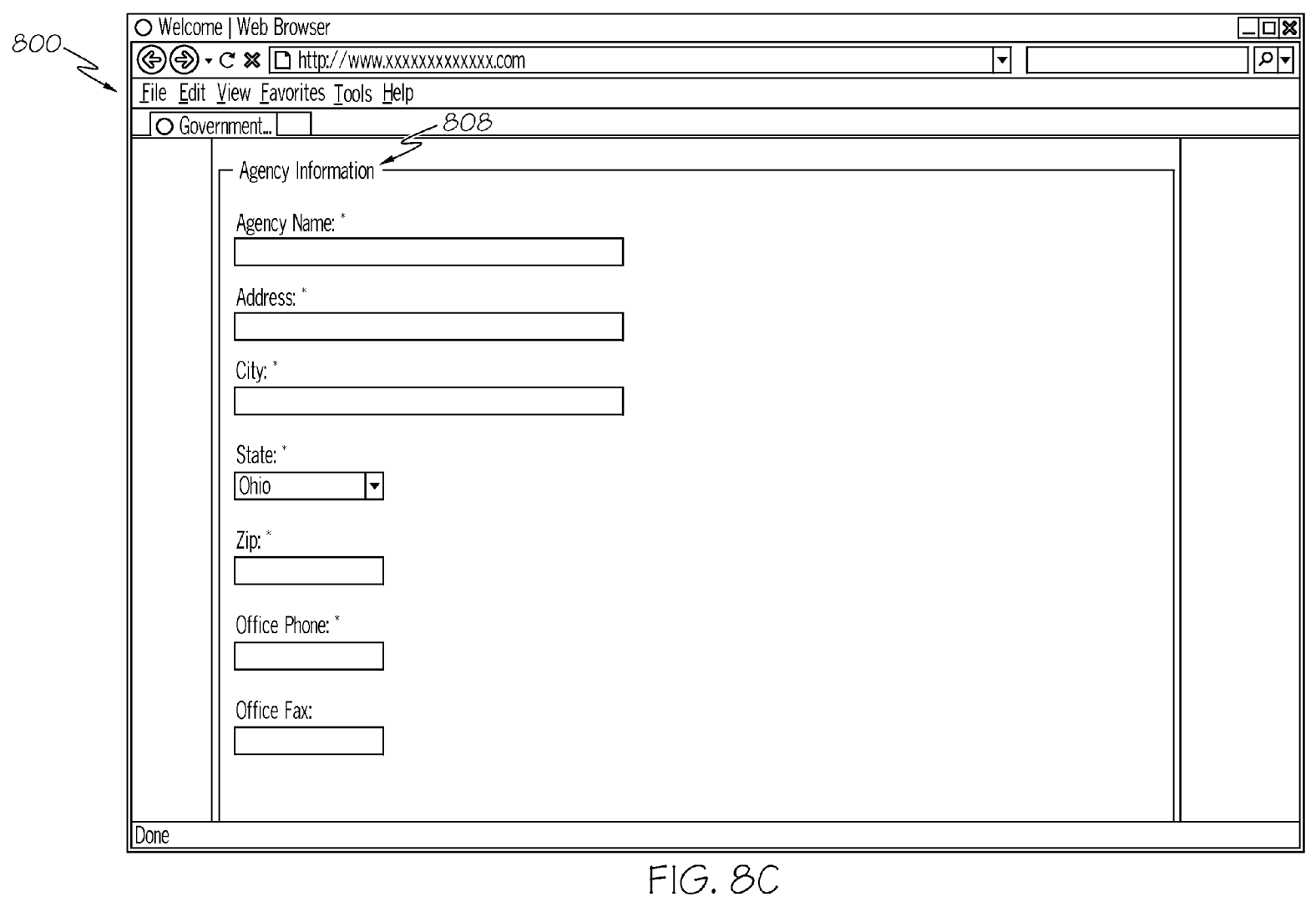
Figure 8D:
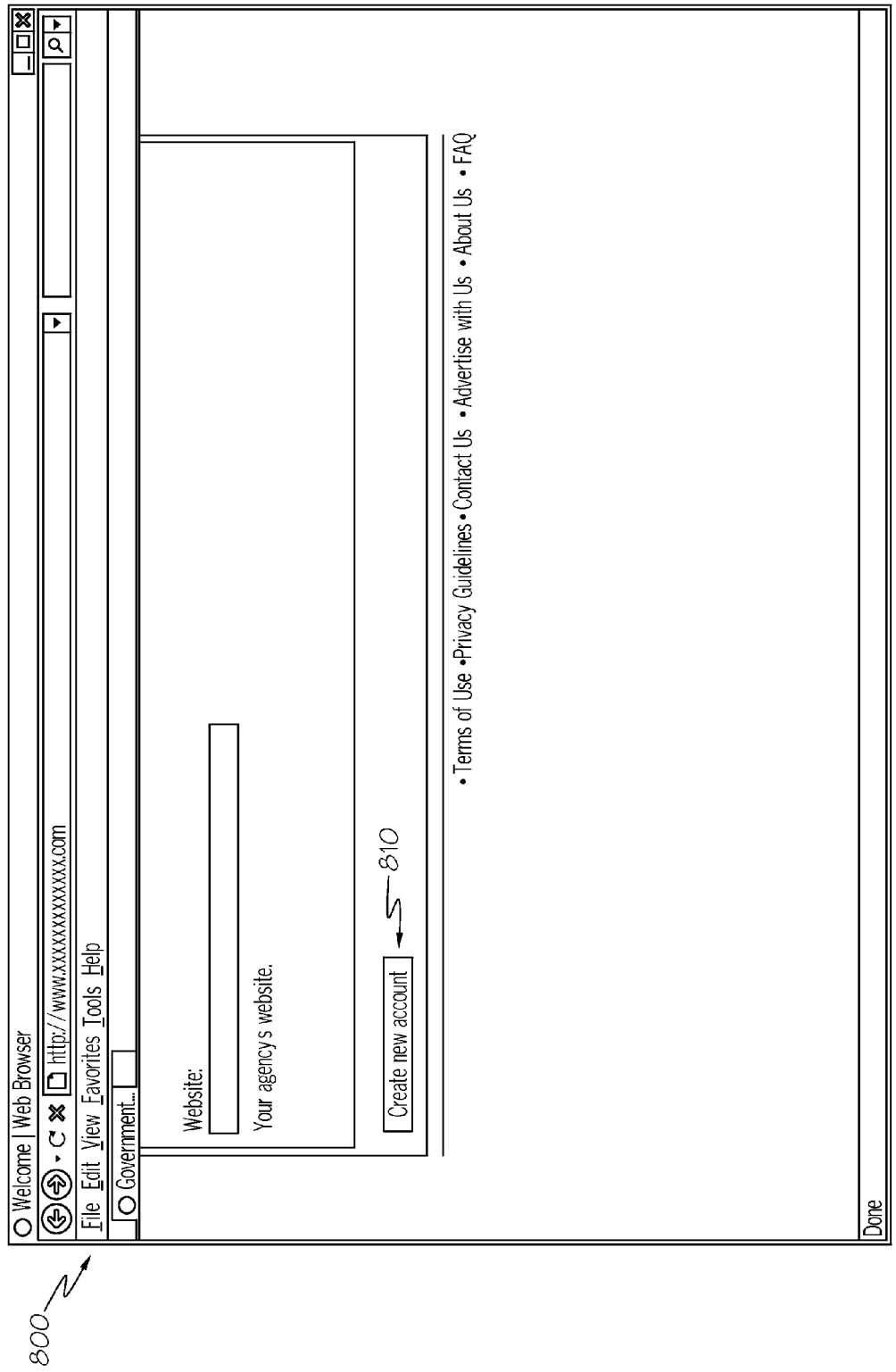

FIGS. 8A-8D depict a registration user interface 800 for accessing virtual visitation services as a government or law enforcement entity, according to embodiments shown and described herein. As illustrated in FIG. 8A, the registration user interface 800 may be provided in response to selection of the government of law enforcement option 404d from FIG. 4 and includes a create new account option 802 for creating a visitor account for a government and/or law enforcement officer. Also included are a login option and a request new password option. Under the create new account option 802 is an account information portion 804, which includes text prompts for a desired username and email address. Similarly, FIG. 8B depicts that the registration user interface 800 provides a mobile settings portion 806, which includes a phone number text prompt and a carrier text prompt. Also included in the registration user interface 800 depicted in FIG. 8B is a first name text prompt and last name text prompt. FIG. 8C depicts an agency information portion 808, which includes text prompts for an agency name, address, city, state, zip code, office phone number and office fax number. FIG. 8D further depicts that the agency information portion 808 includes a website text prompt. Also included in the registration user interface 800 is a create new account option 810.

Figure 9A:
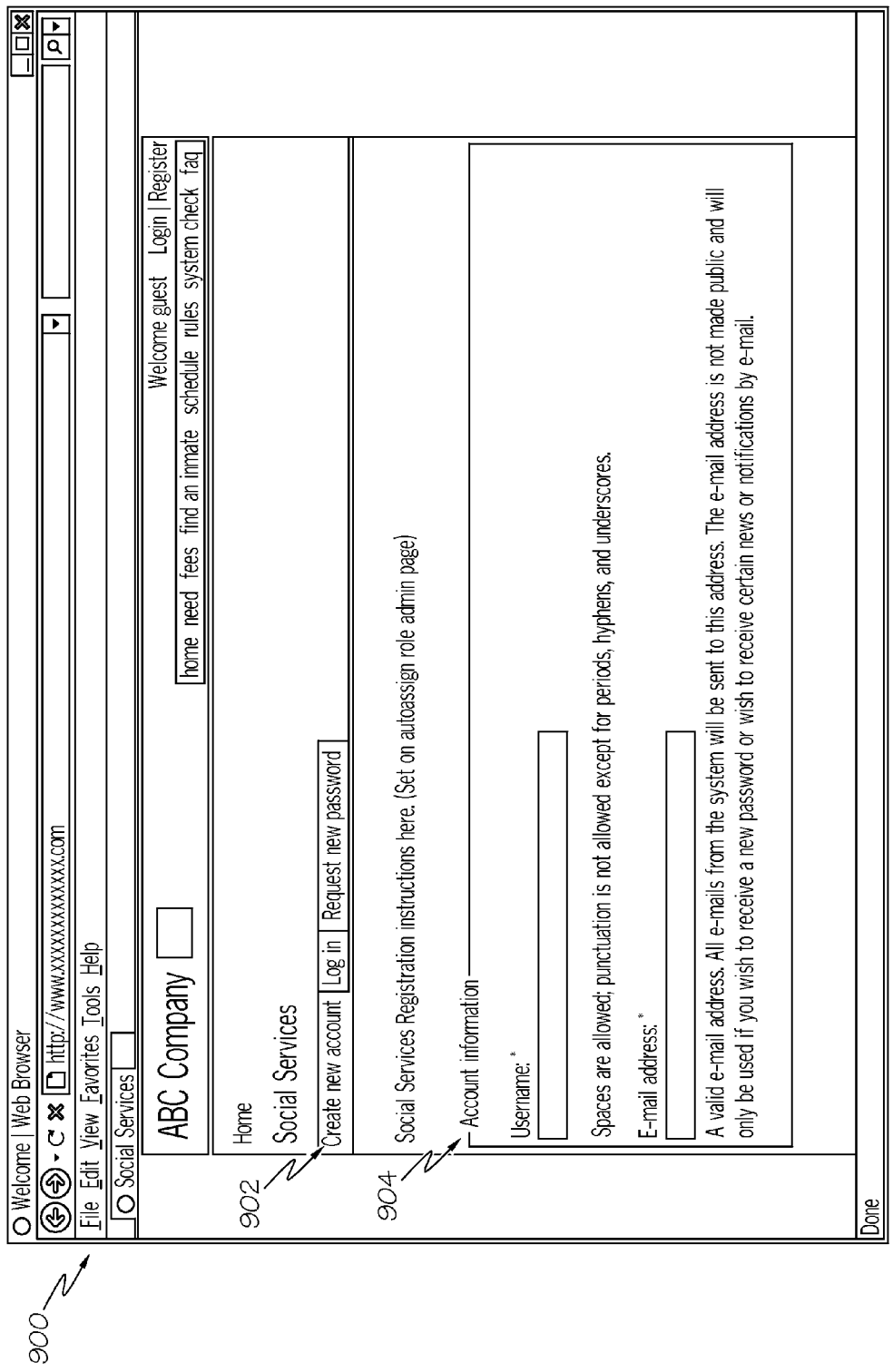
Figure 9B:
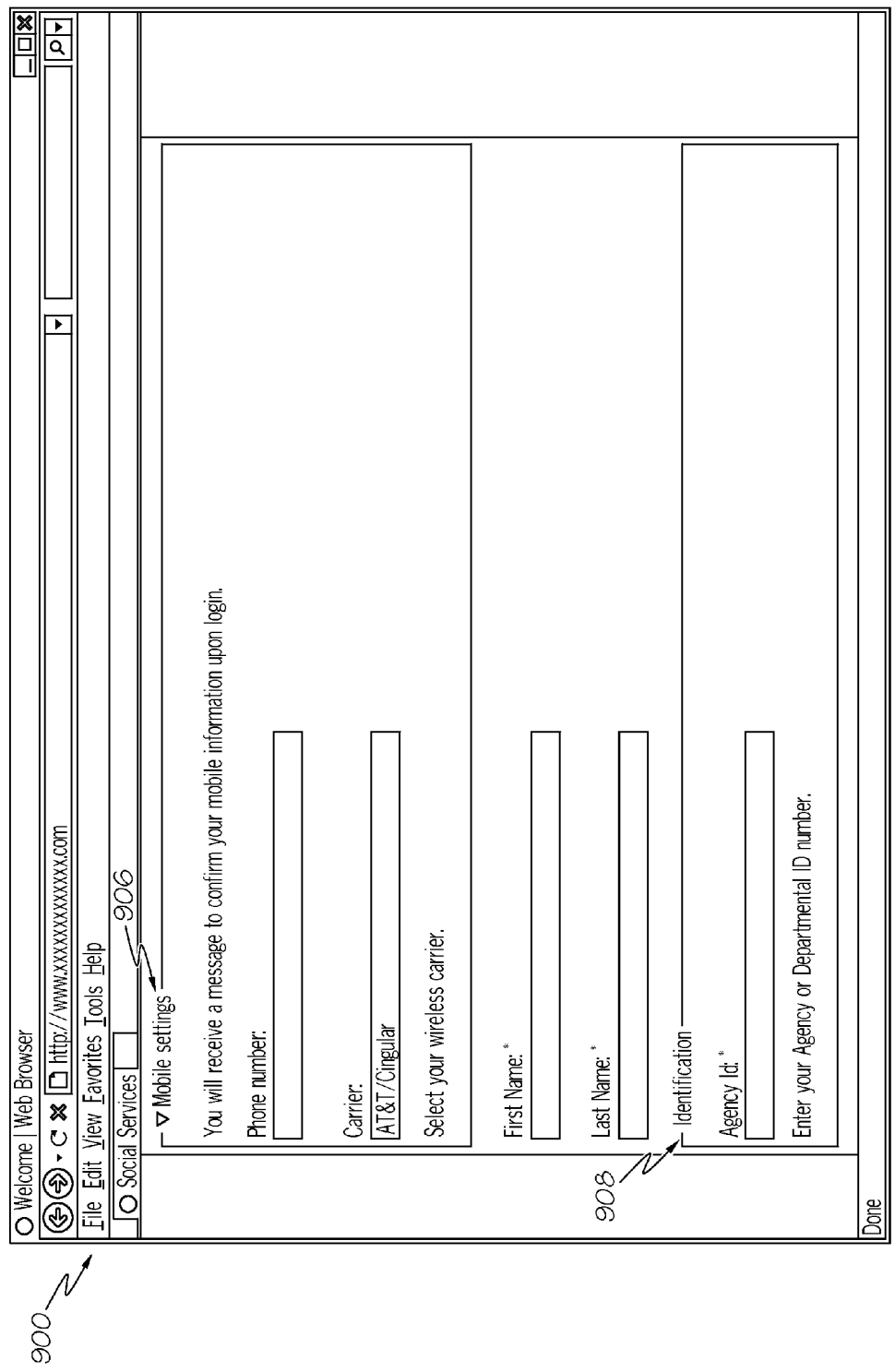
Figure 9C:
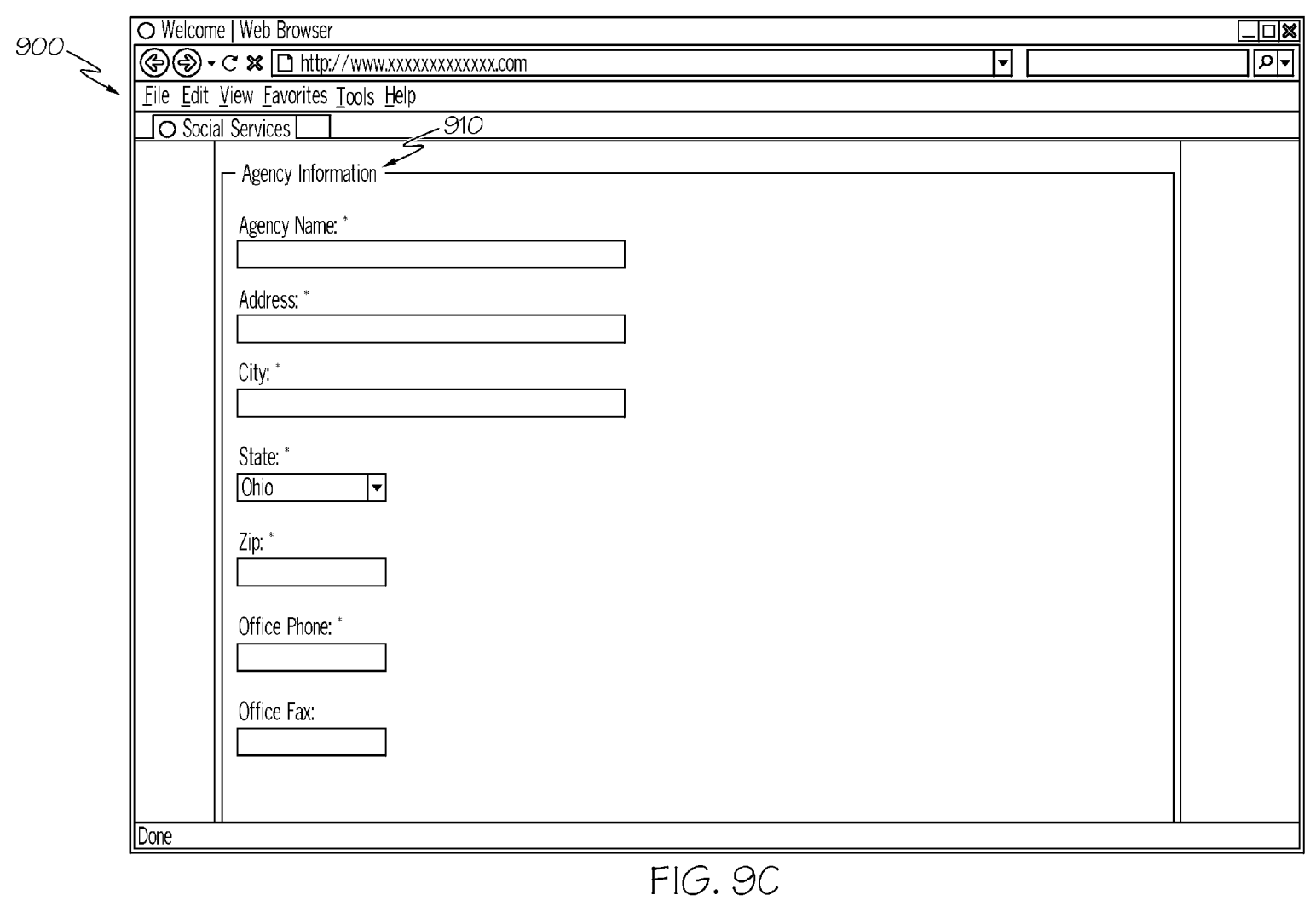
Figure 9D:
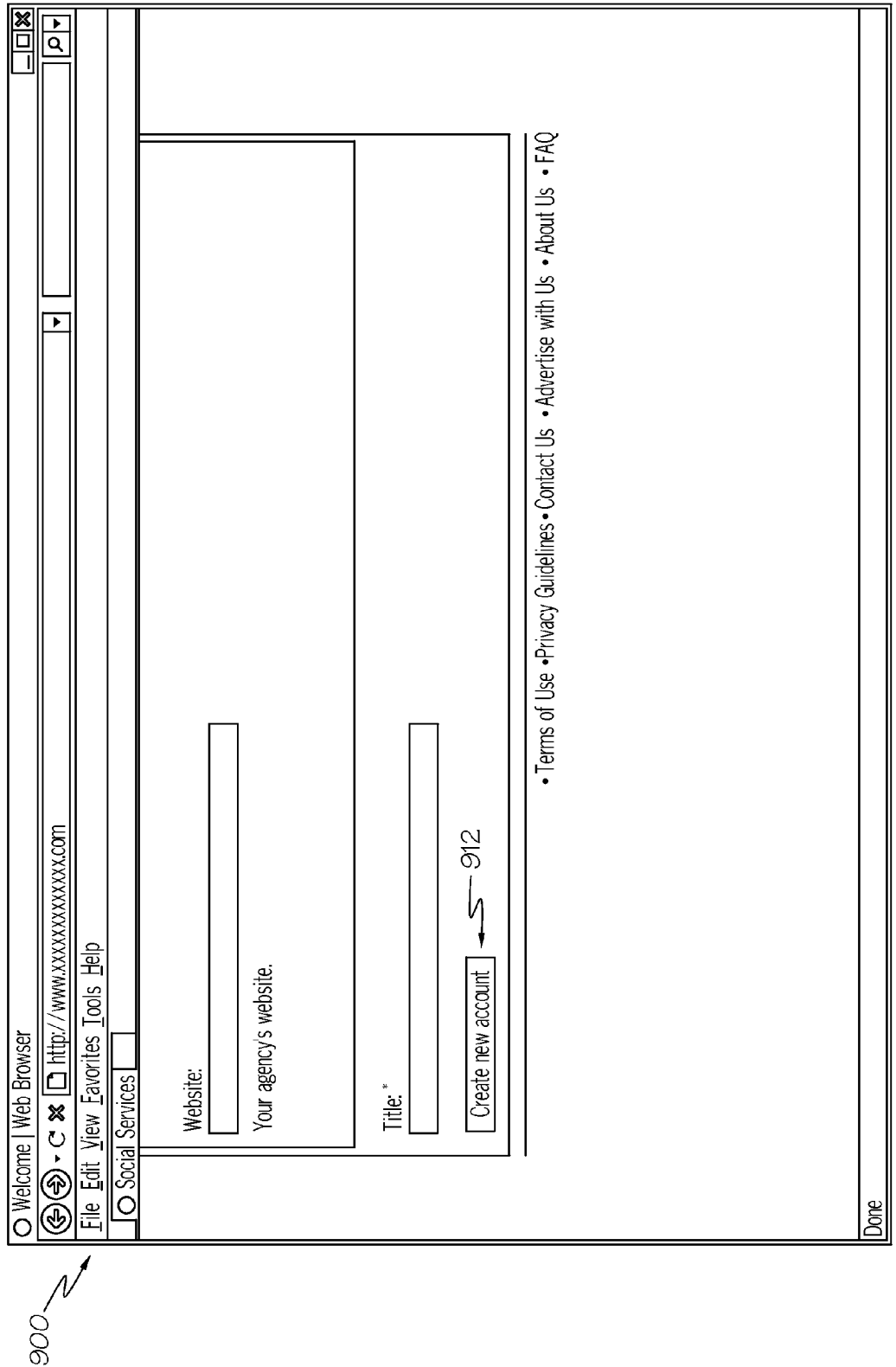

FIGS. 9A-9D depict a registration user interface 900 for accessing virtual visitation services as a social services entity, according to embodiments shown and described herein. As illustrated, in response to selection of the social services option 404e the registration user interface 900 may be provided and includes a create new account option 902, a login option, and a request new password option. Under the create new account option 902 is an account information portion 904, which includes text prompts for a desired username and email address. Additionally, as depicted in FIG. 9B, the registration user interface 900 further includes a mobile settings portion 906, which includes text prompts for a phone number and a carrier. Also included are a text prompt for a first name and a text prompt for a last name of the visitor. An identification portion 908 is also included and provides an agency identification field. Additionally, FIG. 9C depicts that the registration user interface 900 includes an agency information portion 910, which includes a text prompt for an agency name, a text prompt for an address, a text prompt for a city, an option for a state, and text prompts for a zip code, office phone number, and office fax number. Additionally, FIG. 9D depicts a website text prompt for indicating a website associated with the agency. At title text prompt is also included in the registration user interface 900, as well as a create new account option 912.

Figure 10:
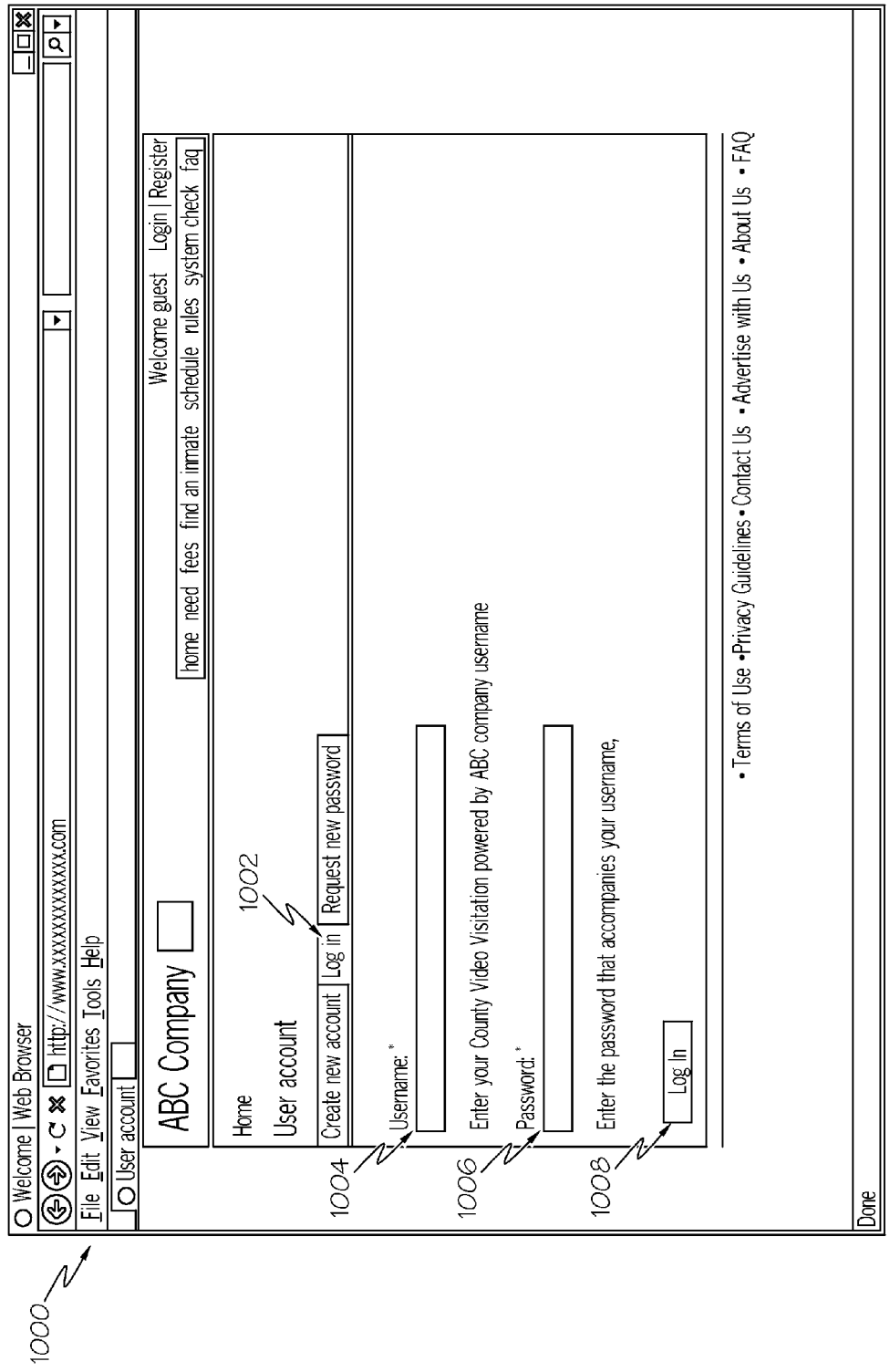
FIG. 10 depicts a user interface for logging into an existing account with the virtual visitation services, according to embodiments shown and described herein.

FIG. 10 depicts a user interface 1000 for logging into an existing account with the virtual visitation services, according to embodiments shown and described herein. More specifically, the user interface 1000 may be accessed from selecting the login options from FIGS. 5-9 and may include a username text prompt 1004 and a password text prompt 1006. Also included is a login activation option 1008.

Figure 11:
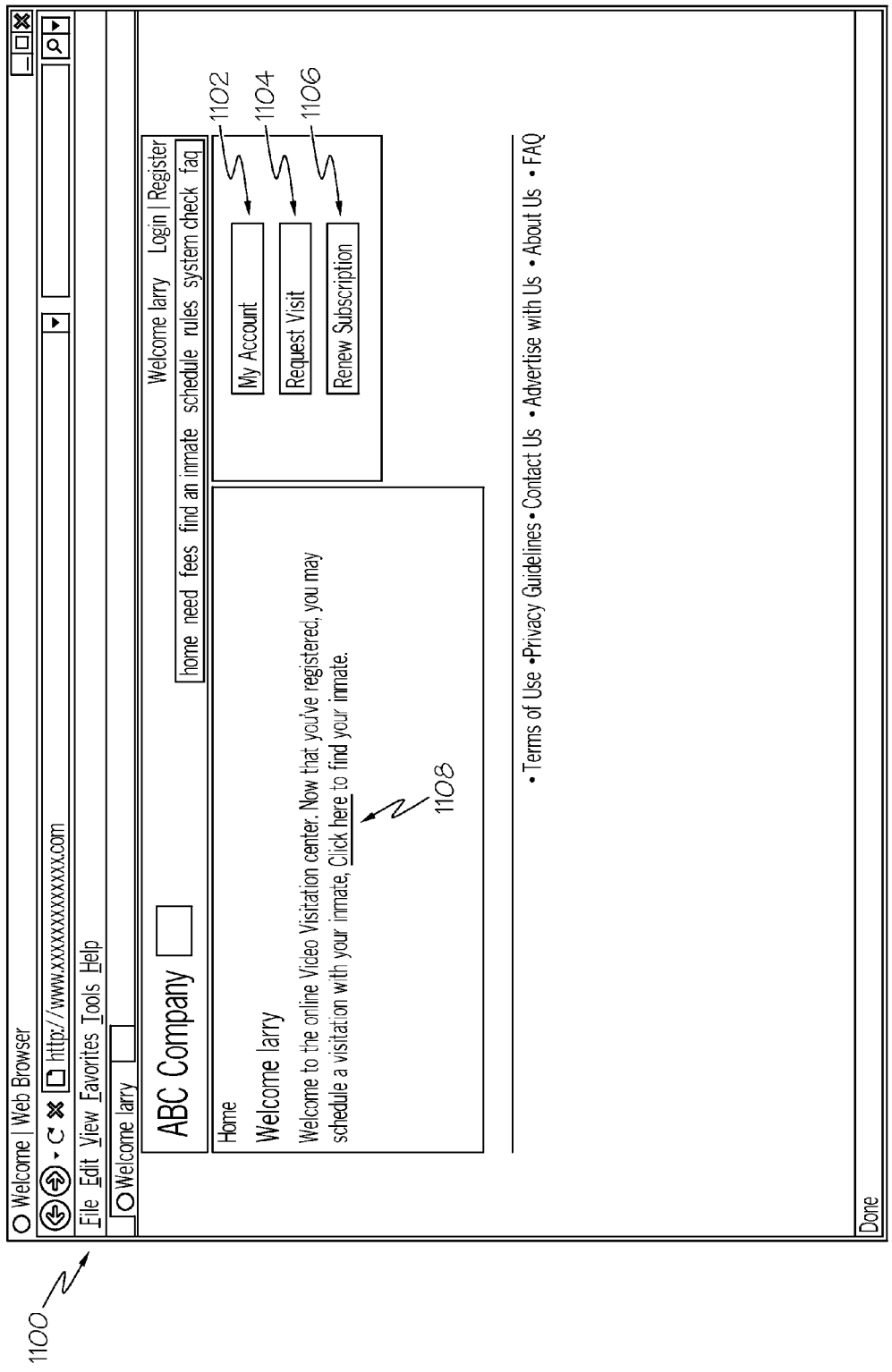
FIG. 11 depicts a user interface for providing options for conducting virtual visitation services, according to embodiments shown and described herein.

FIG. 11 depicts a user interface 1100 for providing options for conducting virtual visitation services, according to embodiments shown and described herein. As illustrated, the user interface 1100 may be provided in response to creating an account in FIGS. 5-9 and/or logging into an account as depicted in FIG. 10. Regardless, the user interface 1100 includes a my account option 1102 for accessing account information. Also included is a request visit option 1104 for requesting a visit, a renew subscription 1106, and a find your inmate option 1180.

Figure 12A:
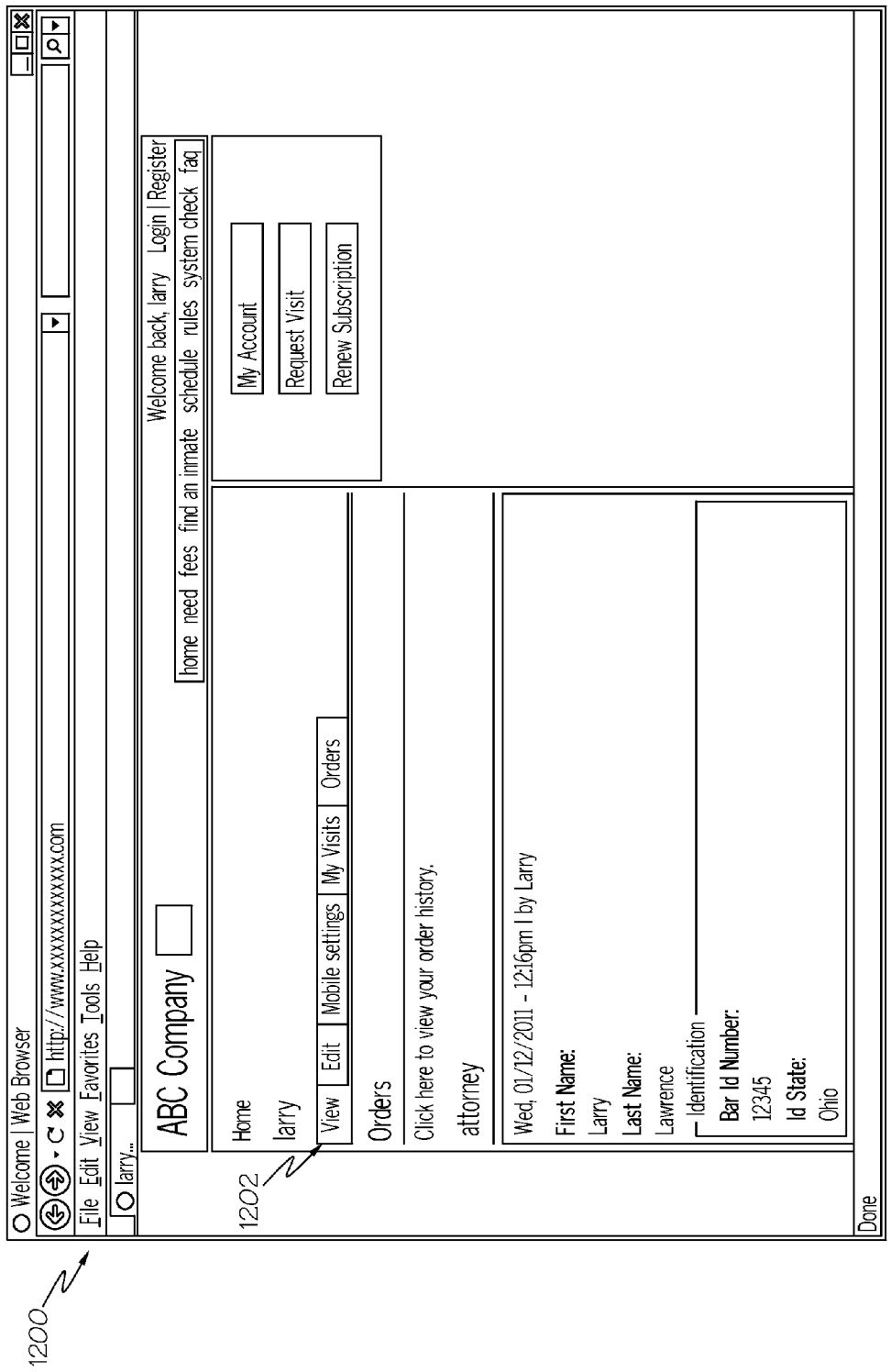
FIGS. 12A-12B depict a user interface for providing account information for a user, according to embodiments shown and described herein.
Figure 12B:
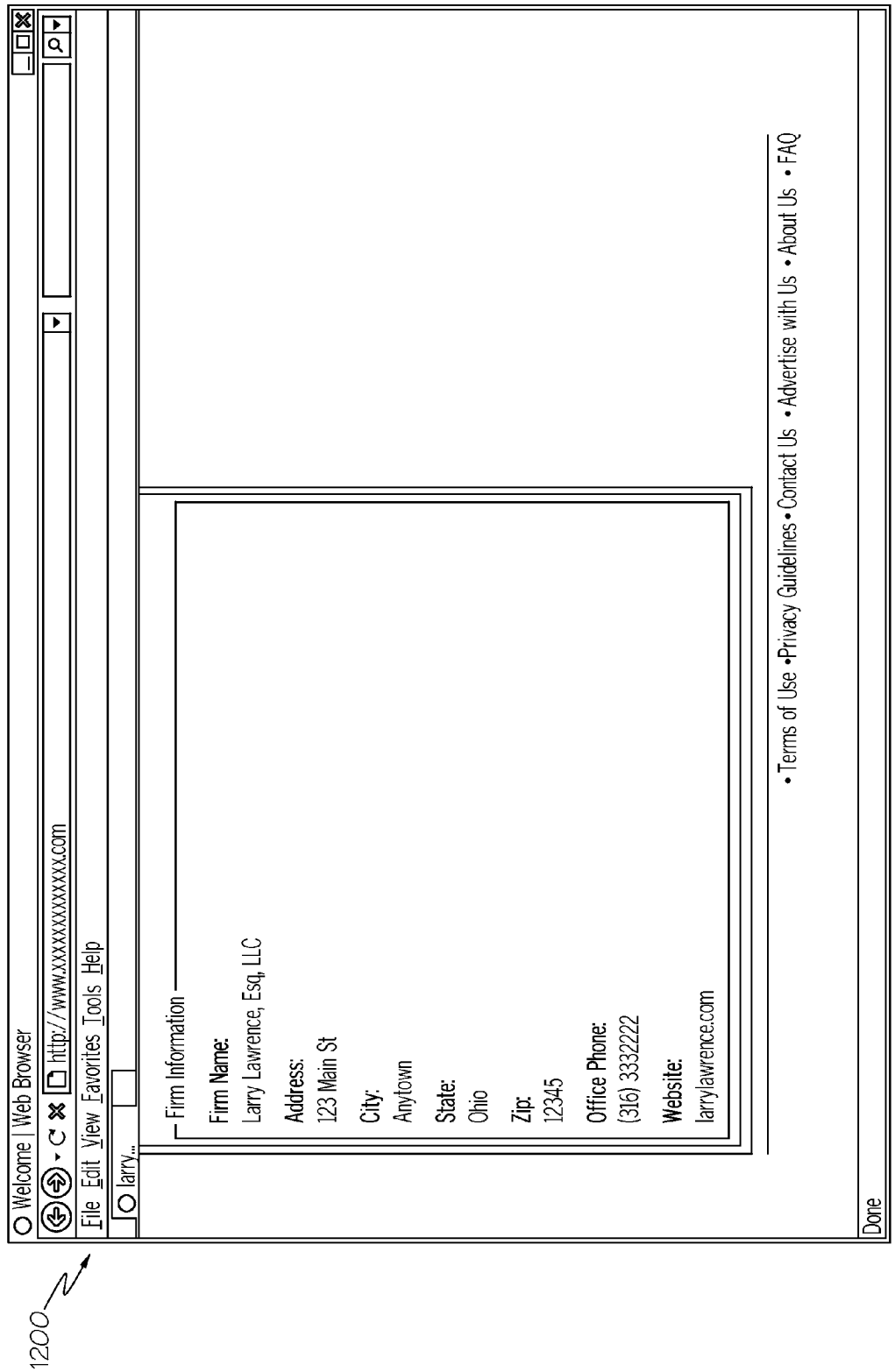

FIGS. 12A-12B depict a user interface 1200 for providing account information for a user, according to embodiments shown and described herein. As illustrated, the user interface 1200 may be provided in response to selection of the my account option 1102 from FIG. 11. Additionally included in the user interface 1100 is a view option 1202, an edit option, a mobile settings option, a my visits options, and an orders options. As an example, under the view option 1202 are an orders section, for viewing order history. An attorney section indicates that the visitor is registered as an attorney and further indicates identification information, as provided by the visitor in FIGS. 6A-6C. Similarly, in FIG. 12B, firm information is provided, as also provided by the visitor in FIGS. 6A-6C. Similar information may be provided for other types of visitors, as registered in FIGS. 5 and 7-9.

Figure 13A:
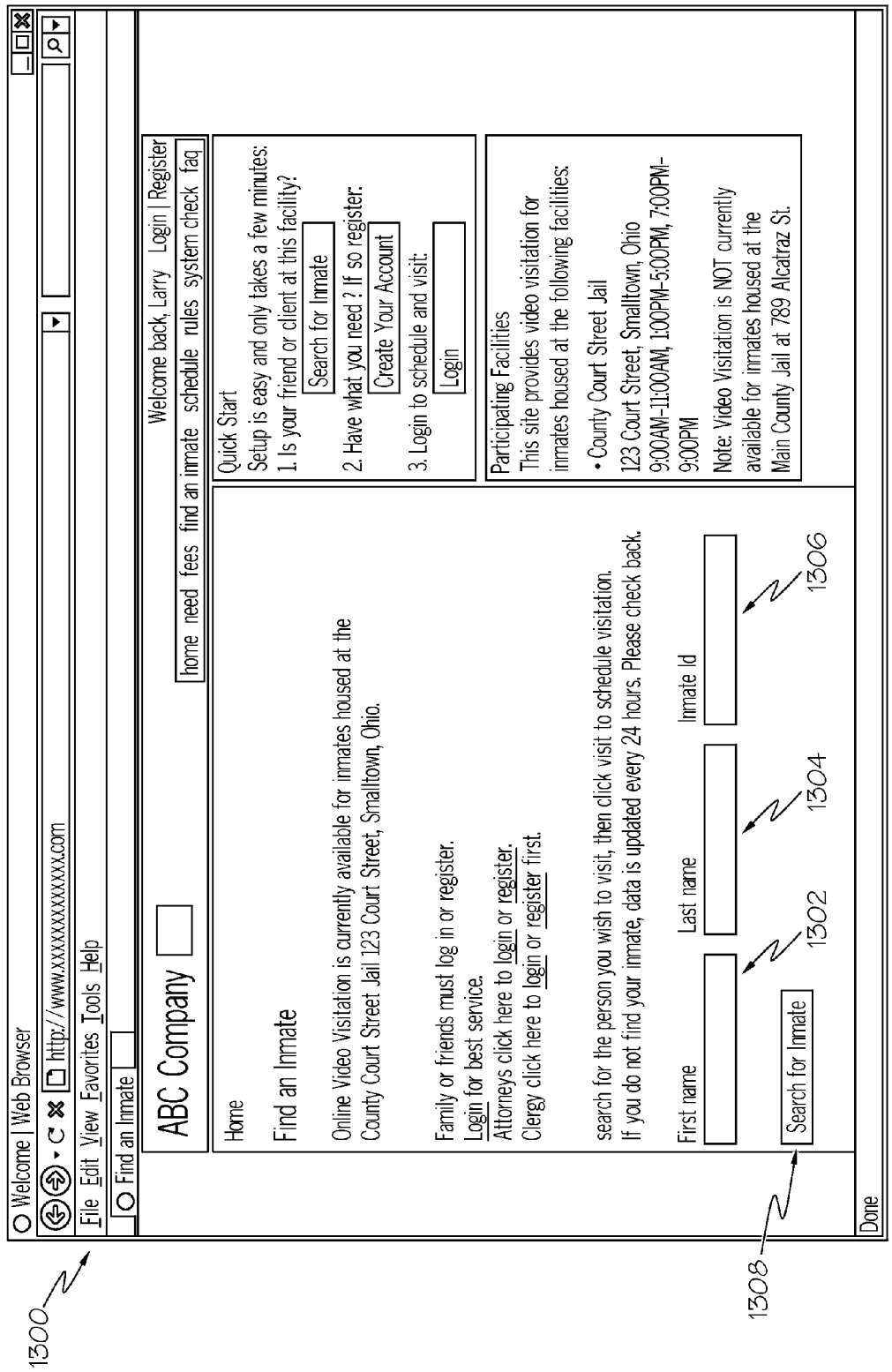

FIGS. 13A-13B depict a search user interface 1300 for providing inmate searching capabilities, according to embodiments shown and described herein. As illustrated in FIG. 13A, the user interface 1300 may be provided in response to selection of the request visit option 1104 or the find your inmate option 1108. Additionally, the user interface 1300 includes a first name field 1302, a last name field 1304, and an inmate identification number field 1306. After entering information into one or more of the fields 1302, 1304, and 1306, the visitor can select a search for inmate option 1308 to begin the search process. Additionally, as depicted in FIG. 13B, an inmate list 1310 is provided to the visitor, indicating each of the inmates that match the search criteria. Also included are birthdays and dates of confinement. A visit option 1312 is also included for the visitor to select the desired inmate.

Figure 14:
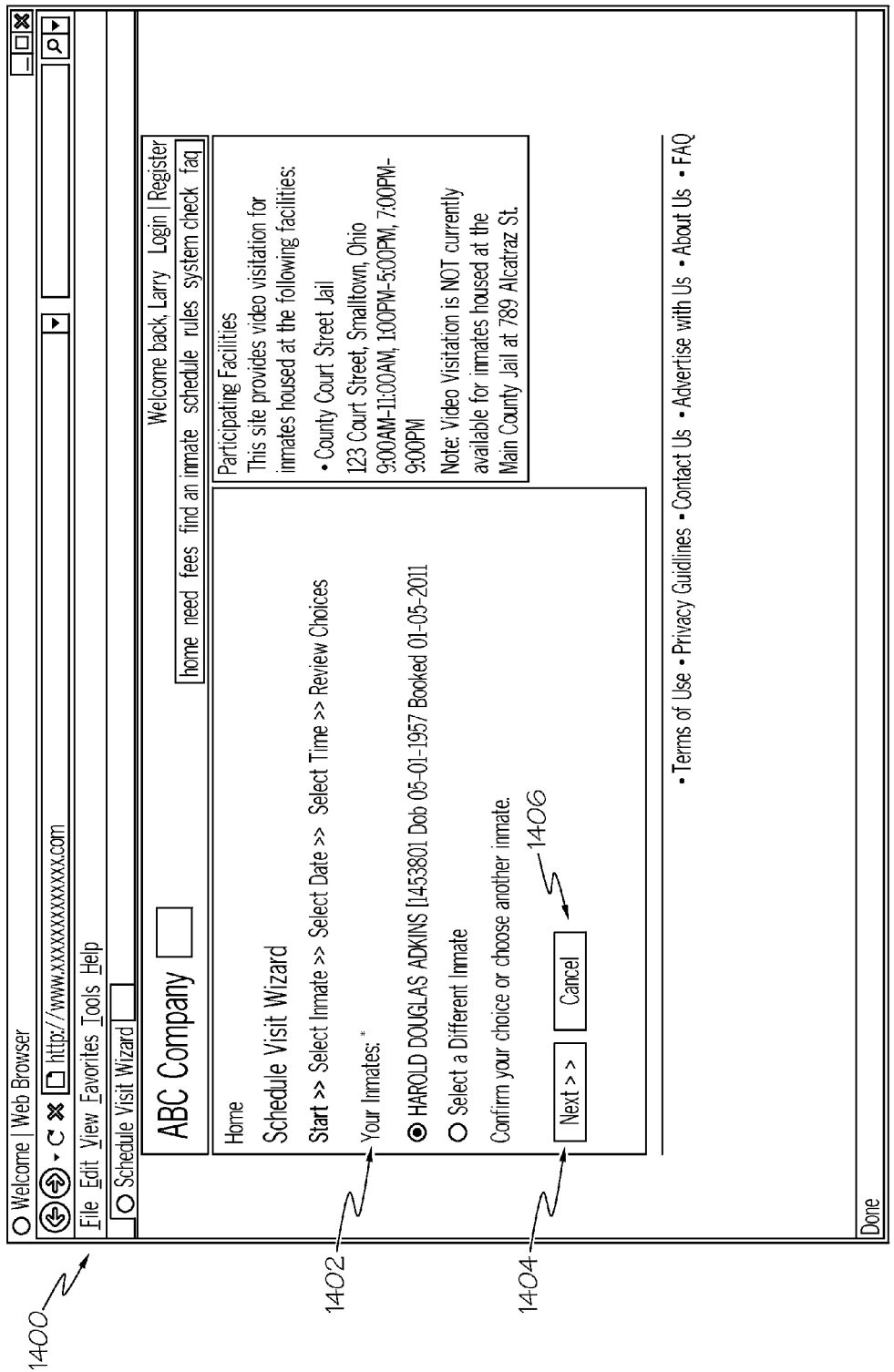
FIG. 14 depicts a user interface for scheduling a virtual visit, according to embodiments shown and described herein.

FIG. 14 depicts a user interface 1400 for scheduling a virtual visit, according to embodiments shown and described herein. As illustrated, the user interface 1400 may be provided in response to selection of the visit option 1312 from FIG. 13 and includes an inmates section 1402 that lists the one or more inmates that were selected by the visitor. The visitor can confirm that the one or more listed inmates are the desired inmates and/or request to select a different inmate. Upon making the desired selection, the user may select a next option 1404. If the visitor wishes to cancel the visitation request, the visitor may select a cancel option 1406

FIG. 15 depicts a user interface 1500 for selecting a virtual visit date and length, according to embodiments shown and described herein. As illustrated, the user interface 1500 may be provided in response to selection of the next option 1404 from FIG. 14 and may include an information section 1502. The information section 1502 may include data regarding the inmate that is selected, the facility where that inmate is located, and/or other information. Also included is a visit length portion 1504, which includes one or more choices of a desired duration of the virtual visit. As different prices may be associated with different length visits, a plurality options may be provided. Additionally, while the example of FIG. 15 illustrates pricing options that are calculated by the minute, other pricing schemes may also be provided, such as block pricing (e.g., purchase 5 30 minute visits for a predetermined price or purchase 120 minutes of visits to be allocated as desired) and/or other pricing schemes. Visitors may be given the option to purchase a plurality of visits for a reduced cost and/or select other options. Also included is a visit date option 1506 for allowing the visitor to indicate and/or verify a date for the virtual visitation. A next option 1508 is also provided to advance scheduling of the virtual visitation.

Figure 16A:
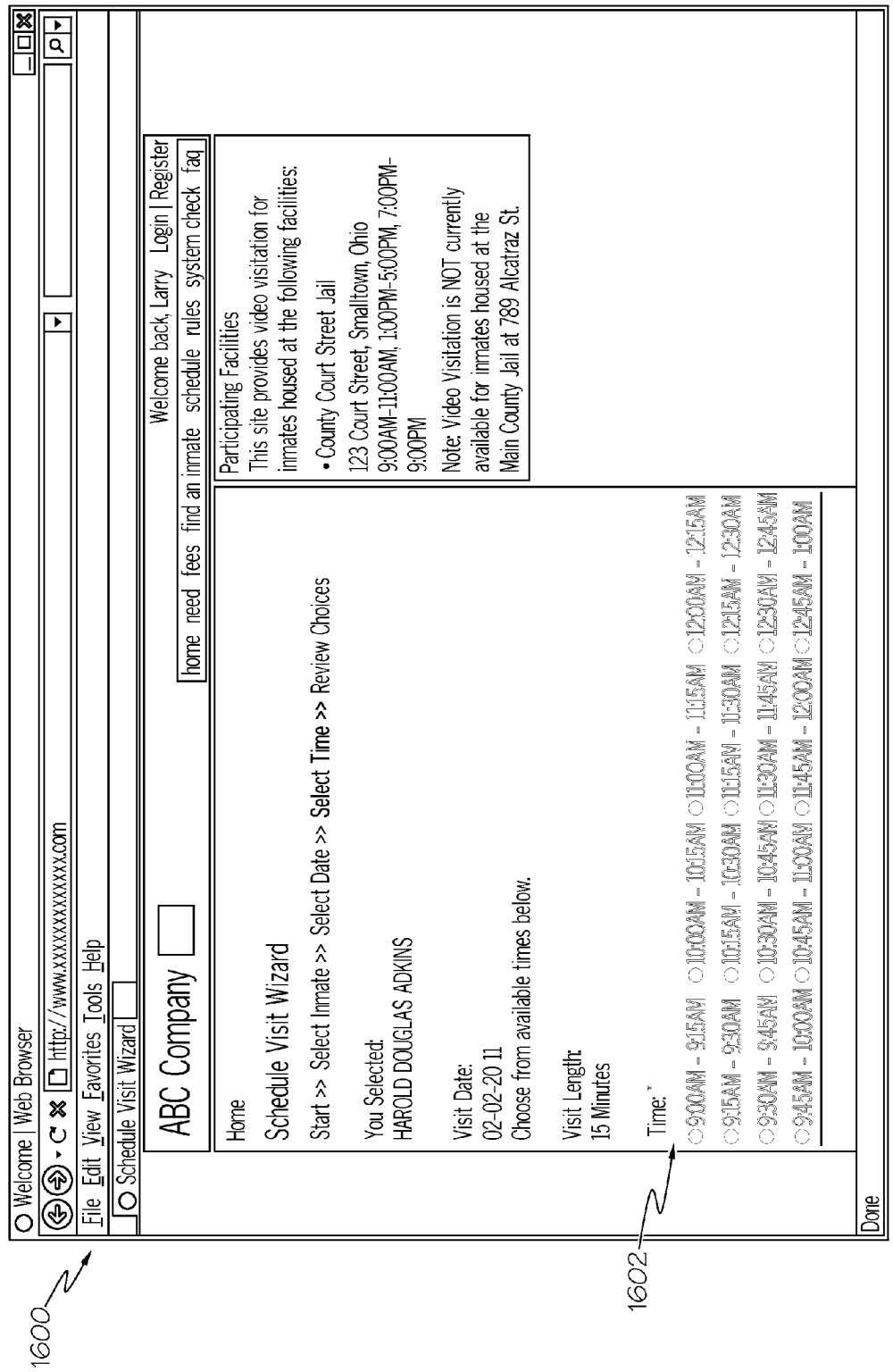
FIGS. 16A-16B depict a user interface for selecting a time for scheduling a virtual visitation, according to embodiments shown and described herein.
Figure 16B:
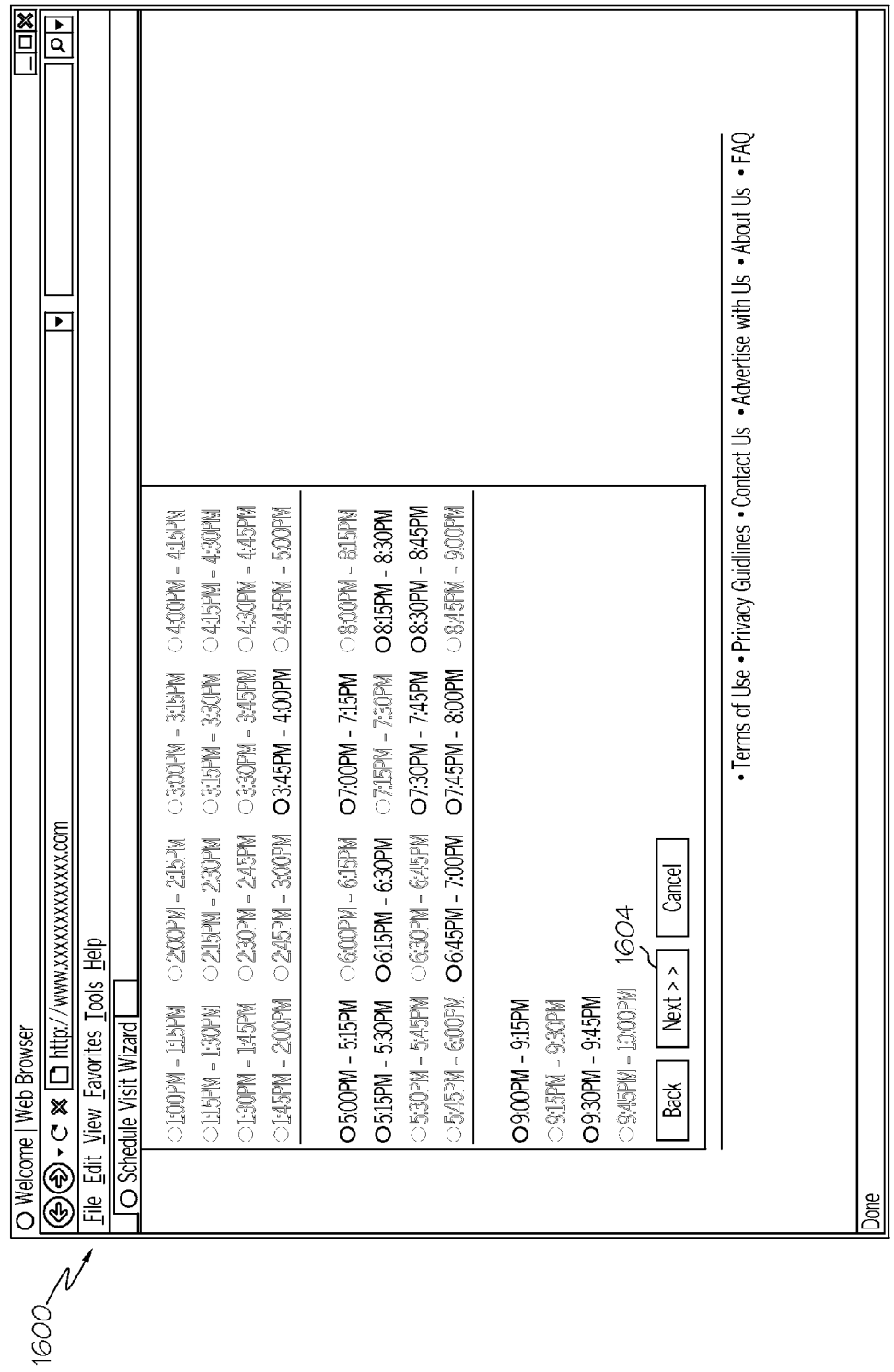

FIGS. 16A-16B depict a user interface 1600 for selecting a time for scheduling a virtual visitation, according to embodiments shown and described herein. As illustrated, the user interface 1600 may be provided in response to a visitor selection of the next option 1508 from FIG. 15 and may include a time section 1602. The time section 1602 may include one or more options for selecting a desired time to conduct the virtual visitation. The one or more options may be determined based on availability of the inmate, visiting hours of the facility, and/or other data. Also included is a next option 1604. Upon selecting the desired time, the visitor may select the next option 1604 to advance the scheduling process.

Additionally, while not explicitly depicted in FIGS. 16A and 16B, an option for scheduling an in-person visitation may also be provided. This can allow a potential visitor with the ability to register online and then decide whether an in-person visitation or a virtual visitation is desired.

Figure 17:
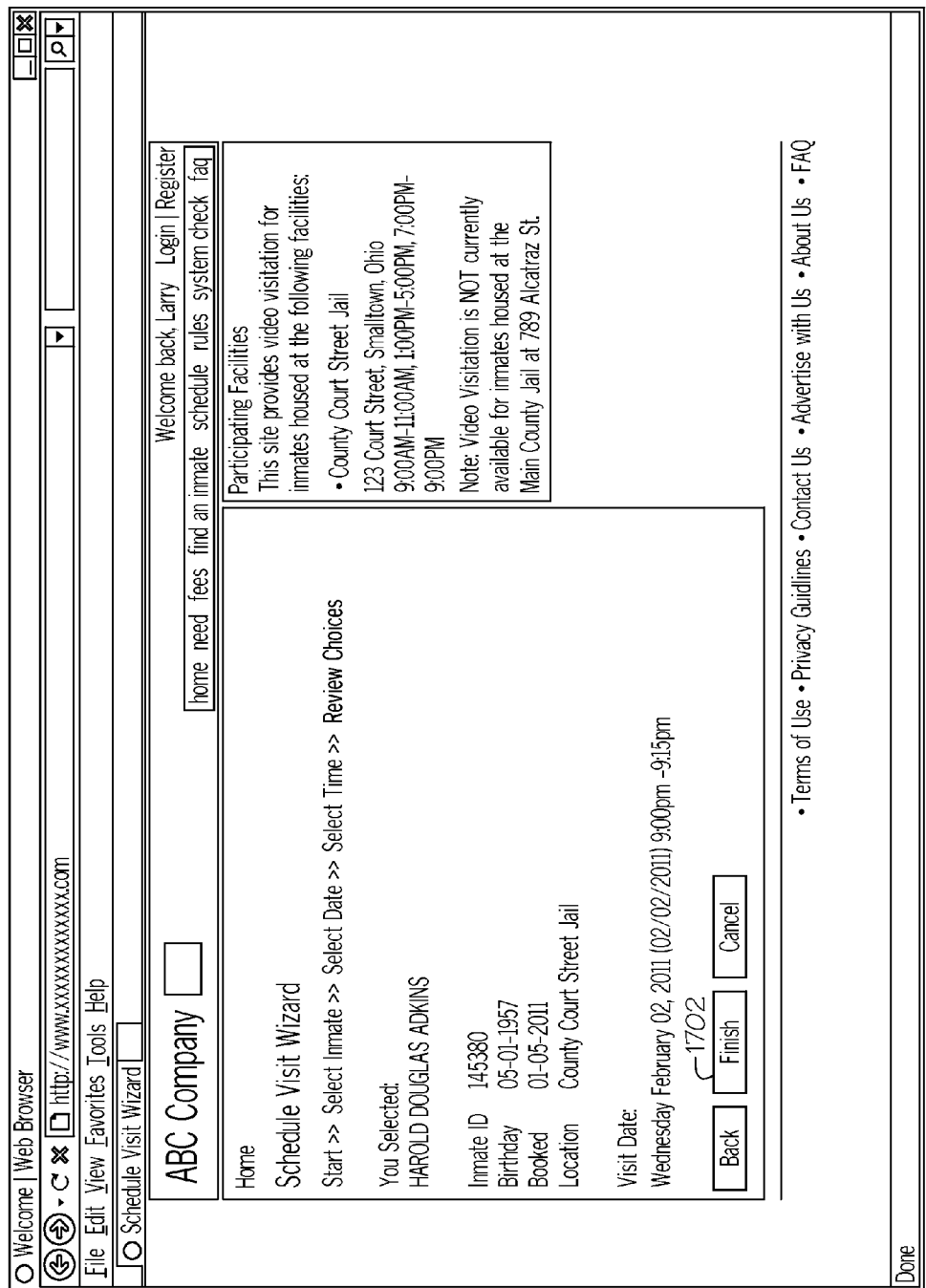
FIG. 17 depicts a user interface for verifying a selected schedule for a virtual visitation, according to embodiments shown and described herein.

FIG. 17 depicts a user interface 1700 for verifying a selected schedule for a virtual visitation, according to embodiments shown and described herein. As illustrated, in response to selection of the next option 1604 from FIG. 16A, the user interface 1700 may be provided. The user interface 1700 may include confirmation data for allowing the visitor to review the virtual visitation information. If the information is correct, the visitor may select a finish option 1702.

Figure 18A:
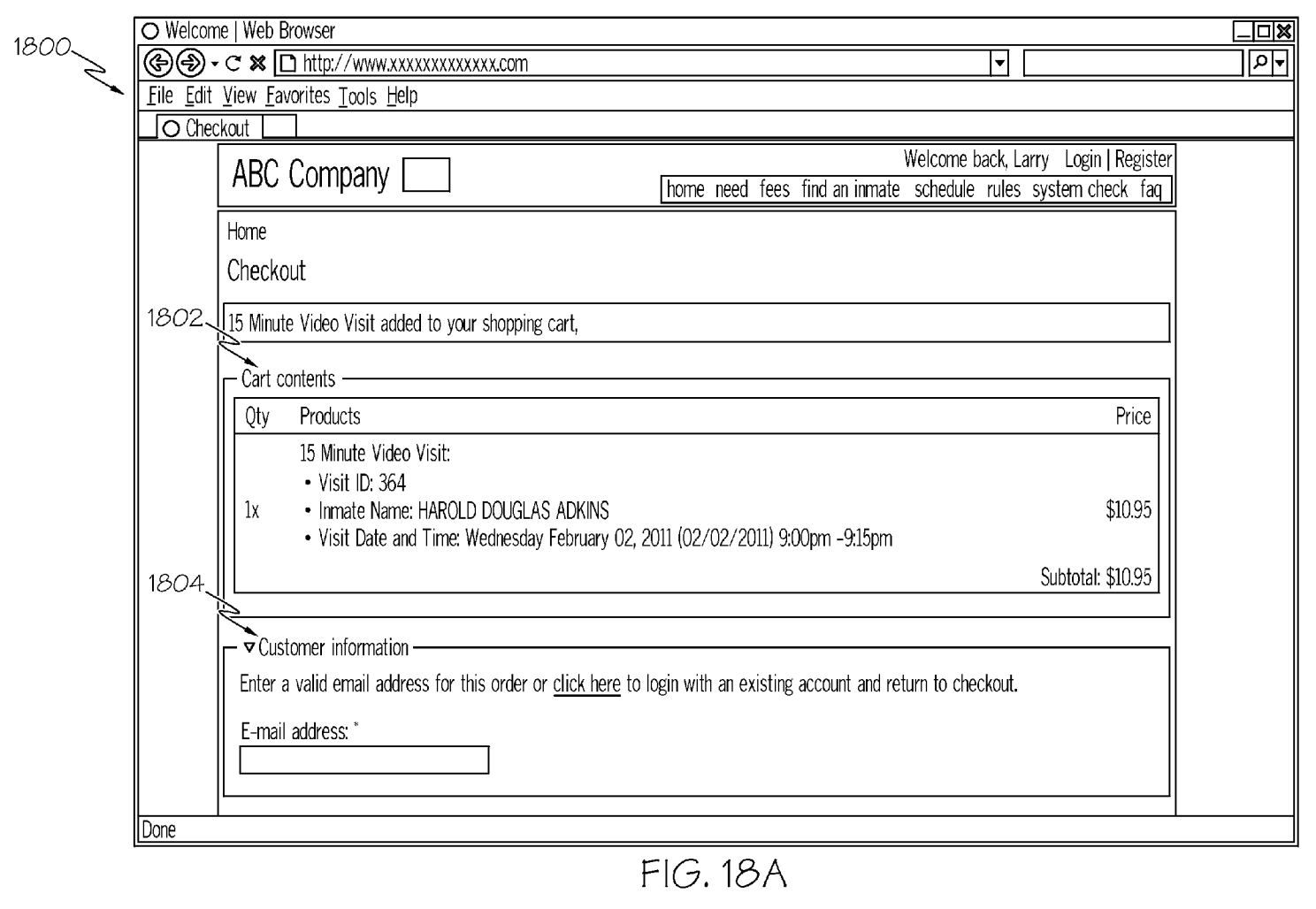
Figure 18B:
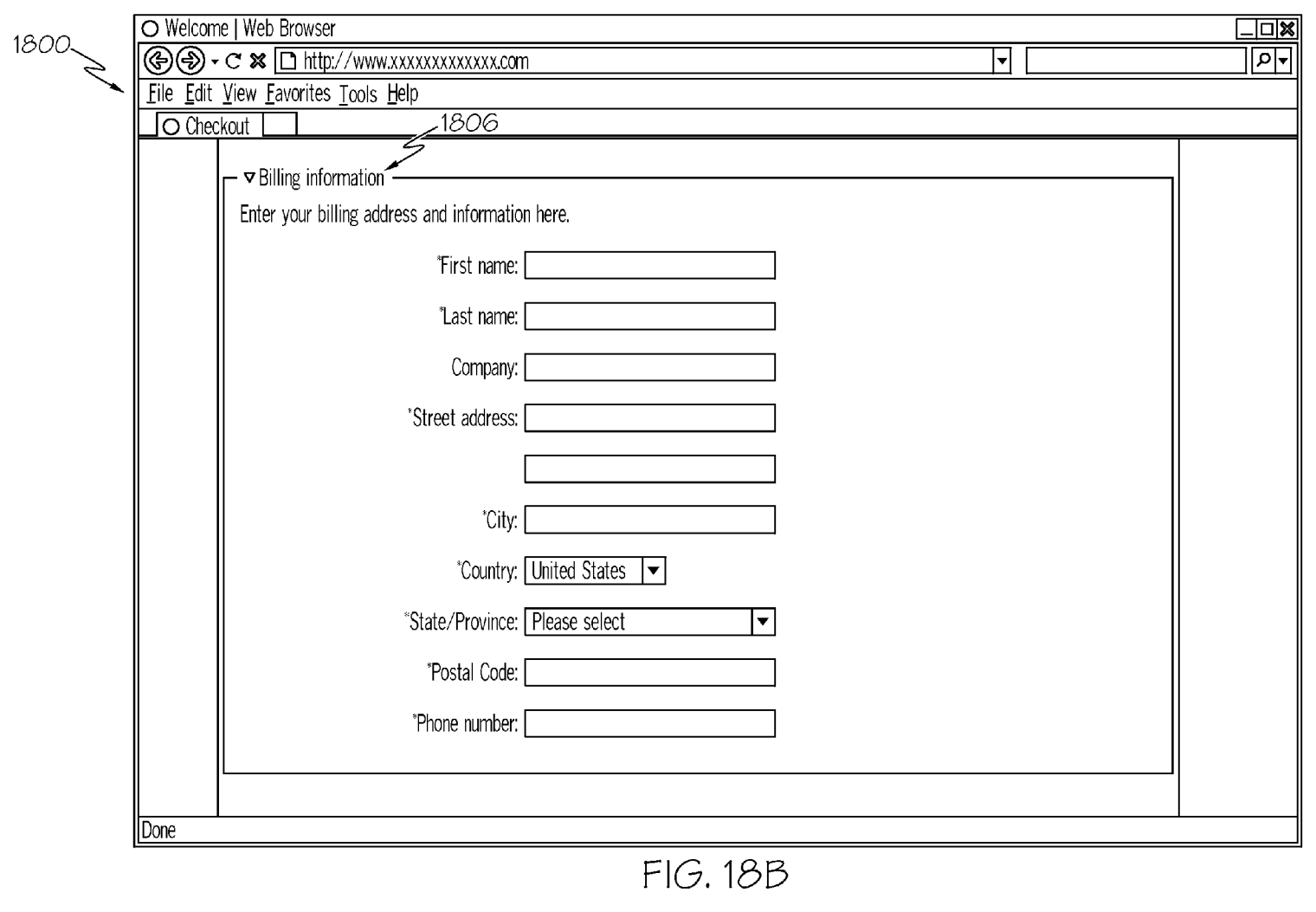
Figure 18C:
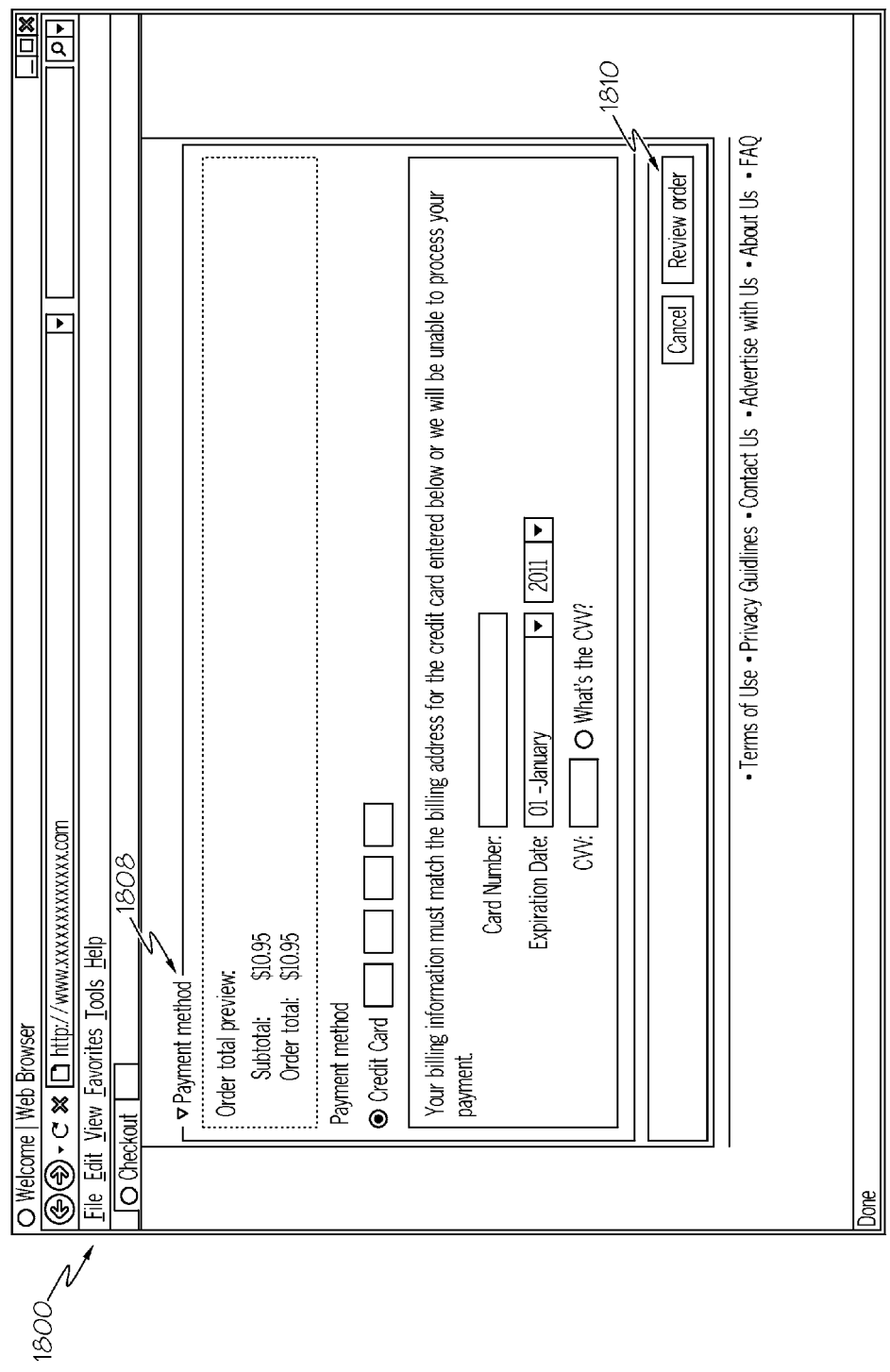

FIGS. 18A-18C depict a user interface 1800 for purchasing an amount of time for a virtual visit, according to embodiments shown and described herein. As illustrated, the user interface 1800 includes checkout data and customer information. The checkout data may include a cart contents portion 1802 that provides information regarding the virtual visitation that the visitor is purchasing, including a price and detailed information. Similarly, the user interface 1800 includes a customer information portion 1804 that includes a field for receiving an email address and/or other identifier of the visitor. An option to login may also be provided. Similarly, in FIG. 18B, a billing information form 1806 may be provided for the visitor to enter a first name, last name, company, address, city, country, state, postal code, and telephone number. FIG. 18C illustrates a payment method portion 1808, which provides the subtotal and total, as well as a field for entering credit card information. The visitor can advance the checkout process by selecting a review order option 1810.

Figure 19:
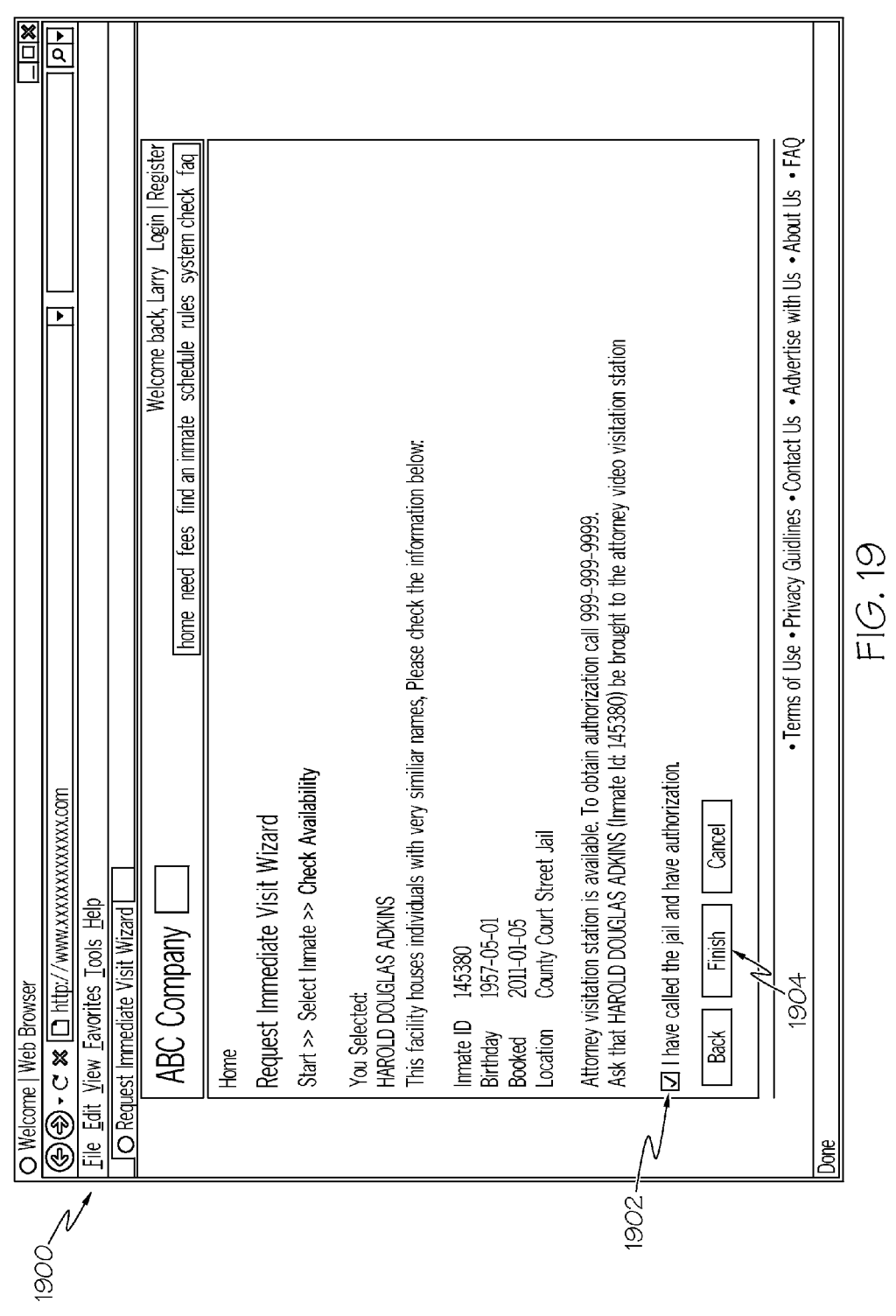

FIG. 19 depicts a user interface 1900 for finalizing scheduling of a virtual visit, according to embodiments shown and described herein. As illustrated, the user interface 1900 includes additional details regarding purchase of the virtual visitation. Additionally, an authorization option is provided for the visitor to verify that they have authorization from the facility to conduct a virtual visitation with the selected inmate. While the user interface 1900 indicates that the visitor call the facility, this is merely an example. In some embodiments, authorization may be provided via the online registration process, the online scheduling process and/or other similar process described above. Regardless, the scheduling process may be complete upon a selection of a finish option.

Figure 20:
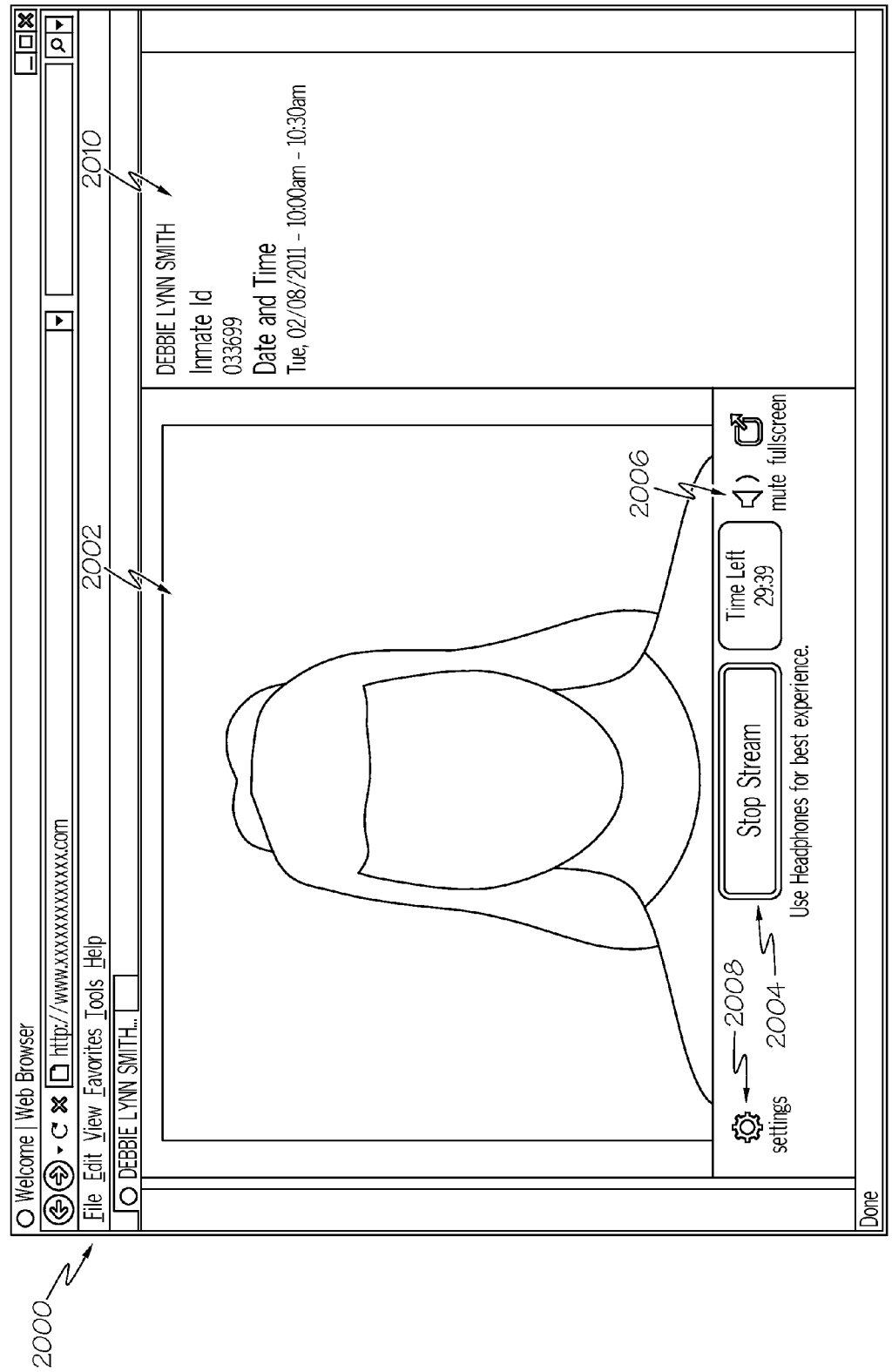
FIG. 20 depicts a user interface of conducting a virtual visit, according to embodiments shown and described herein.

FIG. 20 depicts a user interface 2000 of conducting a virtual visit, according to embodiments shown and described herein. As illustrated, the user interface 2000 includes a video portion 2002, a stop stream option 2004, a mute option 2006, a settings option 2008, and an information portion 2010. The video portion 2002 may be configured to provide a video image of the inmate in the video portion 2002. The stop stream option 2004 may provide the visitor with the ability to pause and/or stop the current video visitation. The mute option 2006 can adjust the volume controls. Additionally, a settings option 2008 may provide additional settings to the visitor. The information portion 2010 may provide inmate information, visitation information and/or other data.

Figure 21:
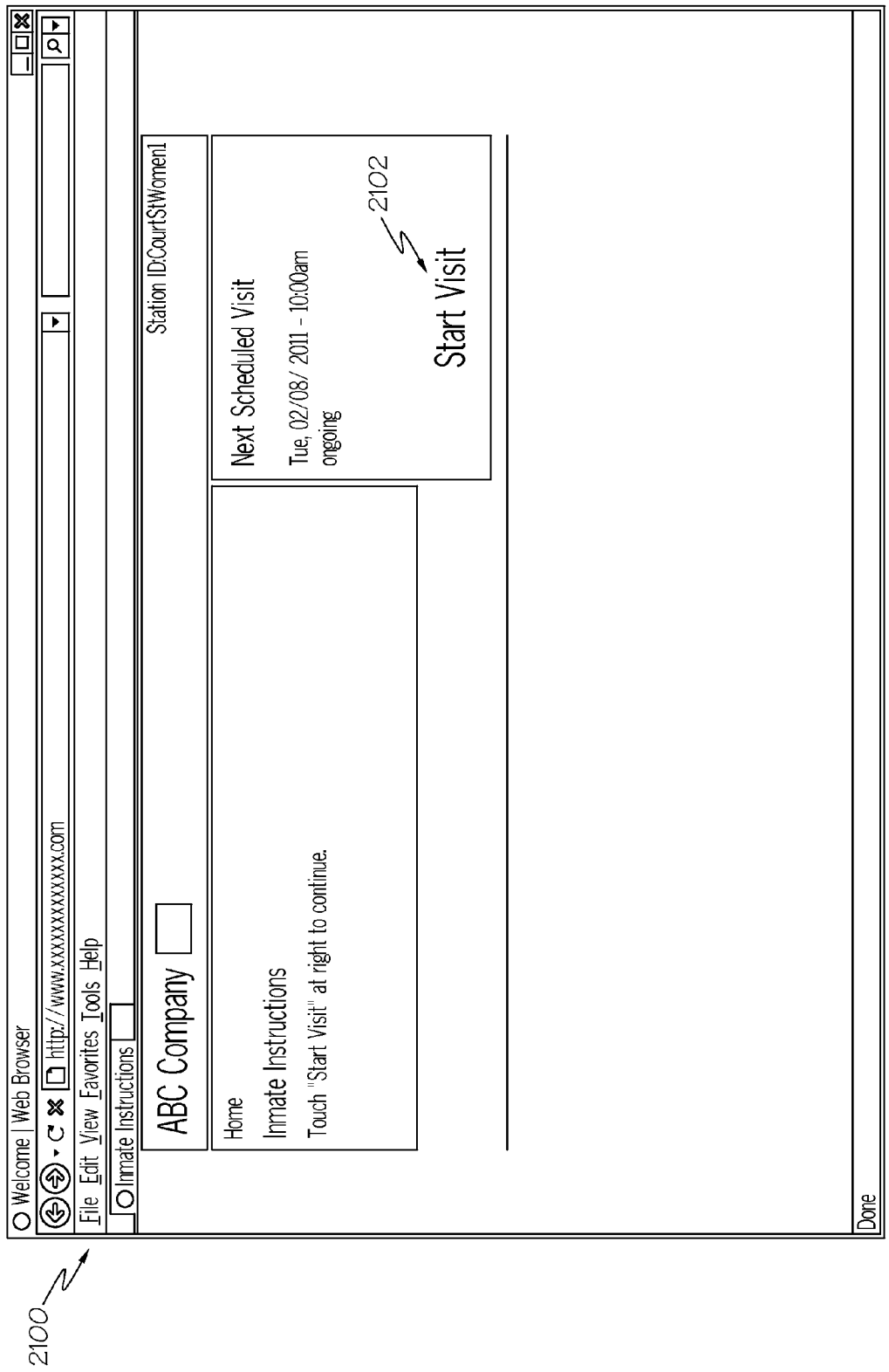
FIG. 21 depicts a user interface that may be provided to an inmate to initiate a virtual visit, according to embodiments shown and described herein.

FIG. 21 depicts a user interface 2100 that may be provided to an inmate to initiate a virtual visit, according to embodiments shown and described herein. As illustrated, the user interface 2100 may be provided to the inmate and may only have one option, a start visit option 2102. As the inmate computing device 102b may be configured as a kiosk that provides the inmate with limited functionality, only s subset of the options may actually be available to the inmate.

Figure 22:
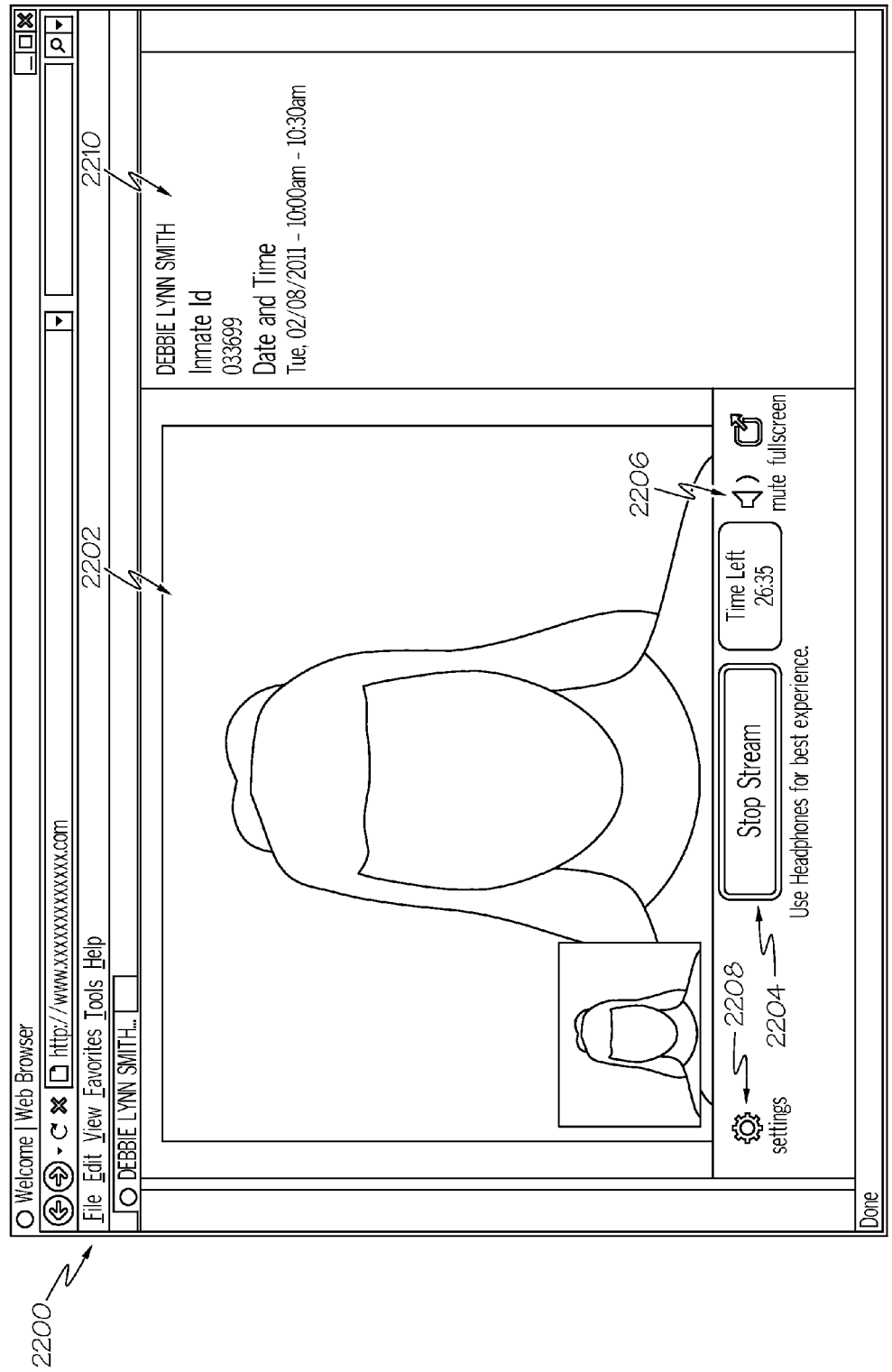
FIG. 22 depicts a user interface that may be provided to an inmate during a virtual visit, according to embodiments shown and described herein.

FIG. 22 depicts an inmate the inmate user interface 2200 that may be provided to an inmate during a virtual visit, according to embodiments shown and described herein. As illustrated, the inmate user interface 2200 may include a video portion 2202 that provides the inmate with a still and/or video image of the visitor, as well as a still and/or video image of the inmate. Also included is a stop stream option 2204, which may or may not be accessible to the inmate. A mute option 2206 and a settings option 2208 may also be included, but depending on the embodiment, may or may not be available to the inmate. An information portion 2210 may provide the inmate with information regarding the virtual visitation, the visitor, and/or other information.

FIGS. 23A-23F depict a user interface 2300 that may be provided to an administrator, according to embodiments shown and described herein. As an example, an administrator, such as on the warden computing device 106a and/or guard computing device 106b may be provided with the user interface 2300. The user interface 2300 may include facility administration options, such as an all visits list option 2302, a current visits option 2304, an inmates list option 2306, and a video stations option 2308. The all visits list option can provide the administrator (guard and/or warden) with a list of all current and/or scheduled visits. The inmates list may provide the administrator with a list of all inmates, a list of all inmates that are currently involved in a video visitation, and/or a list of all inmates that have video visitations scheduled. The video stations option 2308 may provide the administrator with a list of the video stations that are currently involved in video visitations and/or are capable of video visitations.

It should be understood that, depending on whether the warden computing device 106a or the guard computing device 106b is accessing the user interface 2300, different information may be provided. As an example, while the warden may have access to all visits via selection of the all visits list option 2302, a guard may only haves access to visits that are on his/her block. Similarly, in embodiments where an administrator has access to multiple facilities, the options provided in the user interface 2300 may be tailored accordingly.

Also included in the user interface 2300 are an administrator settings portion 2309 and an administrator home page portion 2310. The administrator settings portion 2309 may include an import option, a my account option, a request immediate visit wizard option, a schedule visit wizard, a create content option, an administrator option, and a log out option. The administrator option may include a content management sub-option, a site building-sub option, a reports sub-option a rules sub-option, an advanced help sub-option, and a help sub-option.

In the administrator home page 2310, a task option 2312 and a module option 2314 may be provided. Under the task option 2312, a content management section 2316 and a site building section 2318 may be provided. Under the content management section 2316 are options to manage the site content; backup and migrate data; view, edit, and delete content; and customize output using content templates. Under the site building section 2318 are options to configure block content; create, modify, and delete data tables; and configure feeds.

Figure 23A:
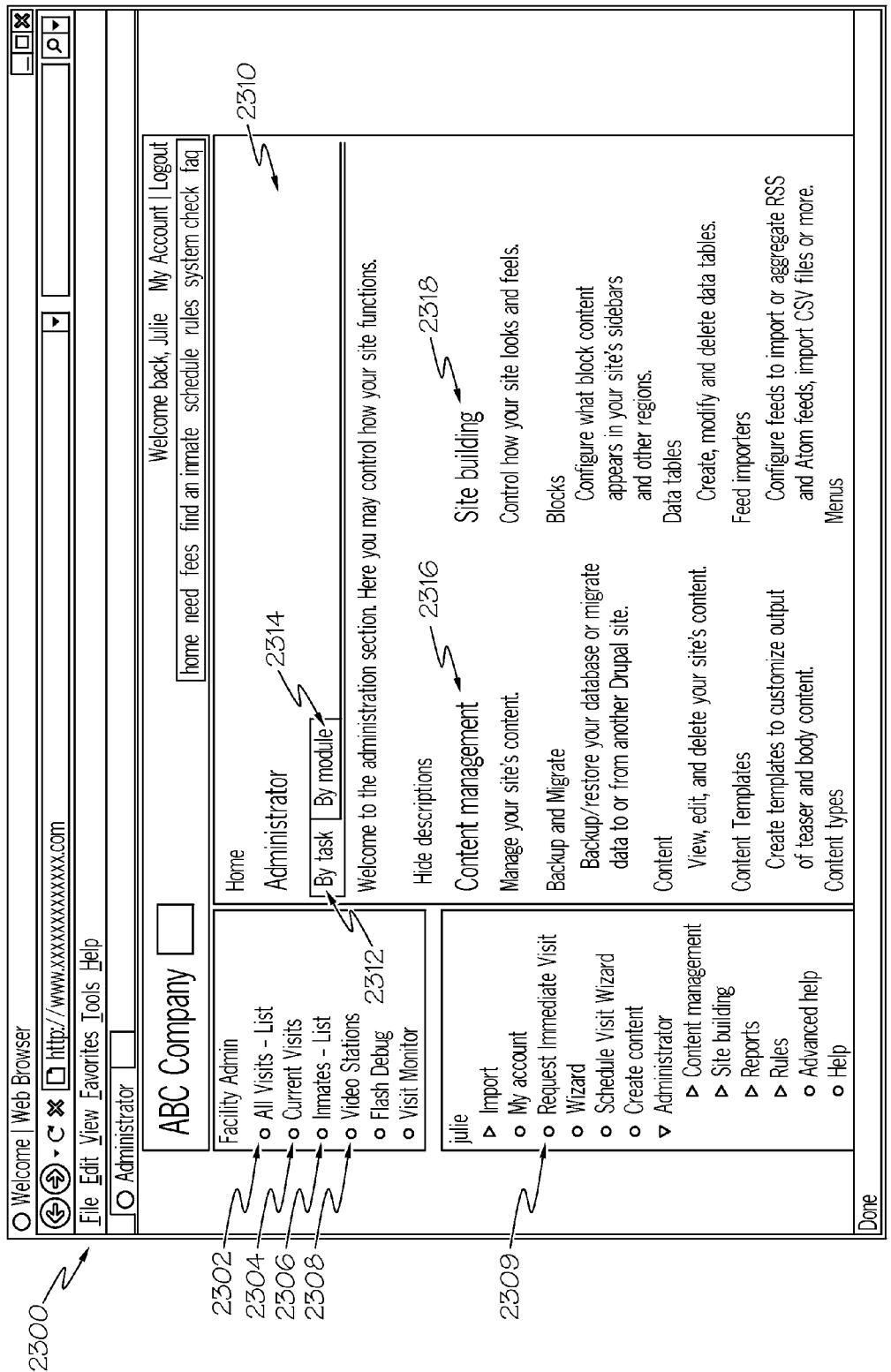
FIGS. 23A-23F depict a user interface that may be provided to an administrator, according to embodiments shown and described herein.
Figure 23B:
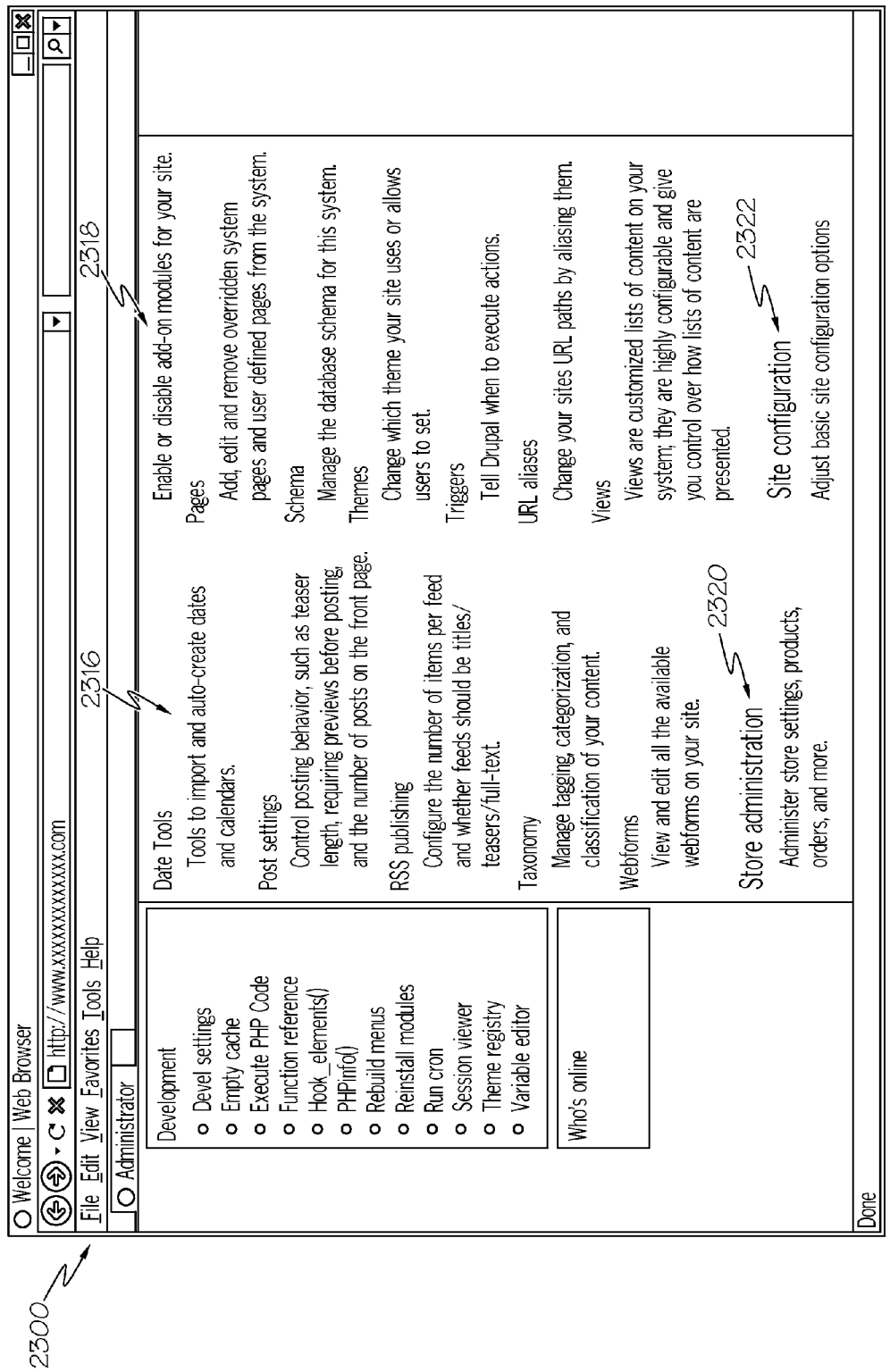
Figure 23C:
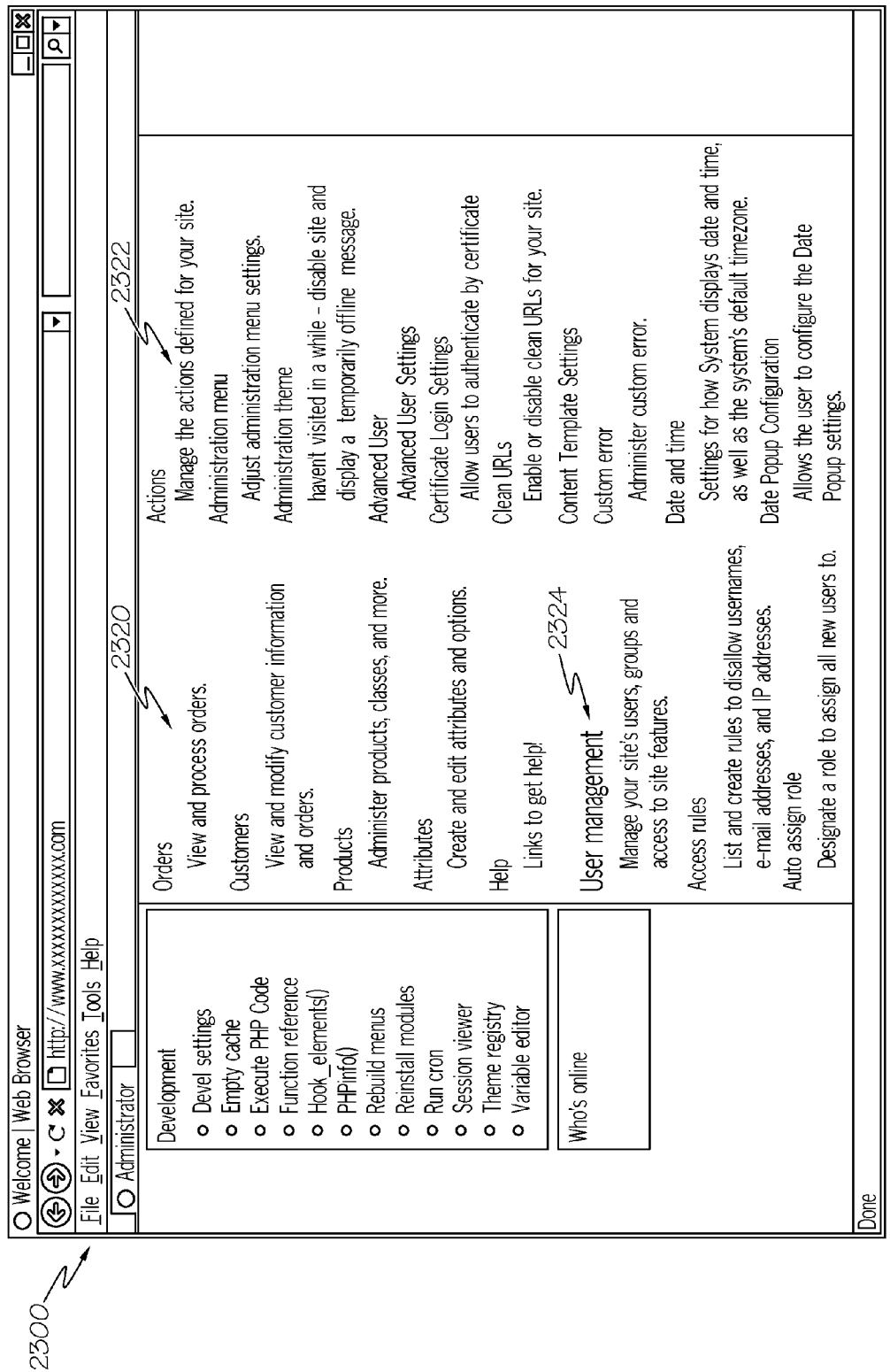
Figure 23D:
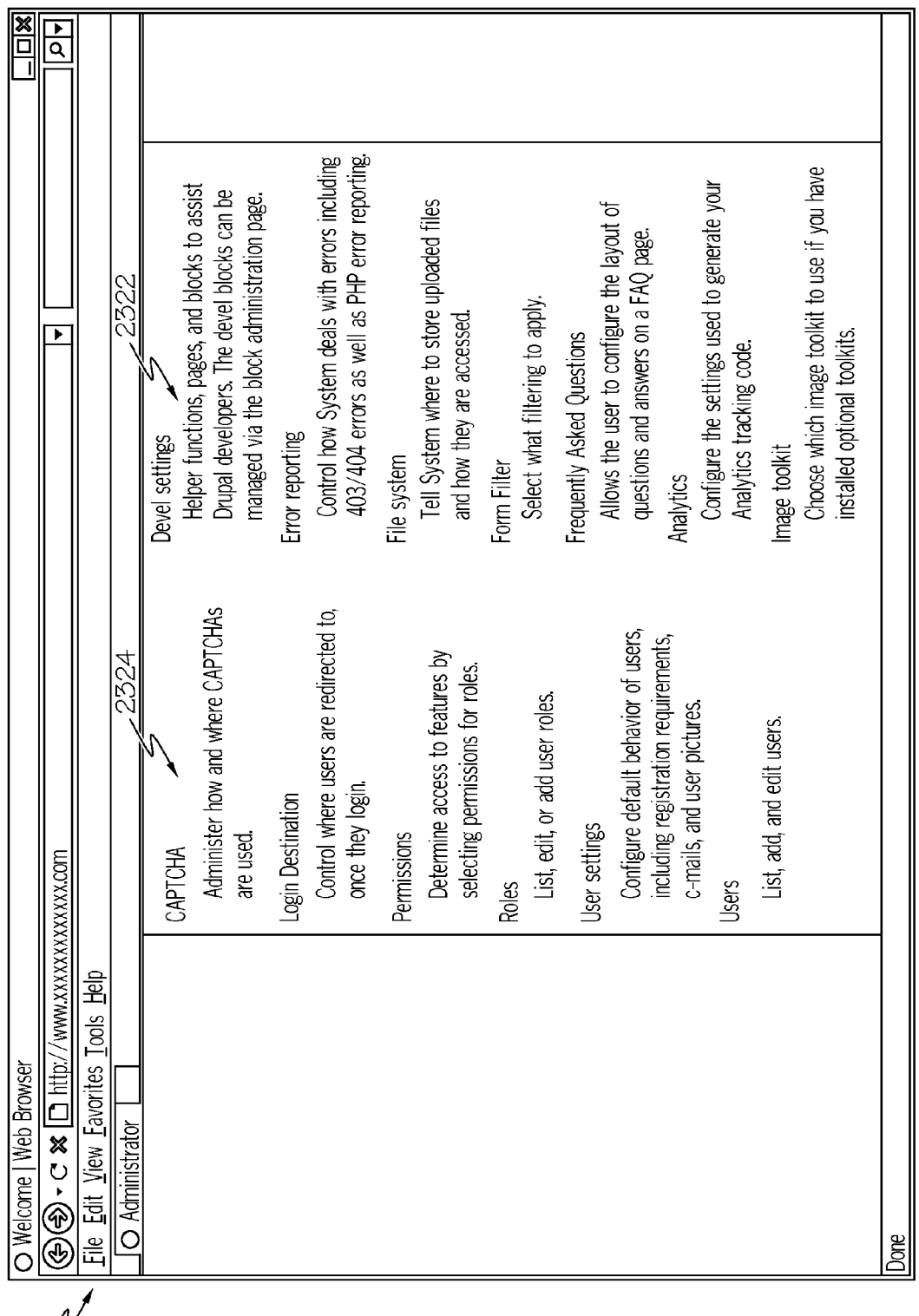

Referring to FIG. 23B the content management section 2316 may also include options for configuring date tools and calendars; control posting behavior; configure RSS feeds; manage tagging, categorization, and classification of the content; and view and edit available webforms. Under the site building section 2318, the user interface 2300 provides options for enabling and/or disabling add-on modules; adding, editing, and removing pages from the system, managing the database schema; changing the theme of the site; setting up triggers; changing URL aliases; and changing views. Also provided in the user interface 2300 are a store administration section 2320 and a site configuration section 2322. In FIG. 23C, the store administration section 2320 includes options for viewing and processing orders; viewing and modifying customer information and orders; administering products, classes, etc.; creating and editing attributes; and providing help. Included in the site configuration section 2322 are options for managing actions defined in the site; adjusting administration menu settings; changing an administration theme; providing advanced user settings; providing certificate login settings; cleaning URLs; providing content template settings; administering a custom error; and providing settings for date and time; providing configuration settings for date popup configurations.

Also included in the user interface 2300 depicted in FIG. 23C is a user management section 2324. Included in the user management section 2324 are options for user management; providing access rules; and providing options for auto assign a role. Similarly, in FIG. 23D, the user management section 2324 includes options for administrating completely animated public turing test to tell computers and humans apart (CAPTCHA); controlling login destinations; providing permissions to users; providing options related to user roles; provide user settings; and options for listing, adding, and editing users. Under the site configuration section 2322 are options for providing devel settings; error reporting; form filtering; frequently asked questions; analytics; and image toolkit.

Figure 23E:
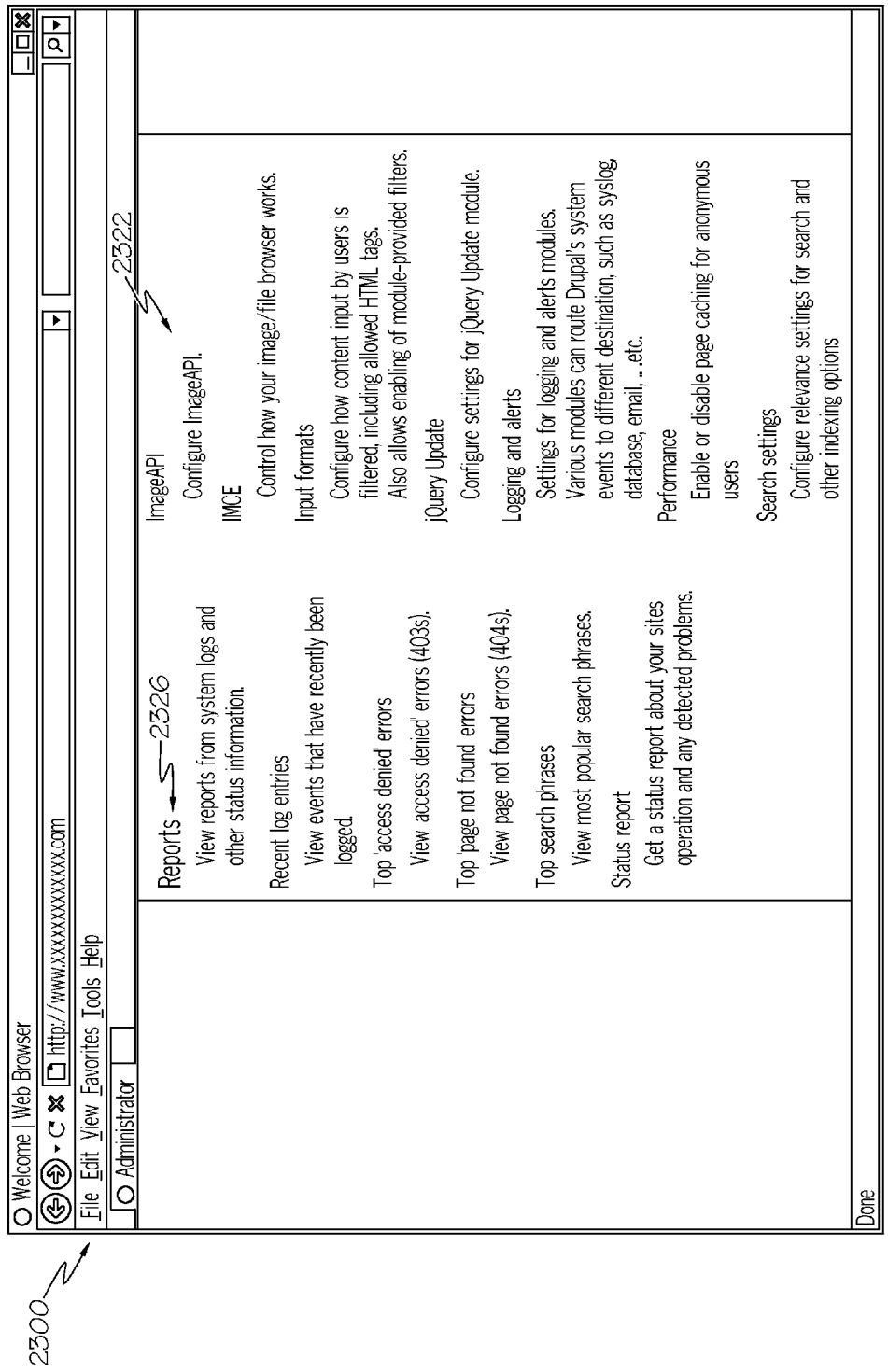

FIG. 23E further illustrates options under the site configuration section 2322, as well as under a reports section 2326. More specifically, under the reports section 2326, the user interface 2300 may provide options for viewing recent log entries; viewing accessed denied errors; page not found errors; viewing search phrases; and providing status reports. Under the site configuration section 2322, the user interface 2300 includes options for configuring an image application programming interface (API); controlling the browser for an image for moxicode editor (IMCE); configuring input formats; configuring settings for jquery updates; providing settings for logging and alerts; providing options for caching and other performance options; and providing searching settings. In FIG. 23E, the user interface 2300 further provides under the site configuration section 2322, options for providing site information; providing site maintenance; providing webform settings; and configuring what you see is what you get (WYSIWYG) client site editors.

Figure 23F:
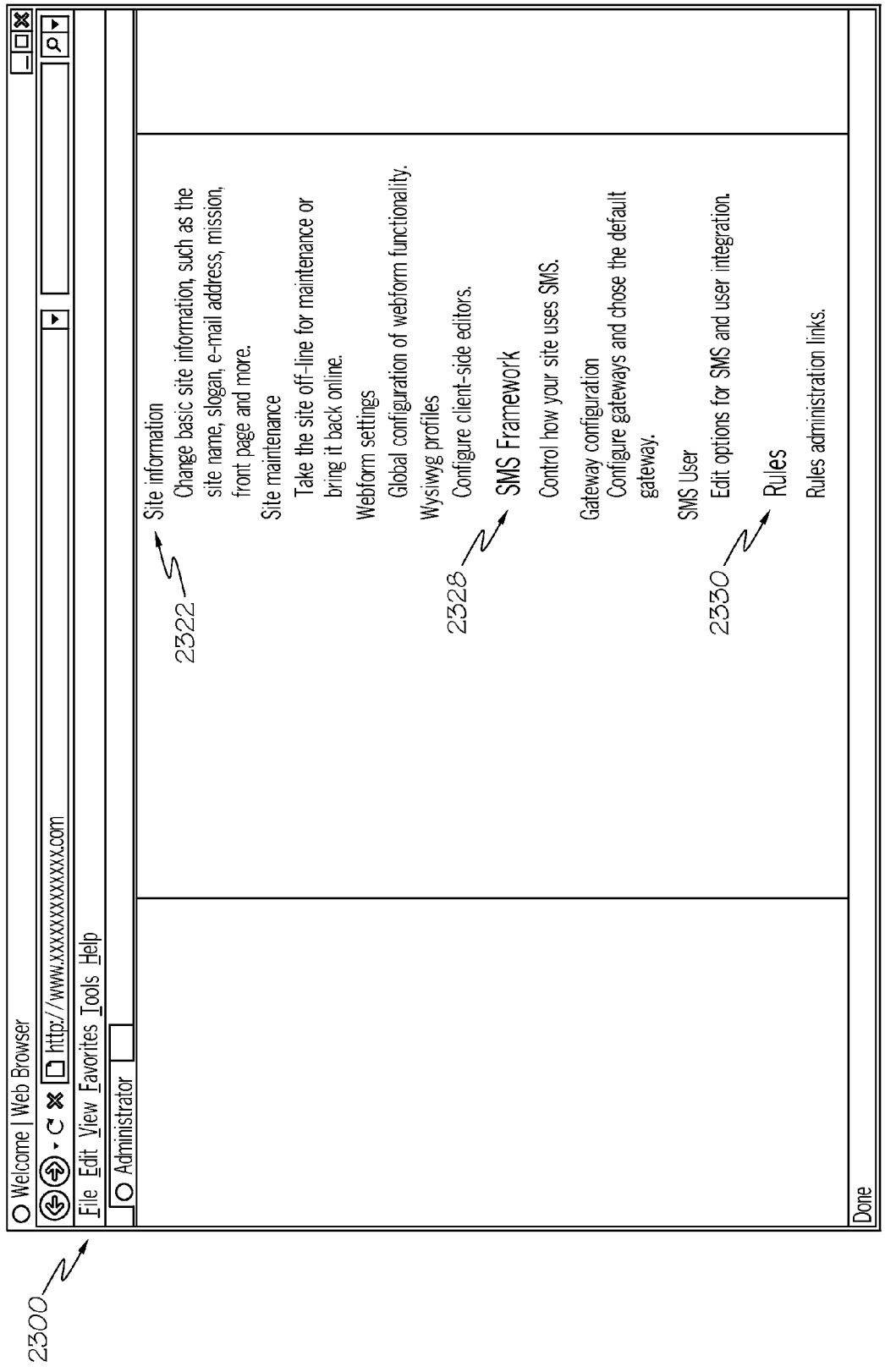

Additionally included in the user interface 2300 depicted in FIG. 23F are a short messaging system (SMS) area 2328 and a rules area 2330. The SMS area 2328 includes options for configuring gateway configurations and editing options for SMS users. The rules area 2330 includes an option for proving rules administration links.

FIG. 24 depicts a user interface 2400 that that may be provided to illustrate scheduling of a plurality of virtual visits, according to embodiments shown and described herein. As illustrated, the user interface 2400 includes a calendar 2402. The user interface 2400 may be provided to an administrator in response to selection of the all visits list option 2302 from FIG. 23A. Accordingly, the calendar 2402 provides information related to one or more virtual visits that have been scheduled with a block and/or facility. While the user interface 2400 depicted in FIG. 24 illustrates a calendar view, it should be understood that other views may also be provided.

Figure 25:
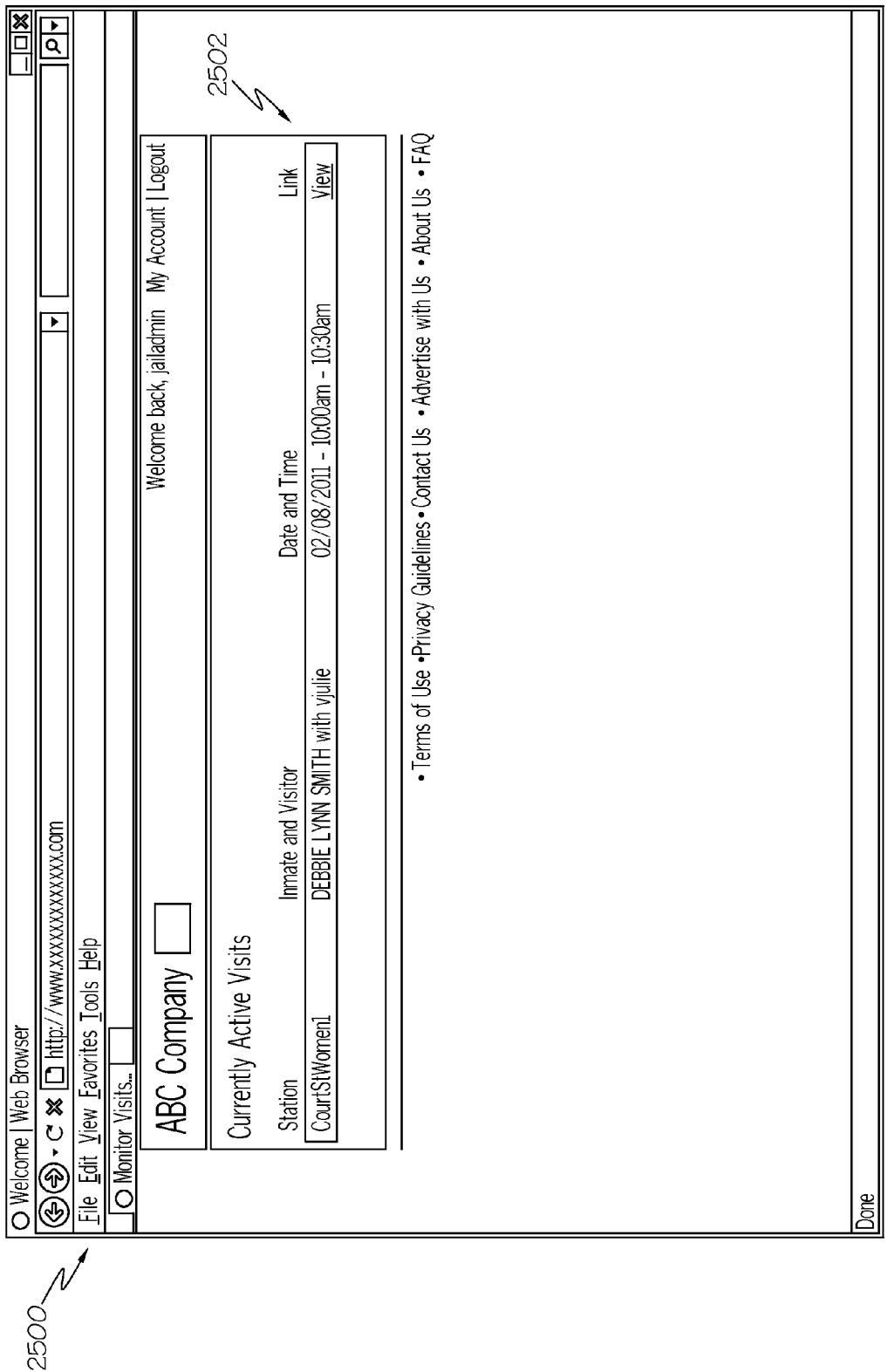
FIG. 25 depicts a user interface to provide a list of currently active visits, according to embodiments shown and described herein.

FIG. 25 depicts a user interface 2500 to provide a list of currently active visits, according to embodiments shown and described herein. As illustrated, the user interface 2500 may be provided in response to selection of the current visits options 2304, from FIG. 23A. The user interface 2500 may provide to an administrator, a listing of video visitations that are currently in progress. Also included is a view option 2502 for allowing the administrator to monitor the video visitation.

Figure 26:
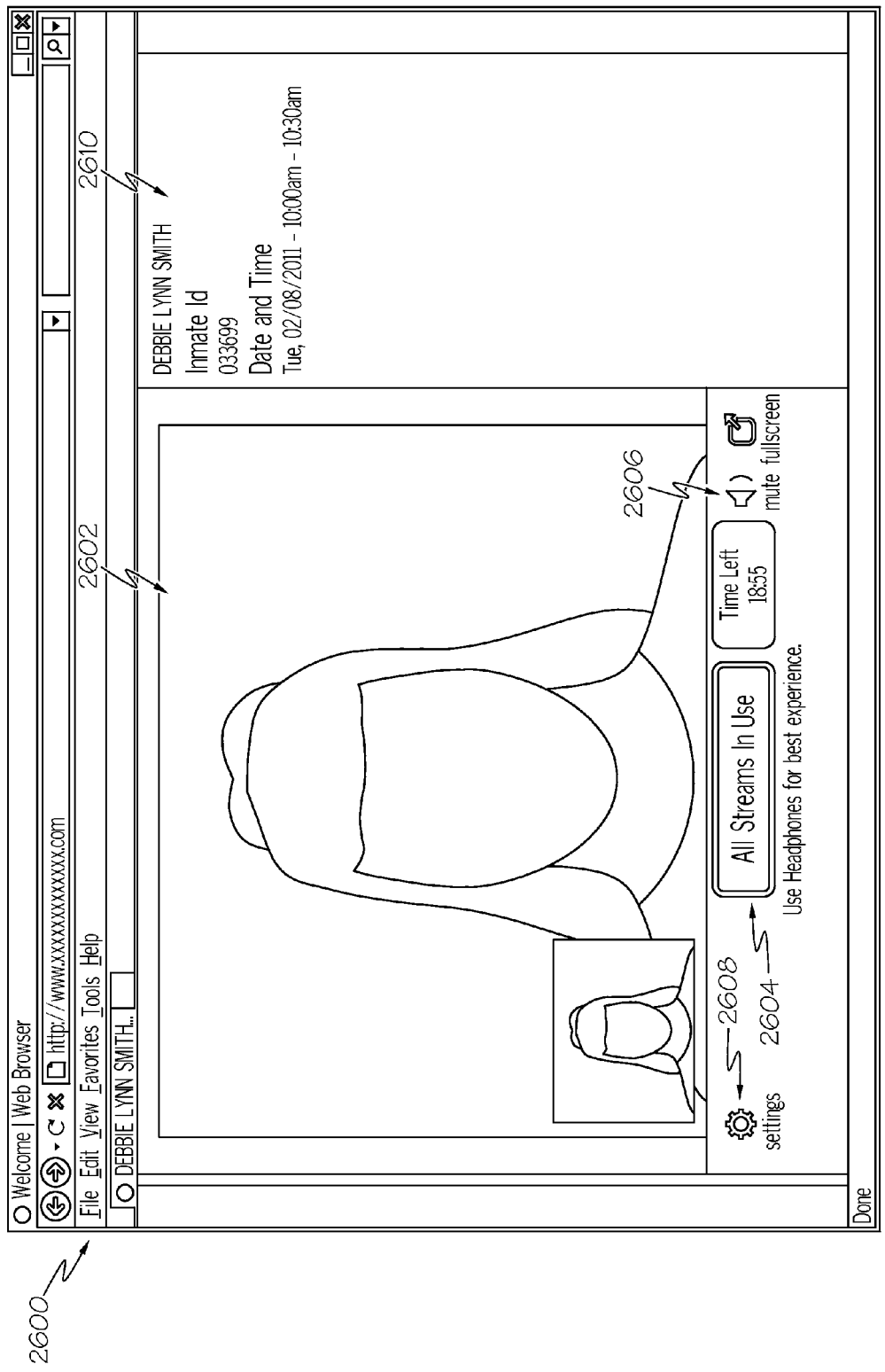
FIG. 26 depicts a user interface to provide an administrator with a view to a virtual visit, according to embodiments shown and described herein.

FIG. 26 depicts a user interface 2600 to provide an administrator with a view to a virtual visit, according to embodiments shown and described herein. As discussed above, in response to selection of the view option 2502 from FIG. 25, the user interface 2600 may be provided. Similar to the inmate user interface 2200 from FIG. 22, the user interface 2600 may include a video section 2602. Also included are an all streams in use option 2604, which provides the administrator with video of all the current streams that the administrator can access. A mute option 2606 may provide sound options. A settings option 2608 can provide the administrator with options to change various user options. It should be understood that while the mute options 2606 and settings option 2608 may adjust one or more parameters of the interface 2600, in some embodiments, these options may affect changes made to the inmate user interface 2200 from FIG. 22. More specifically, as the inmate may not have the ability to make changes, the user interface 2600 may be a mechanism for causing the desired changes. Also included is an information portion 2610 for providing information regarding the inmate, the visitor, video visitation, and/or other information.

Figure 27:
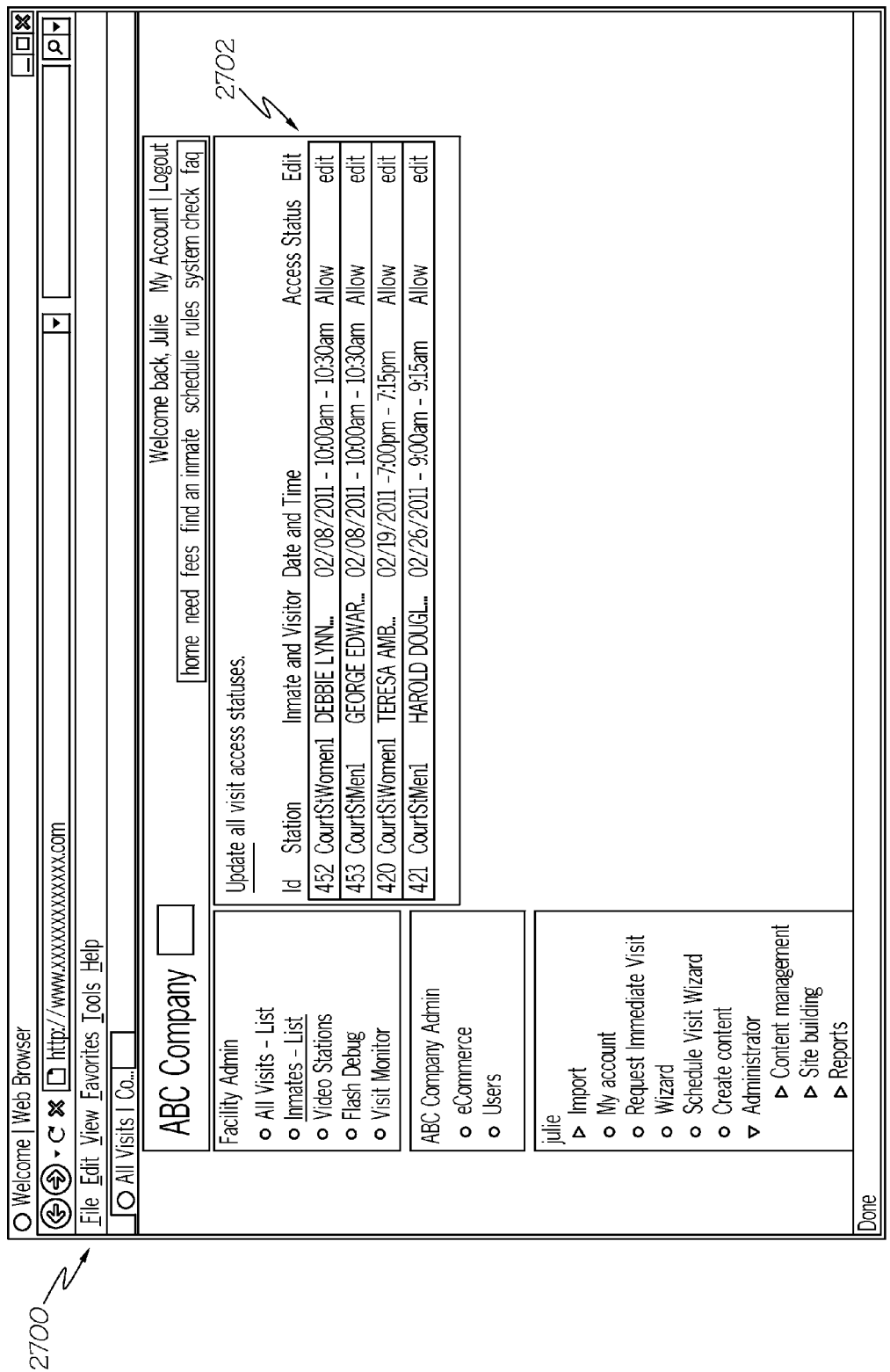
FIG. 27 depicts a user interface to provide an administrator with a list of virtual visits and their relative status, according to embodiments shown and described herein.

FIG. 27 depicts a user interface 2700 to provide an administrator with a list of virtual visits and their relative status, according to embodiments shown and described herein. In response to selection of the inmates list option 2306 from FIG. 23A, the user interface 2700 may be provided. As illustrated, the user interface 2700 may include a listing of all inmates that have video visitations scheduled. Also included is an edit option 2702 for editing the details of one or more of the video visitations and/or changing the access status.

Figure 28:
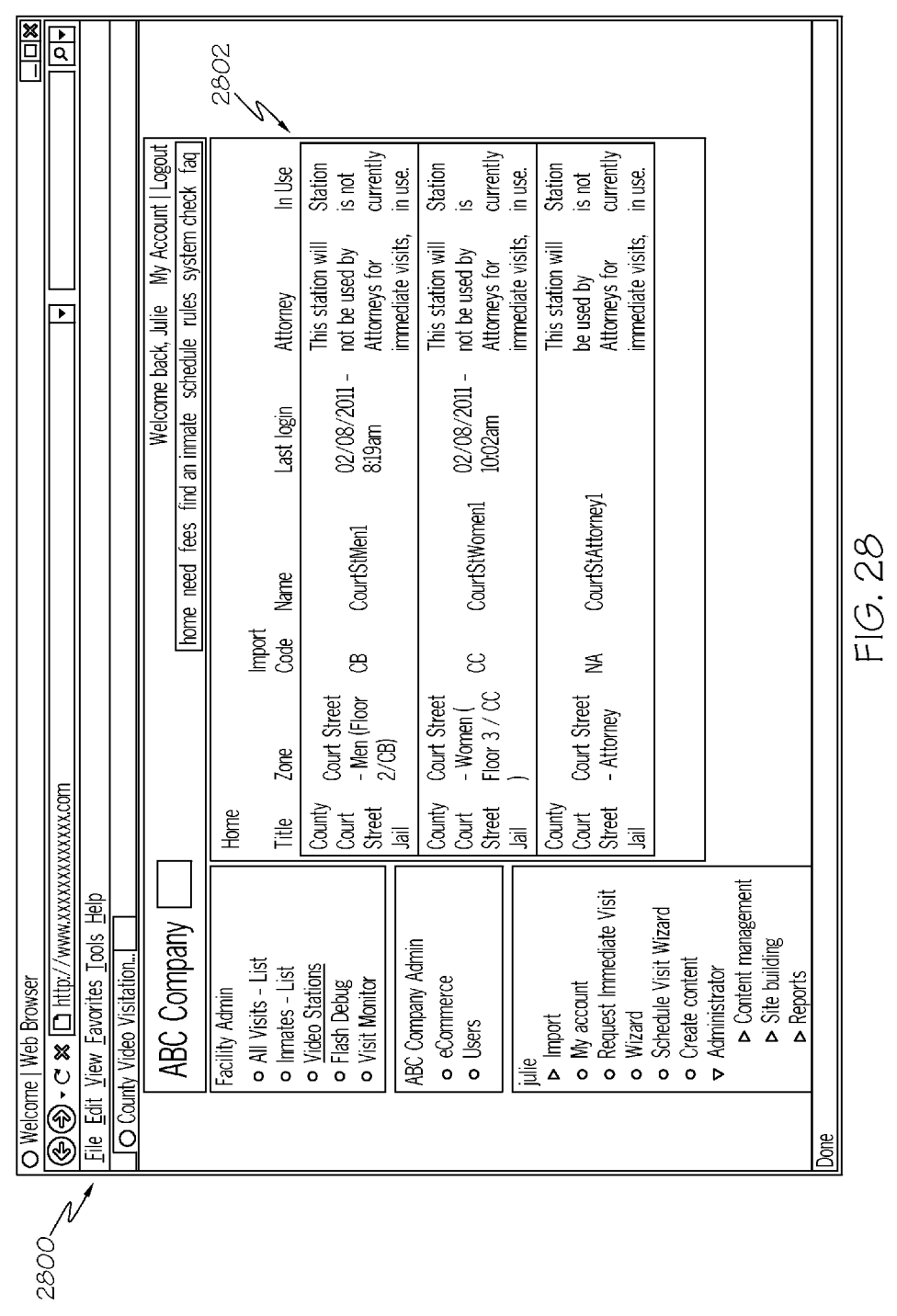

FIG. 28 depicts a user interface 2800 to provide an administrator with a list of inmate computing devices 102*b* that may conduct virtual visits, according to embodiments shown and described herein. The user interface 2800 may be provided in response to selection of the video stations option 2308 from FIG. 23A. As illustrated, the user interface 2800 may include a listing 2802 of one or more inmate computing devices 102*b* that conduct video visitations. The listing may include a title of the facility, a zone, an import code, a device name, a last login, an attorney, and an indication regarding whether the inmate computing devices 102*b* are currently in use. Other options may also be provided.

Figure 29:
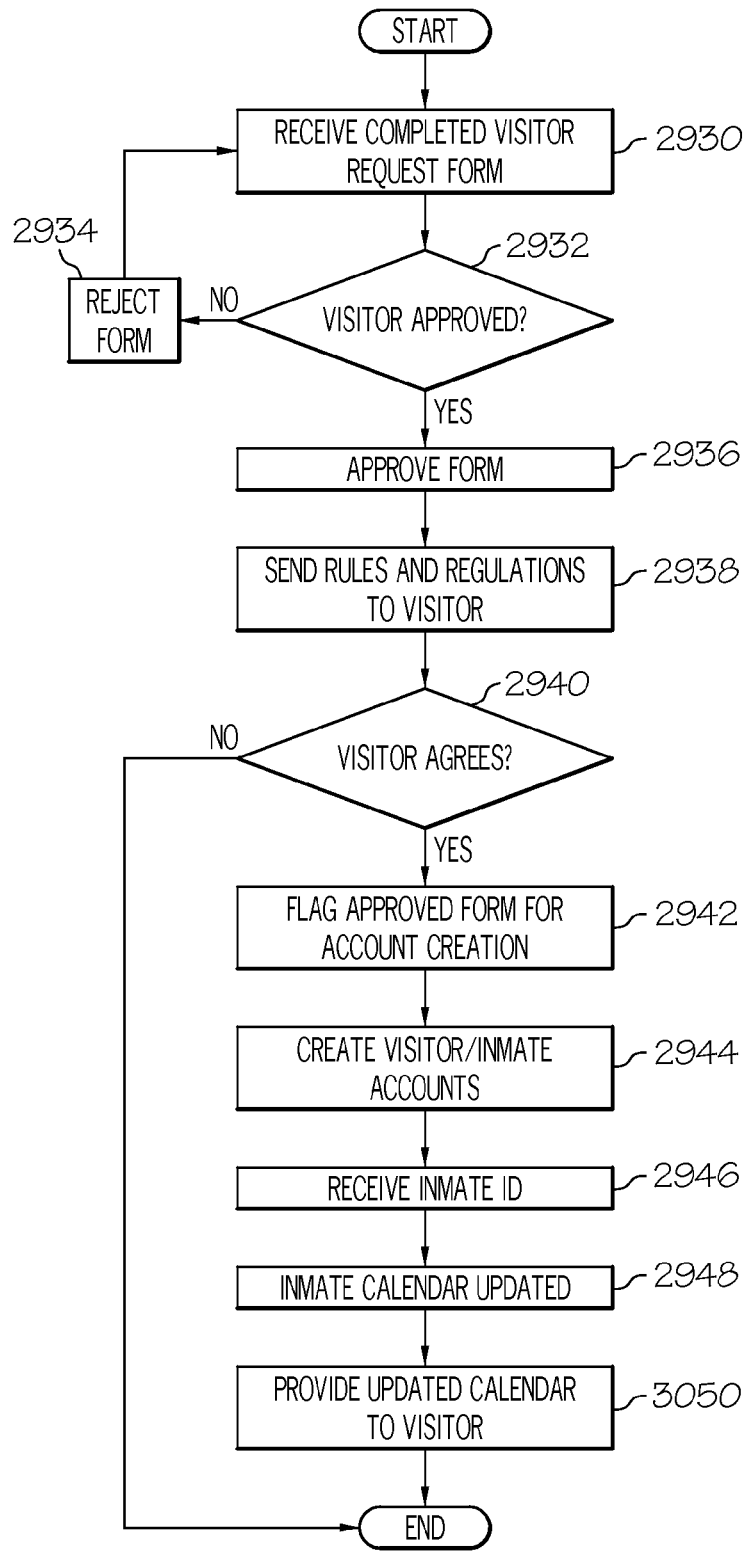
FIG. 29 depicts a flowchart for providing an updated calendar for a virtual visit, according to embodiments shown and described herein.

FIG. 29 depicts a flowchart for providing an updated calendar for a virtual visit, according to embodiments shown and described herein. As illustrated in block 2930, a completed visitor request form may be received. The visitor request form may include visitor information, as described above, for registering with a facility that provides video visitations of inmates. At block 2932, a determination may be made regarding whether the visitor is approved. If not, at block 2934 the form may be rejected and the process may return to block 2930. If at block 2932, the visitor is approved, at block 2936, an indication regarding the approval may be provided. At block 2938, a listing of the rules and regulations for video visitations may be sent to the potential visitor. At block 2940, a determination may be made regarding whether the visitor agrees with the terms and conditions. If not, the process may end. If the visitor does agree with the terms and conditions, at block 2942, the completed visitor form may be flagged for account creation. At block 2944, visitor and/or inmate accounts may be provided. At block 2946, an inmate identifier may be received. The identifier may include a name, identifier number, etc. At block 2948, a calendar for the identified inmate may be created and/or updated. At block 2950, the updated calendar may be provided to the visitor.

Figure 30:
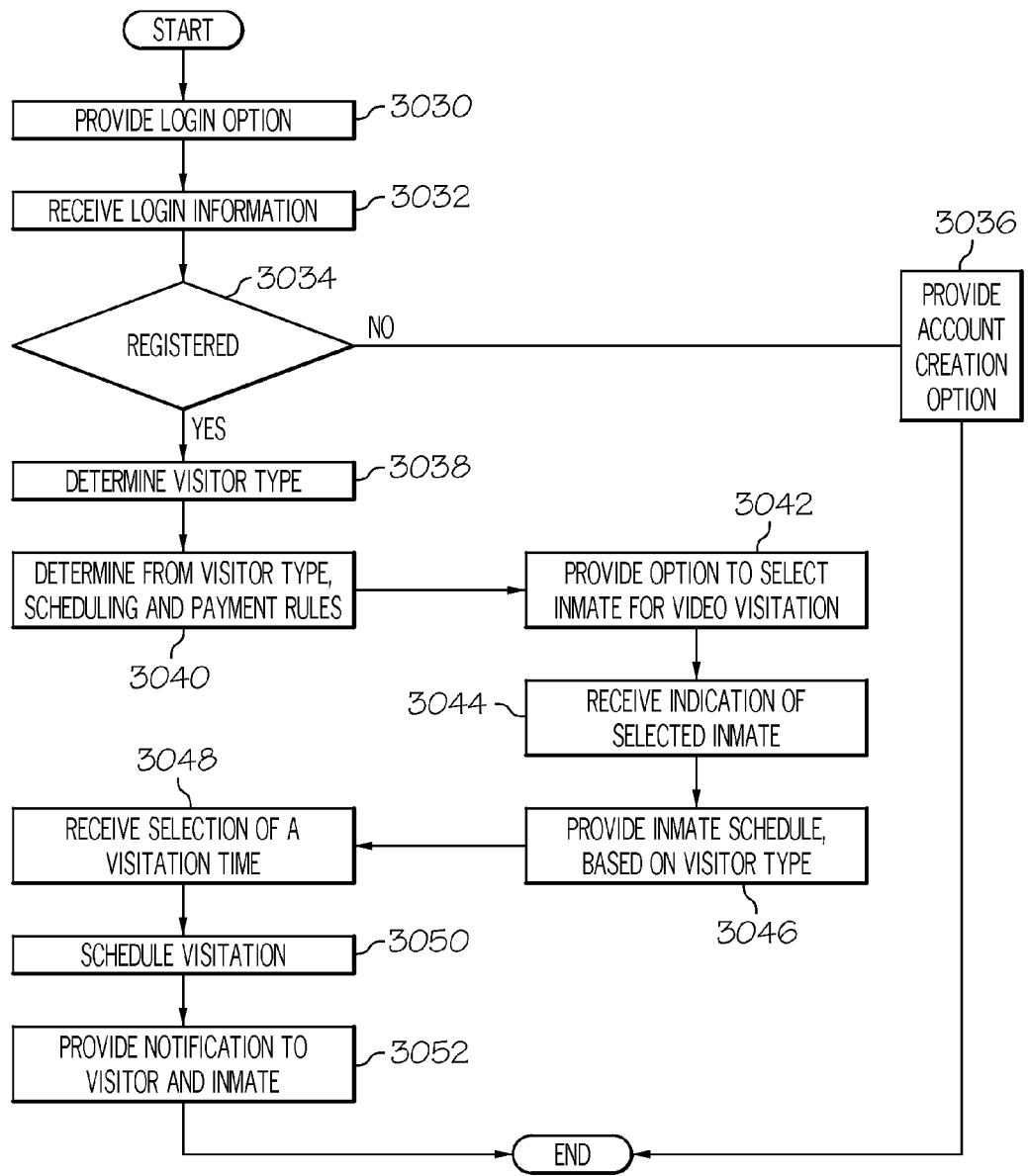
FIG. 30 depicts a flowchart for notifying a visitor and inmate of a virtual visit, according to embodiments shown and described herein.

FIG. 30 depicts a flowchart for notifying a visitor and inmate of a virtual visit, according to embodiments shown and described herein. As illustrated at block 3030, a login option may be provided to a visitor. At block 3032, the login information may be received from the visitor. At block 3034, a determination may be made regarding whether the user is registered. If not, at block 3036, an account creation option may be provided to the visitor. If the user is registered, at block 3038, a determination of the visitor type may be made. At block 3040, a determination may be made from the visitor type regarding scheduling and payment rules. As discussed above, if the visitor is an attorney, he/she may have different scheduling privileges than a friend. Similarly, different payment options may be provided, based on the visitor type. At block 3042, an option to select an inmate for video visitation may be provided. At block 3044 an indication of a selected inmate may be received. At block 3046, an inmate schedule may be provided, based on the visitor type. At block 3048 a selection of a visitor time may be received. At block 3050, a visitation may be scheduled, based on the received visitor time. At block 3052, notification of the video visitation scheduling may be provide to the visitor and the inmate.

Figure 31:
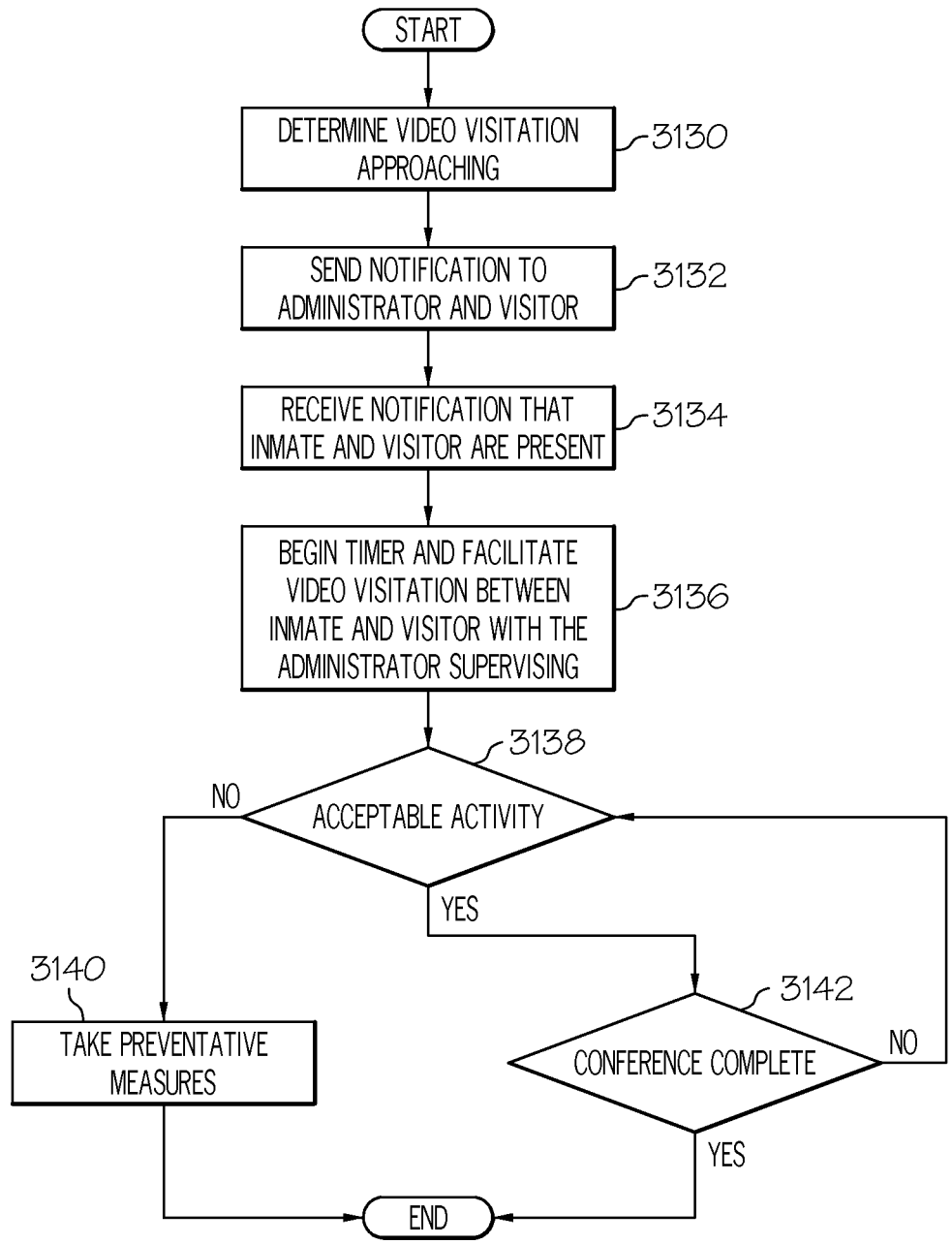
FIG. 31 depicts a flowchart for conducting a virtual visitation, according to embodiments shown and described herein.

FIG. 31 depicts a flowchart for conducting a virtual visitation, according to embodiments shown and described herein. As illustrated at block 3130, a determination may be made that a video visitation is approaching. At block 3132, a notification may be sent to the administrator and to the visitor regarding the upcoming video visitation. This notification may be sent in the form of an email, instant message, meeting request, telephone call, text message, etc. Regardless, at block 3134, at the time of the video visitation, a notification may be received that the inmate and the visitor are present. This notification may be received in the form of the visitor logging into the video visitation system and/or the inmate selecting the start visitation option 2102 from FIG. 21. At block 3136, a timer may be started and the video visitation may be facilitated between the inmate and the visitor, with an administrator supervising.

Figure 32:
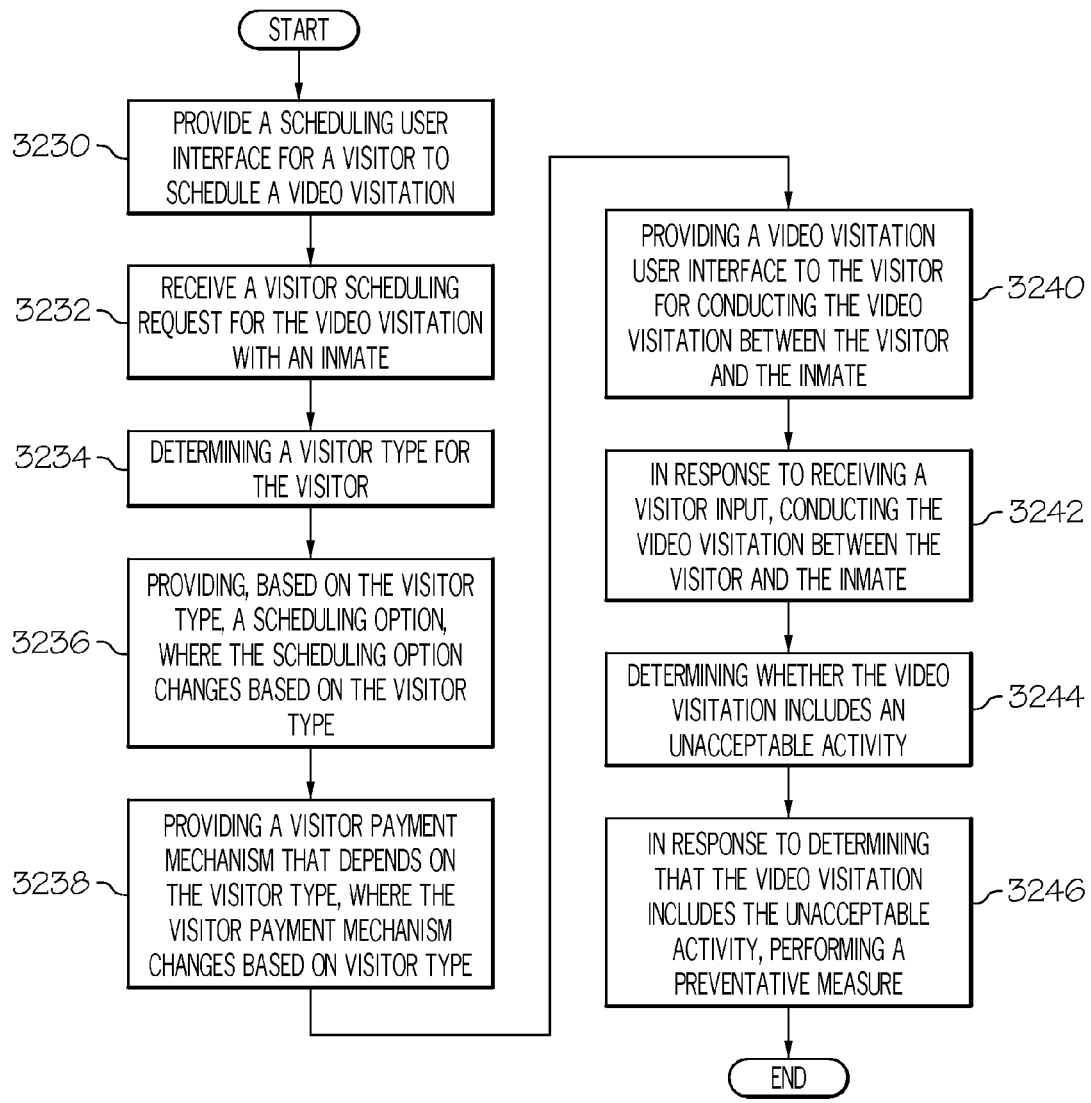
FIG. 32 depicts a flowchart for scheduling and conducting a virtual visitation, according to embodiments shown and described herein.

FIG. 32 depicts a flowchart for scheduling and conducting a virtual visitation, according to embodiments shown and described herein. As illustrated in FIG. 32, a scheduling user interface may be provided for a visitor to schedule a video visitation. At block 3232, a visitor scheduling request may be received from the video visitation with the inmate. At block 3234, a visitor type may be determined for the visitor. At block 3236, a scheduling option may be provided, based on the visitor type, where the scheduling option changes based on the visitor type. At block 3238, a visitor payment mechanism that depends on the visitor type may be provided, where the visitor payment mechanism changes based on the visitor type. At block 3240 a video visitation user interface may be provided to the visitor for conducting the video visitation between the visitor and the inmate. At block 3242, in response to receiving a visitor input, conducting the video visitation between the visitor and the inmate. At block 3244 a determination can be made regarding whether the video visitation includes an unacceptable activity. As discussed above, the determining the inappropriate activity may include utilizing voice recognition to determine whether the video visitation includes an inappropriate word, utilizing video recognition to determine whether the video visitation includes an inappropriate gesture, and/or making other determinations. At block 3246, in response to determining that the video visitation includes the unacceptable activity, a preventative measure may be performed. As discussed above, the preventative measure may include restricting visitation rights of the visitor, increasing a cost to the visitor of a future video visitation, restricting visitation rights of the inmate, and/or performing other preventative measures.

In some embodiments, the supervision may include a human administrator watching (and listening) to the video visitation to ensure that there are not illicit communications. However, in some embodiments, the warden computing device 106a and/or the guard computing device 106b may include monitoring logic, which may cause the respective computing devices to recognize audio and/or video associated with an unauthorized conversation. As an example, the monitoring logic may cause the warden computing device 106a to recognize the spoken word "gun." Similarly, the monitoring logic may cause the warden computing device 106a to recognize a hand signal for a gun. At block 3138, a determination may be made regarding whether the inmate and/or the visitor are participating in an acceptable activity. If so, at block 3142, a determination may be made regarding whether the video visitation is complete. If so, the process may end. If the video visitation is not complete, the process may return to block 3138 to determine whether the visitor and the inmate are engaged in an acceptable activity. If at block 3138, the visitor and the inmate are not engaged in an acceptable activity, at block 3140, preventative measures may be taken. Preventative measures may include shutting down the video visitation, flagging the visitor and/or inmate for disciplinary action, etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. Further, the scope of the present disclosure is intended to cover all combinations and sub-combinations of all elements, features, and aspects discussed above. All such modifications and variations are intended to be included herein within the scope of this disclosure.

Therefore, at least the following is claimed:

1. A method for virtual inmate visitation, comprising:
   providing a scheduling user interface for a visitor to schedule a video visitation;
   receiving a visitor scheduling request for the video visitation with an inmate;
   providing a registration user interface that includes an option for the visitor to identify a visitor type for the visitor, wherein the registration user interface is different, depending on the visitor type, and wherein the visitor type includes at least one of the following: family, friend, clergy, and legal counsel;

providing, based on a visitor input regarding the visitor type, a scheduling option, wherein the scheduling option changes based on the visitor type, wherein friends and family have a subset of scheduling options as clergy and legal counsel;

providing, based on visitor input regarding the visitor type, a visitor payment mechanism that depends on the visitor type, wherein the visitor payment mechanism and a charge rate for the visitor changes based on the visitor type;

providing a video visitation user interface to the visitor for conducting the video visitation between the visitor and the inmate;

in response to receiving a visitor input, conducting the video visitation between the visitor and the inmate;

determining whether the video visitation includes an unacceptable activity; and in response to determining that the video visitation includes the unacceptable activity, begin recording the video visitation and performing, by a computing device, a preventative measure.

2. The method of claim 1, wherein the visitor type includes at least one of the following: friend, family, attorney, clergy, law enforcement, and social services.

3. The method of claim 1, wherein determining that the video visitation includes the unacceptable activity includes at least one of the following: utilizing voice recognition to determine whether the video visitation includes an inappropriate word and utilizing video recognition to determine whether the video visitation includes an inappropriate gesture.

4. The method of claim 1, wherein performing the preventative measure includes at least one of the following: restricting visitation rights of the visitor, increasing a cost to the visitor of a future video visitation, and restricting visitation rights of the inmate.

5. The method of claim 1, further comprising providing an inmate user interface to the inmate for conducting the video visitation between the visitor and the inmate.

6. The method of claim 5, further comprising providing the inmate user interface to an administrator.

7. The method of claim 1, further comprising providing a search user interface to facilitate a search for the inmate for scheduling the video visitation.

8. A system for virtual visitation, comprising:
a memory component that stores video visitation logic that, when executed by the system, causes the system to perform at least the following:
provide an introductory user interface that includes an option for a visitor to select a visitor type;
determine, from a visitor selection of the option, the visitor type for the visitor, wherein the registration user interface is different, depending on the visitor type, and wherein the visitor type includes at least one of the following: family, friend, clergy, and legal counsel;
provide a scheduling user interface for the visitor to schedule a video visitation, wherein friends and family have a subset of scheduling options as clergy and legal counsel;
receive a visitor scheduling request for the video visitation with an inmate;
provide, based on the visitor type, a scheduling option, wherein the scheduling option changes based on the visitor type;
provide a visitor payment mechanism that depends on the visitor type, wherein the visitor payment mechanism changes based on the visitor type;
provide a video visitation user interface to the visitor for conducting the video visitation between the visitor and the inmate;
in response to receiving a visitor input, conduct the video visitation between the visitor and the inmate;
determine whether the video visitation includes an unacceptable activity; and
in response to determining that the video visitation includes the unacceptable activity, perform a preventative measure.

9. The system of claim 8, wherein the visitor type includes at least one of the following: friend, family, attorney, clergy, law enforcement, and social services.

10. The system of claim 8, wherein determining that the video visitation includes the unacceptable activity includes at least one of the following: utilizing voice recognition to determine whether the video visitation includes an inappropriate word and utilizing video recognition to determine whether the video visitation includes an inappropriate gesture.

11. The system of claim 8, wherein performing the preventative measure includes at least one of the following: restricting visitation rights of the visitor, increasing a cost to the visitor of a future video visitation, and restricting visitation rights of the inmate.

12. The system of claim 8, wherein the video visitation logic further causes the system to provide an inmate user interface to the inmate for conducting the video visitation between the visitor and the inmate.

13. The system of claim 12, wherein the video visitation logic further causes the system to provide the inmate user interface to an administrator.

14. The system of claim 8, wherein the video visitation logic further causes the system to provide a search user interface to facilitate a search for the inmate for scheduling the video visitation.

15. A non-transitory computer-readable medium for virtual inmate visitation that stores logic that when executed by a computing device, causes the computing device to perform at least the following:
provide a registration user interface for registering a visitor;
determining, from a visitor selection on the registration user interface, a visitor type, wherein the registration user interface is different, depending on the visitor type, and wherein the visitor type includes at least one of the following: family, friend, clergy, and legal counsel;
provide a scheduling user interface for the visitor to schedule a video visitation, wherein friends and family have a subset of scheduling options as clergy and legal counsel;
receive a visitor scheduling request for the video visitation with an inmate;
provide, based on the visitor type, a scheduling option, wherein the scheduling option changes based on the visitor type;
provide a visitor payment mechanism that depends on the visitor type, wherein the visitor payment mechanism changes based on the visitor type;
provide a video visitation user interface to the visitor for conducting the video visitation between the visitor and the inmate;

in response to receiving a visitor input, conduct the video visitation between the visitor and the inmate;

determine whether the video visitation includes an unacceptable activity; and in response to determining that the video visitation includes the unacceptable activity, perform a preventative measure.

16. The non-transitory computer-readable medium of claim 15, wherein the visitor type includes at least one of the following: friend, family, attorney, clergy, law enforcement, and social services.

17. The non-transitory computer-readable medium of claim 15, wherein determining that the video visitation includes the unacceptable activity includes at least one of the following: utilizing voice recognition to determine whether the video visitation includes an inappropriate word and utilizing video recognition to determine whether the video visitation includes an inappropriate gesture.

18. The non-transitory computer-readable medium of claim 15, wherein performing the preventative measure includes at least one of the following: restricting visitation rights of the visitor, increasing a cost to the visitor of a future video visitation, and restricting visitation rights of the inmate.

19. The non-transitory computer-readable medium of claim 15, wherein the logic further causes the computing device to perform at least the following:

provide an inmate user interface to the inmate for conducting the video visitation between the visitor and the inmate; and provide the inmate user interface to an administrator.

20. The non-transitory computer-readable medium of claim 15, wherein the logic further causes the computing device to provide a search user interface to facilitate a search for the inmate for scheduling the video visitation.

\* \* \* \* \*